US008505239B2

(12) United States Patent
Tompkins, IV

(10) Patent No.: US 8,505,239 B2
(45) Date of Patent: Aug. 13, 2013

(54) PET TOY

(76) Inventor: Hugh Linton Tompkins, IV, Seattle, WA (US)

( * ) Notice: Subject to any disclaimer, the term of this patent is extended or adjusted under 35 U.S.C. 154(b) by 9 days.

(21) Appl. No.: 13/095,677

(22) Filed: Apr. 27, 2011

(65) Prior Publication Data

US 2011/0265374 A1 Nov. 3, 2011

Related U.S. Application Data

(63) Continuation-in-part of application No. 12/876,835, filed on Sep. 7, 2010, now abandoned.

(60) Provisional application No. 61/324,212, filed on Apr. 14, 2010, provisional application No. 61/255,342, filed on Oct. 27, 2009.

(51) Int. Cl.
*A01G 9/02* (2006.01)

(52) U.S. Cl.
USPC ............................................................ 47/65.5

(58) Field of Classification Search
USPC ..................................... 47/1.01 R, 65.5, 66.6
See application file for complete search history.

(56) References Cited

U.S. PATENT DOCUMENTS

| | | | | |
|---|---|---|---|---|
| RE16,681 E | * | 7/1927 | Schleich | 119/469 |
| 2,626,483 A | | 1/1953 | Service | 47/30 |
| 2,718,873 A | * | 9/1955 | Buckner | 119/711 |
| 3,105,327 A | | 10/1963 | Gasper | 47/47 |
| 3,214,865 A | | 11/1965 | Rosenvold et al. | 47/29.2 |
| 3,373,525 A | | 3/1968 | Cavataio | 47/21.1 |
| D336,557 S | | 6/1993 | Wade | D30/160 |
| 5,528,858 A | * | 6/1996 | Omdahl | 47/84 |
| D380,879 S | | 7/1997 | Hernandez | D30/160 |
| 5,687,505 A | | 11/1997 | Haufler et al. | 47/72 |
| 6,945,195 B1 | | 9/2005 | Morrison | 119/707 |
| 7,150,245 B2 | | 12/2006 | Lamstein | 119/711 |
| 2002/0121243 A1 | | 9/2002 | Martyn | 119/28.5 |
| 2002/0174838 A1 | | 11/2002 | Crane et al. | 119/707 |
| 2005/0060931 A1 | * | 3/2005 | White | 47/65.5 |
| 2005/0076565 A1 | | 4/2005 | Terrell | 47/65.8 |
| 2006/0137624 A1 | | 6/2006 | Lamstein | 119/711 |
| 2007/0266625 A1 | | 11/2007 | Markis et al. | 47/31 |
| 2007/0295282 A1 | | 12/2007 | Lamstein et al. | 119/706 |
| 2008/0184938 A1 | | 8/2008 | Lipscomb et al. | 119/51.03 |
| 2011/0094155 A1 | * | 4/2011 | Tompkins | 47/66.6 |
| 2011/0265374 A1 | * | 11/2011 | Tompkins, Iv | 47/31.1 |

FOREIGN PATENT DOCUMENTS

EP 0 808 566 11/1997

* cited by examiner

*Primary Examiner* — Frank T Palo
(74) *Attorney, Agent, or Firm* — Seed IP Law Group PLLC

(57) ABSTRACT

A device for holding objects that are attractive to the senses of animals, including a device for protecting a live catnip plant for use by a cat, the device in one form having a protective enclosure defining an interior to receive the object, such as the plant and plant supporting medium, the cage including a plurality of bars spaced apart to prevent or restrict access to the interior and direct contact with the object while allowing liquid, air, and light to pass through the bars to sustain the plant life and allowing the plant to grow through the bars to the exterior of the device for access by the cat. A watering cap in a top of the cage distributes water to the plant inside the enclosure. A cat toy, scratching surface, or platform or combination thereof may be incorporated into or associated with the enclosure.

30 Claims, 79 Drawing Sheets

PET TOY

BACKGROUND

1. Technical Field

The present disclosure is directed to enclosures that hold objects that are attractive to the senses of animals and, more particularly, to protective enclosures for odiferous objects, such as live plants in a supporting medium, and which may have a cat toy, scratching surface or platform, or combination thereof associated therewith.

2. Description of the Related Art

A number of cat products have been proposed that utilize dried catnip or catnip derivatives to enhance a feline's interest in the product. Such products include stuffed toys, balls, and scratching posts. Dried catnip and catnip oils, however, lack the potency of live catnip and do not attract or affect the cat as well as a live catnip plant.

For example, U.S. Pat. No. 7,150,245 describes catnip encased in a pet toy in the shape of a sphere having a hollow interior that contains a quantity of dried catnip. The sphere is made of materials that permit catnip odors to emanate from the interior to the exterior of the sphere. This device can only hold dried catnip.

U.S. Patent Publication No. 2002/0174838 describes a refillable catnip toy having different configurations in which dried catnip is received in the interior of the toy and holes through the exterior wall of the toy permit the smell of the catnip to be detected by the cat. The disadvantage is that particles of the catnip can fall through the openings, creating an unsightly appearance where the toy is used by the cat.

U.S. Design Pat. No. 380,879 shows a weighted cat toy figurine with a catnip-filled head. As is evident from the drawings of this design patent, the head portion can only receive dried catnip and would not sustain a live catnip plant.

While catnip plants are easy to obtain and grow, they are easily killed by cats when played with or completely eaten if a cat is allowed unlimited access to the plant. This makes it very difficult to cultivate catnip when cats are present and impossible for the cat to enjoy the plant more than once or twice before the plant is gone.

BRIEF SUMMARY

The present disclosure is directed to protective enclosures for use with animals, particularly pets, that exhibits a detectable object having features that attract the animal to the object while preventing direct access.

In accordance with one aspect of the present disclosure, a device to display and protect an object that provides an attractive odor to an animal is provided, the device including a protective enclosure having an interior configured to receive the object, the enclosure structured to admit light, liquid, and air to the interior and to permit the odor to permeate outside of the enclosure and to further enable the animal to visually perceive the object in the interior of the enclosure, the protective enclosure further structured to permit limited access by the animal to the interior while preventing direct contact with the object by the animal.

In one aspect of the present disclosure, a live catnip protective enclosure is provided that not only protects the plant but enables the plant to sustain its life while at the same time providing an attraction for the cat.

In accordance with one aspect of the present disclosure, a device is provided that includes a container for a live catnip plant, a protective enclosure that admits light and air to the plant and permits the fragrance of the plant to emanate outside of the device while enabling a cat to see the plant inside the device.

In accordance with another aspect of the present disclosure, the enclosure allows the live catnip plant to be watered, fertilized, and otherwise cared for without leaking of the water and fertilizer, and without allowing the cat or other animal to have unrestricted access to the plant.

In accordance with another aspect of the present disclosure, the device includes an auxiliary or accessory toy attached to the device, such as with a string, a flexible resilient wire, an elongate post, or other similar attachment member.

In accordance with yet a further aspect of the present disclosure, at least a portion of the device that provides scratching material or a scratching surface for the cat.

In accordance with yet a further aspect of the present disclosure, the device includes the live catnip plant as a commercial product. Alternatively, a fragrance dispenser or diffuser can be used inside the enclosure, either alone or in combination with a live plant.

In accordance with still yet a further aspect of the present disclosure, a secure door-like access is provided to the interior of the device to facilitate care and replacement of the plant. Alternatively or in addition, the enclosure can be designed to provide limited access into the interior while still preventing complete contact with the inside the enclosure. In other words, an animal, such as a cat, can reach a portion of the plant but is kept from unlimited access that could result in the plant's demise.

In accordance with still yet a further aspect of the present disclosure, the enclosure has a bottom that allows the device to rock back and forth and is weighted in such a way as to be self-centering to remain in an upright position when not disturbed.

BRIEF DESCRIPTION OF THE SEVERAL VIEWS OF THE DRAWINGS

The foregoing and other features and advantages of the present disclosure will be more readily appreciated as the same become better understood from the following detailed description when taken in conjunction with the accompanying drawings, wherein.

DETAILED DESCRIPTION

Figure 1:
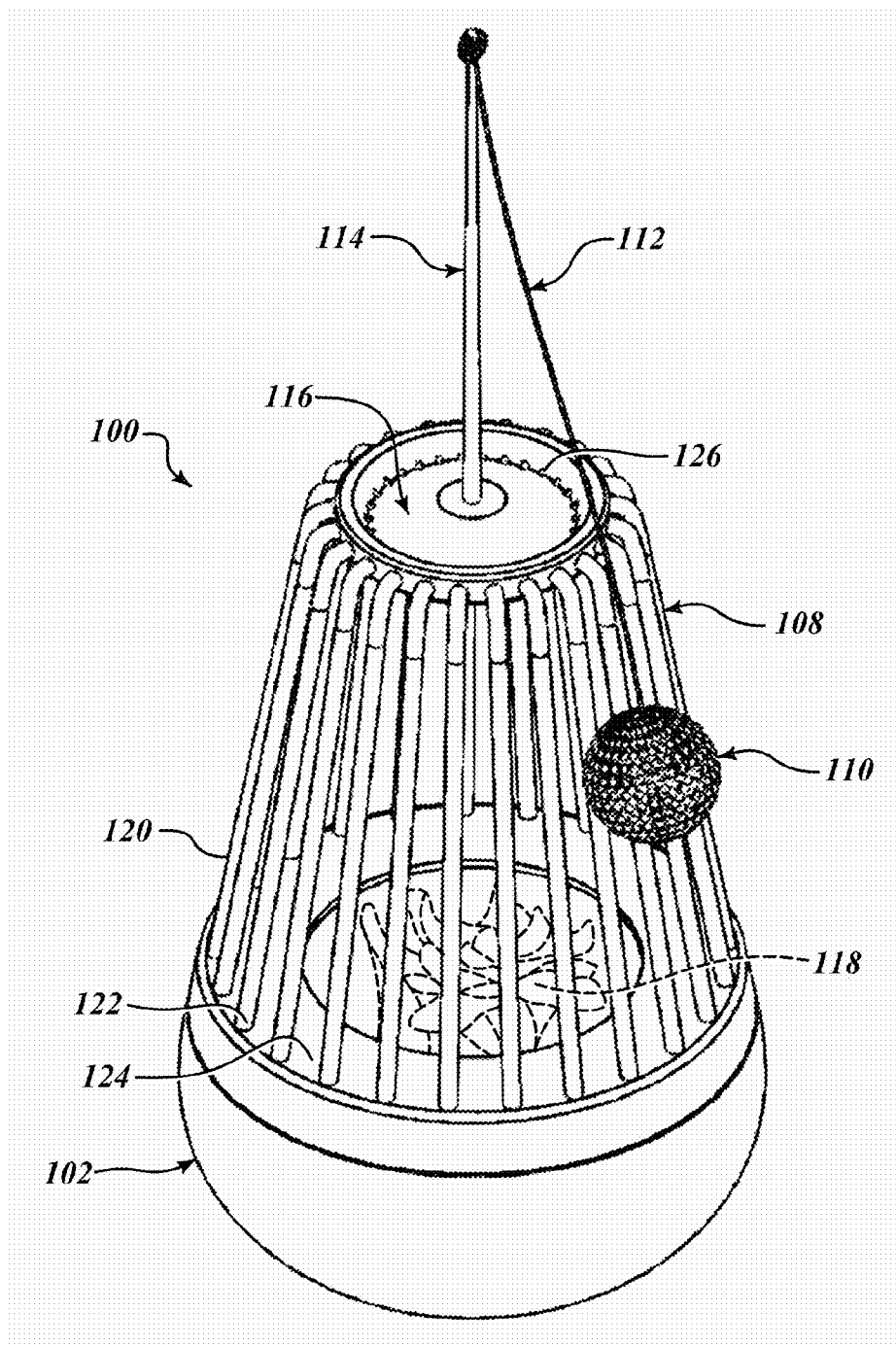
FIG. 1 is an isometric view of a first embodiment of the present disclosure.
Figure 2:
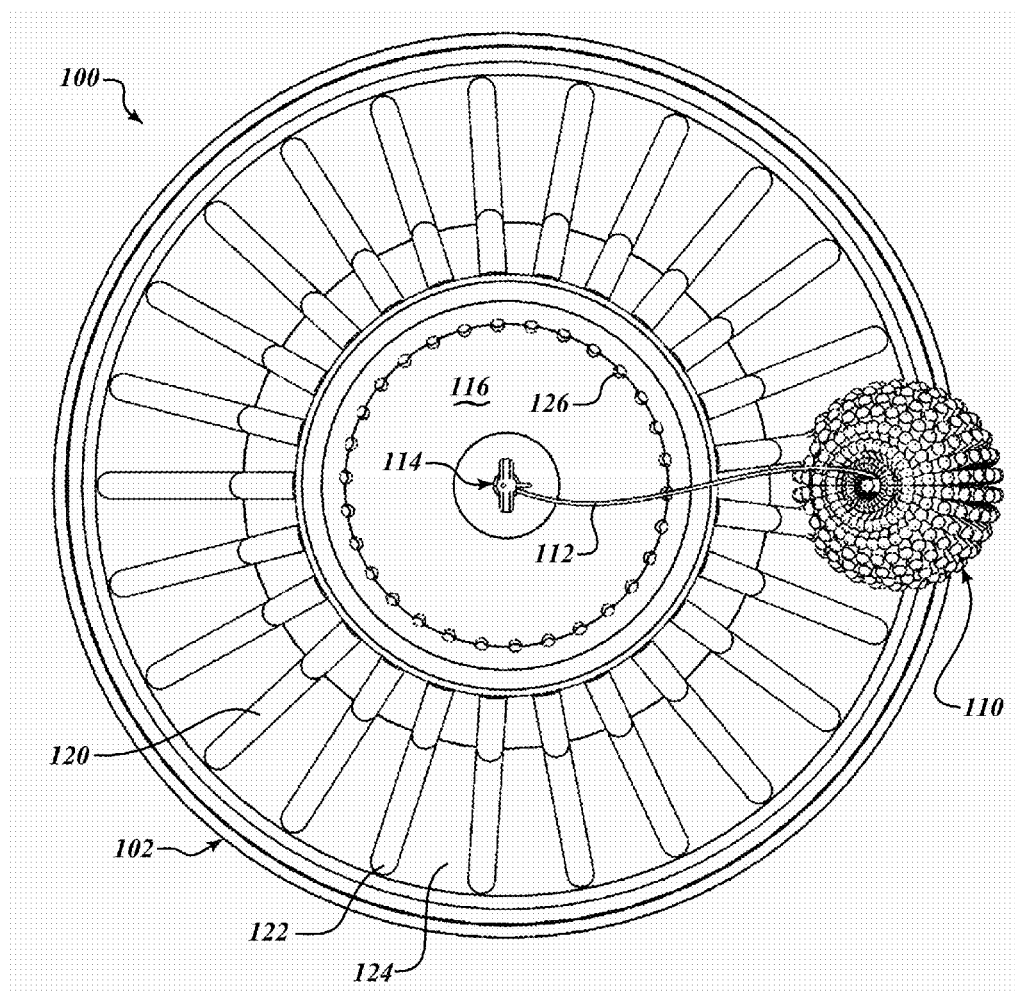
FIGS. 2-7 are top, bottom, front, back, right, and left side plan views, respectively, of the embodiment of FIG. 1.
Figure 3:
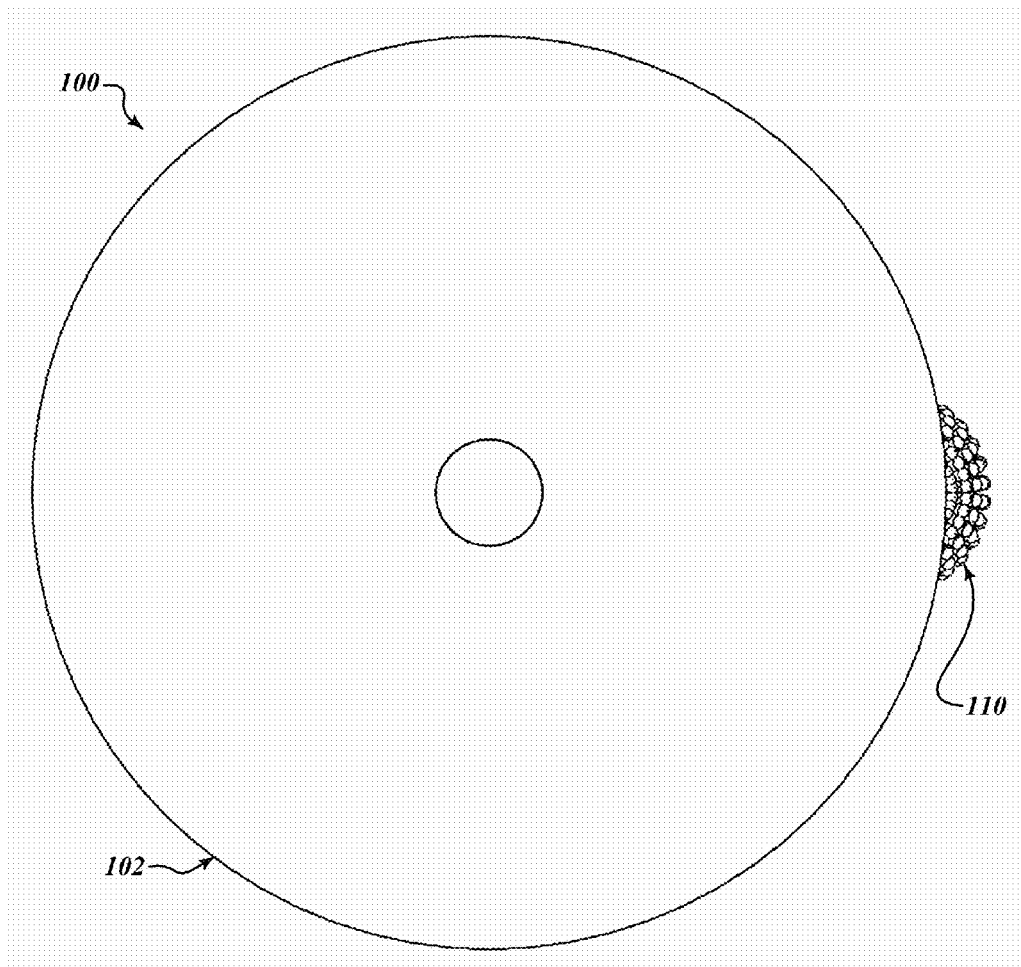
Figure 4:
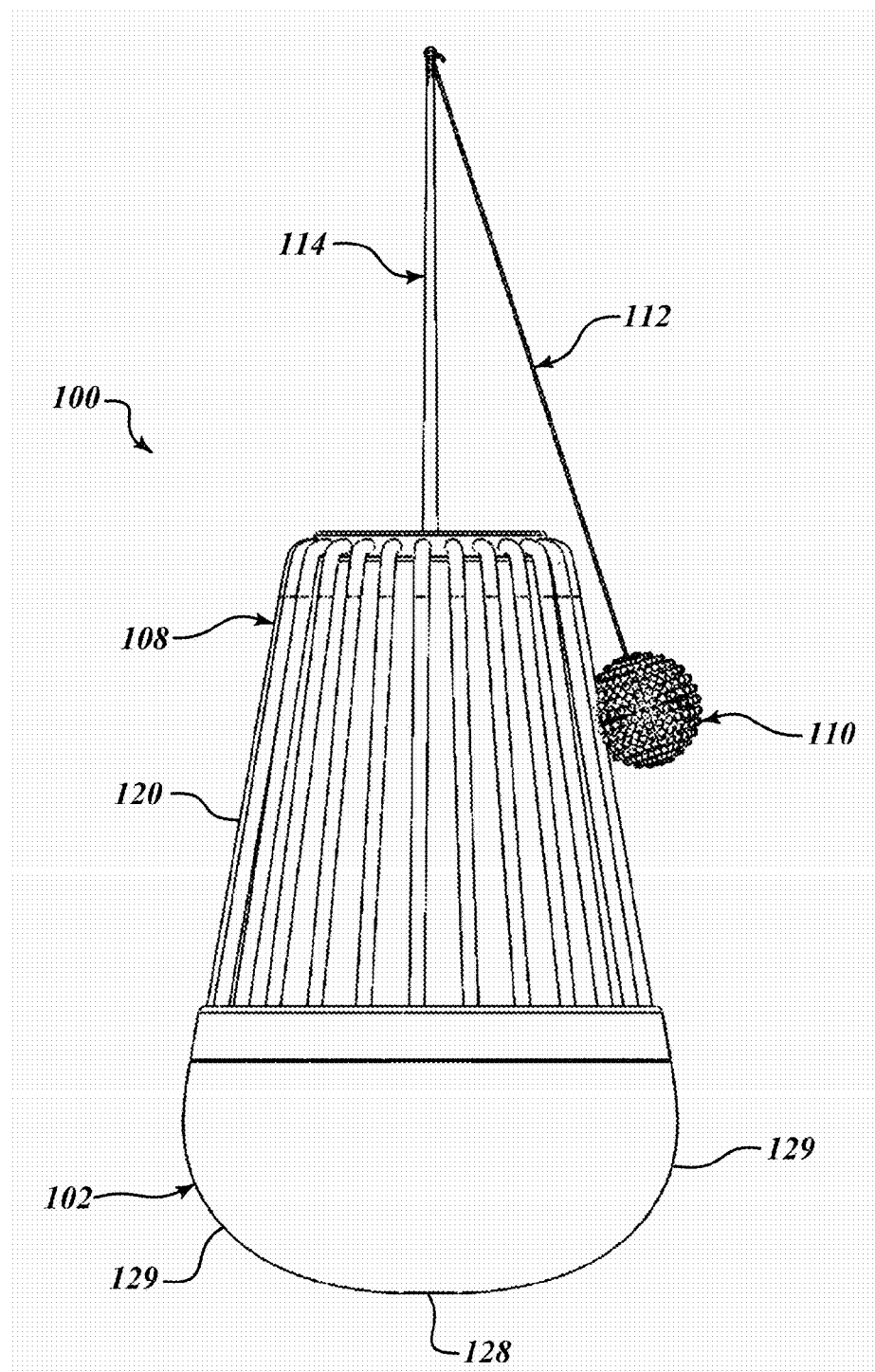
Figure 5:
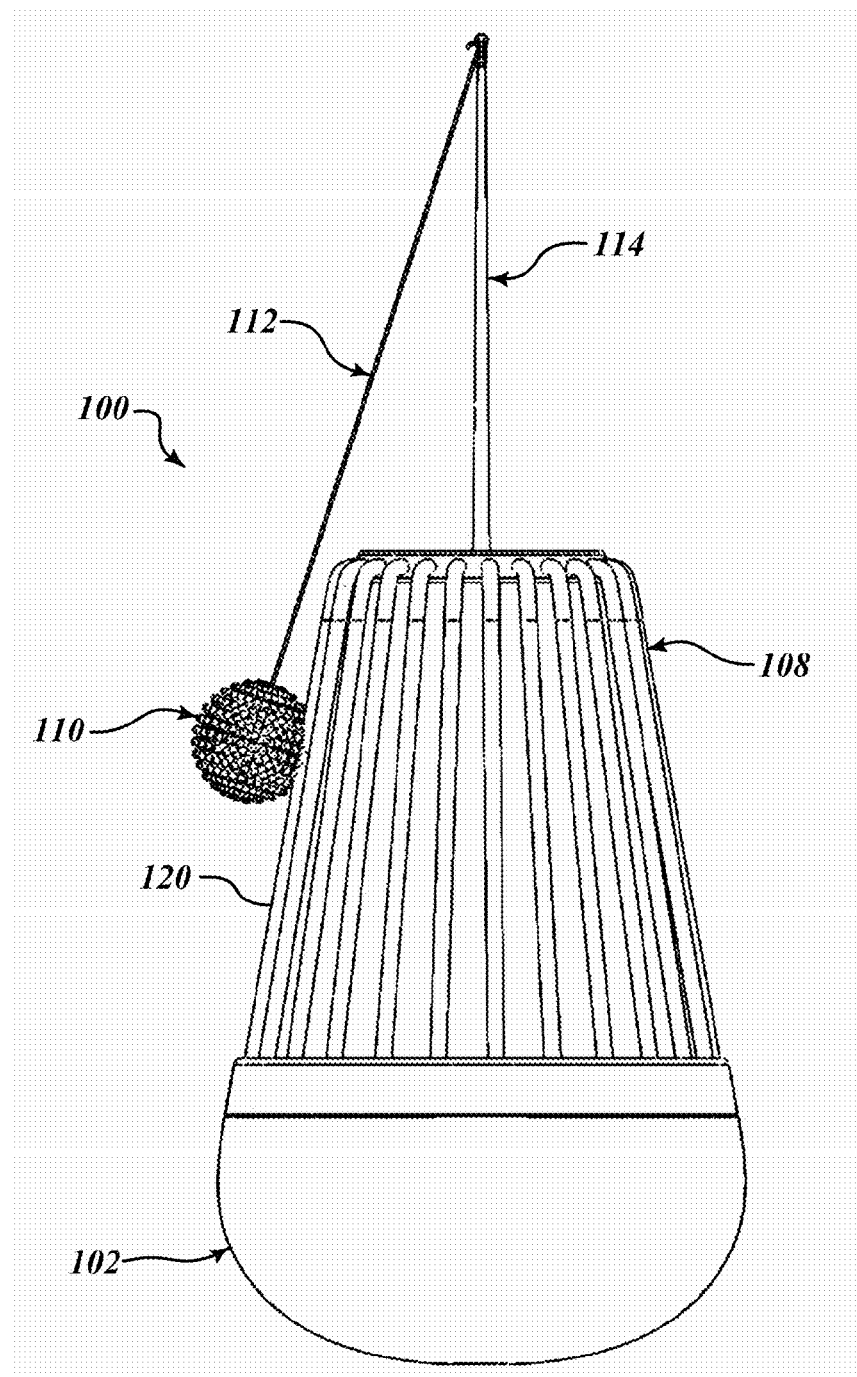
Figure 6:
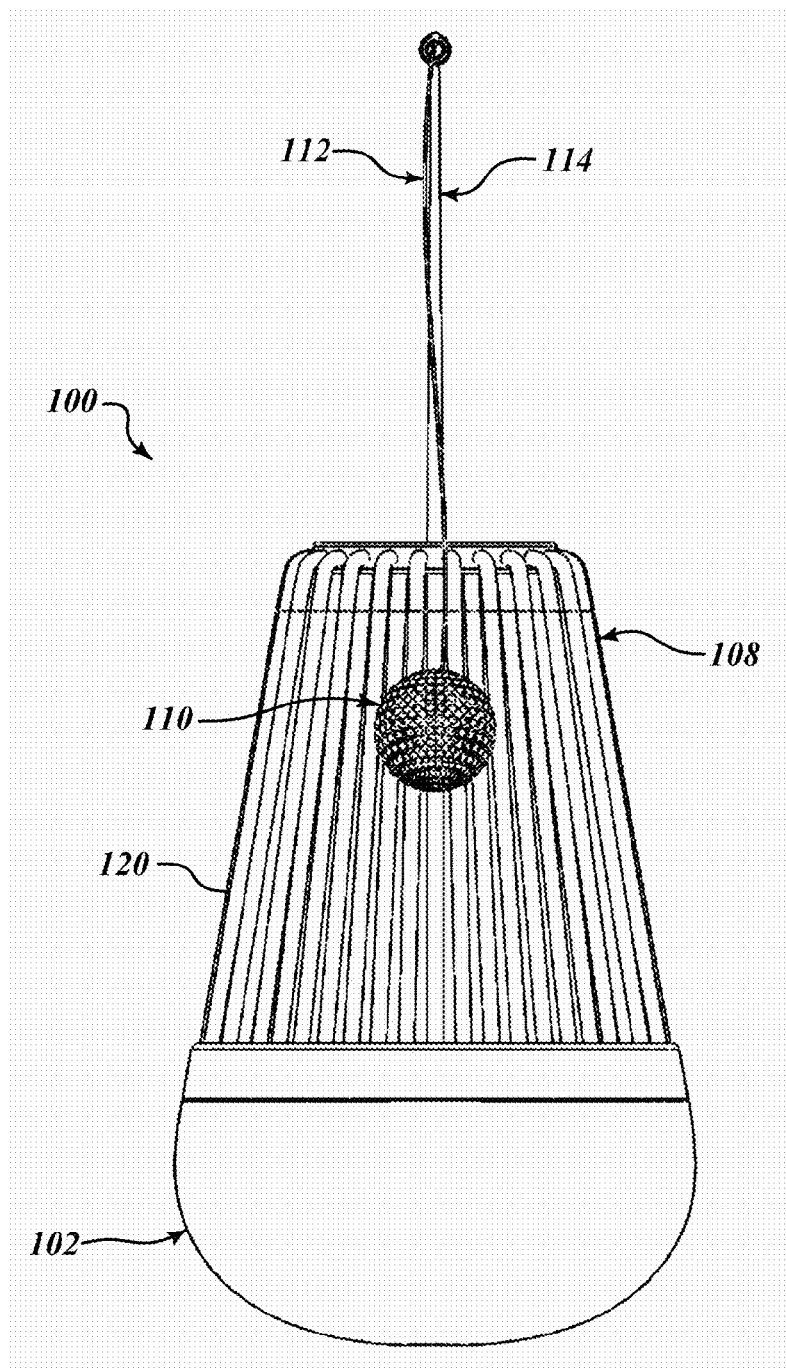
Figure 7:
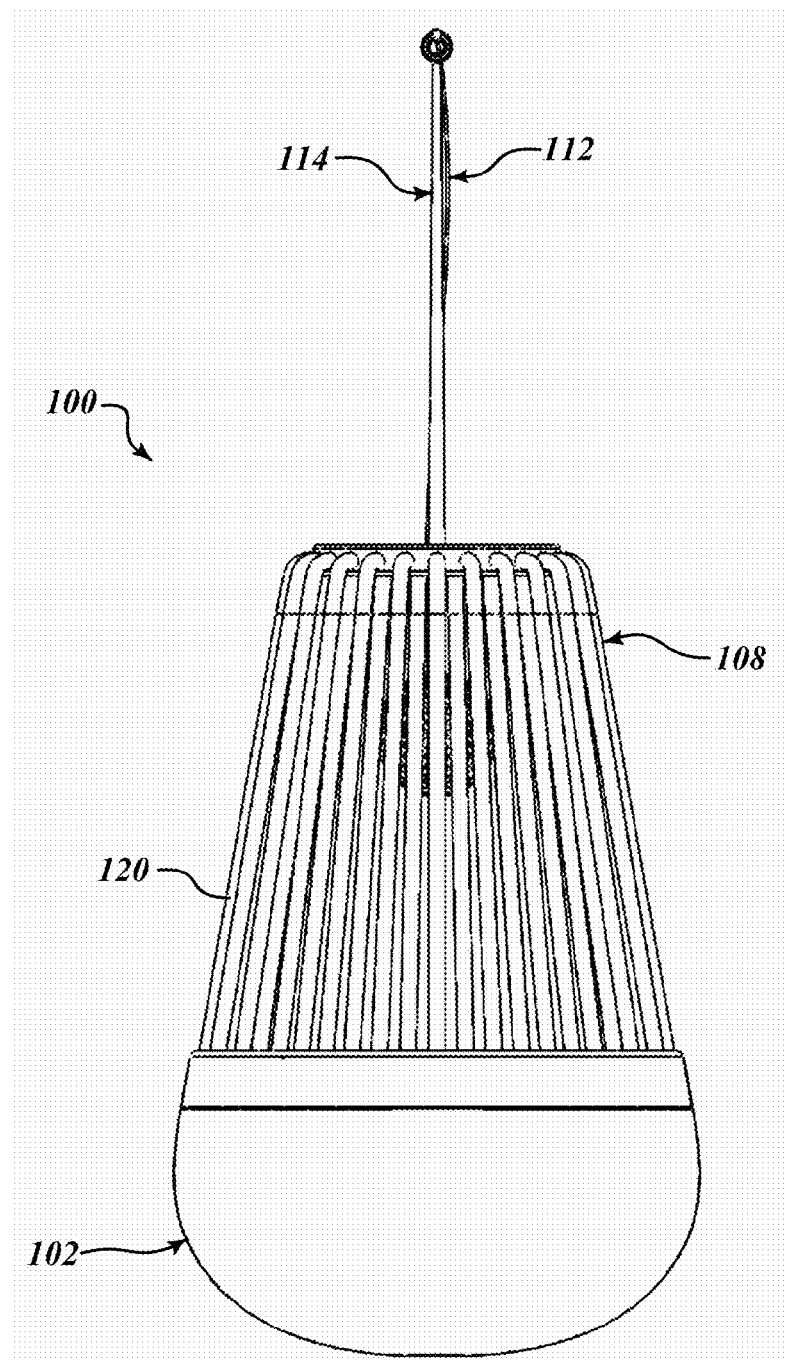

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with plants and cat toys have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its broadest sense, that is as meaning "and/or" unless the content clearly dictates otherwise.

The headings and Abstract of the Disclosure provided herein are for convenience only and do not interpret the scope or meaning of the embodiments.

The terms scent, fragrance, and aroma as may be used herein are intended to mean any odor detectable by an animal that is attractive to the animal. In other words, the scents, fragrances, and aromas used in connection with the present disclosure are intended to be perceived by an animal's sense of olfaction in a manner that draws the animal to the source. While some objects or compounds associated with an object may present a malodor to humans, such are not necessarily excluded from the present disclosure. Although the protective enclosures in their various manifestations described herein are intended for indoor use, they can be used outdoors if desired so long as they are protected sufficiently from the elements or are constructed of materials that can withstand the elements.

Generally, a device is provided herein that is structured to display and protect an object having an attractive odor to an animal. Broadly, the device includes a protective enclosure having an interior configured to receive the object, the enclosure structured to admit light, liquid, and air to the interior and to permit the odor to permeate outside of the enclosure and to further enable the animal to visually perceive the object in the interior of the enclosure, the protective enclosure further structured to permit limited access by the animal to the interior while preventing direct contact with the object by the animal.

Figure 8:
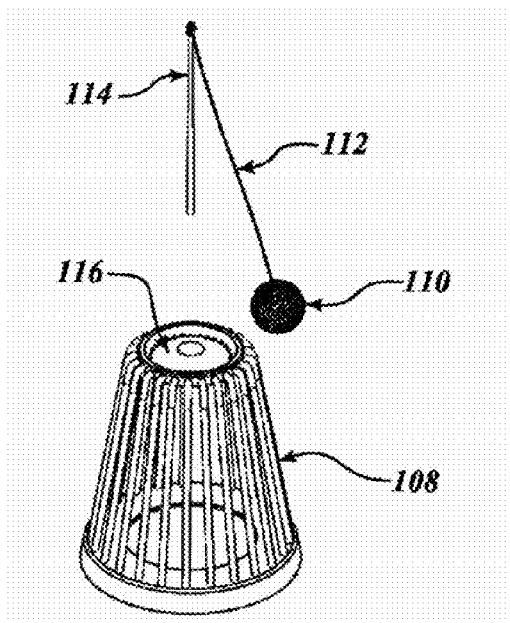
FIG. 8 is an exploded isometric view of the device of FIG. 1.
Figure 8:
Figure 8:
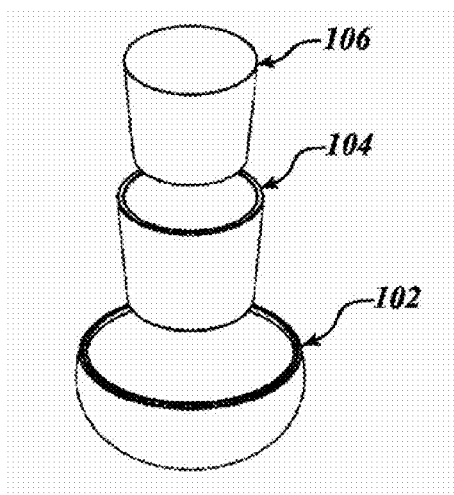
Figure 9:
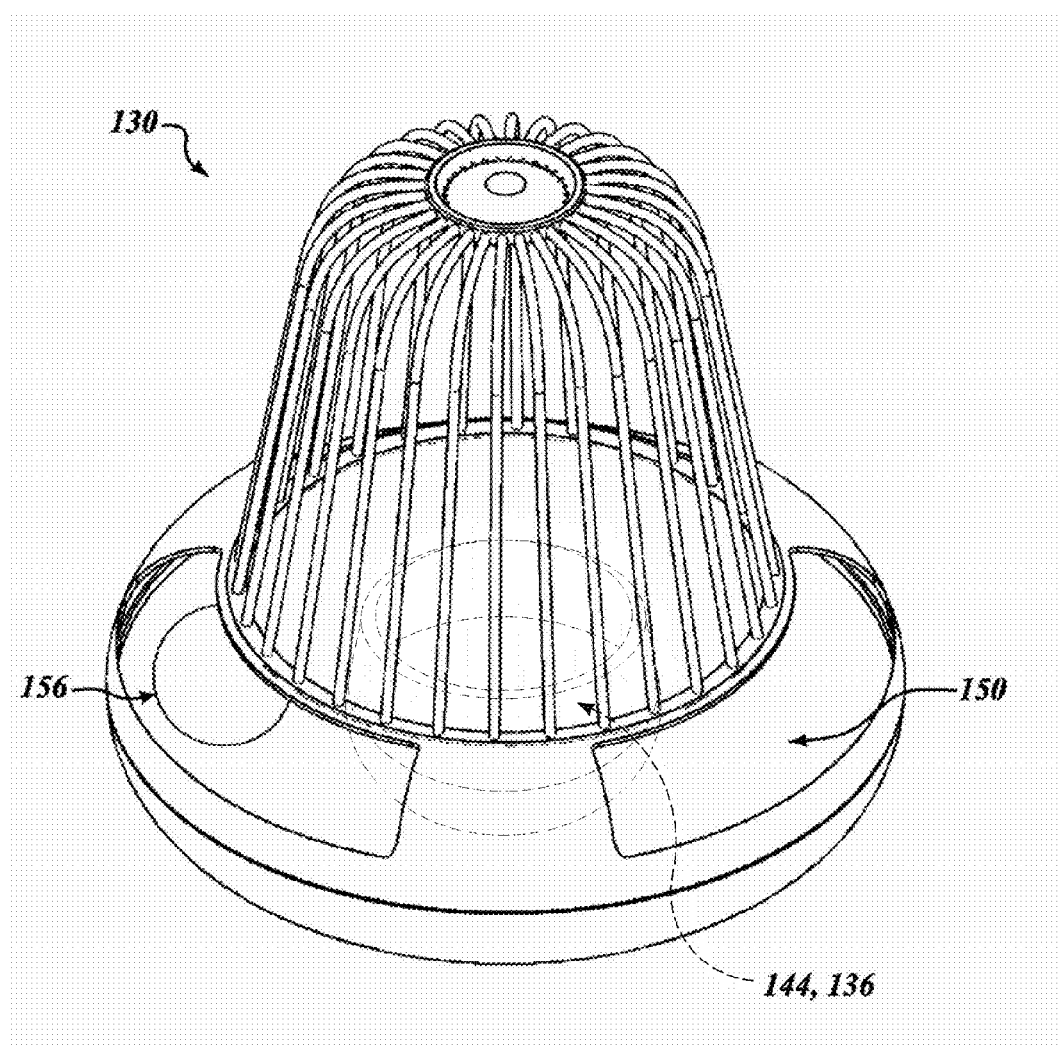
FIG. 9 is an isometric view of a second embodiment of the present disclosure.
Figure 10:
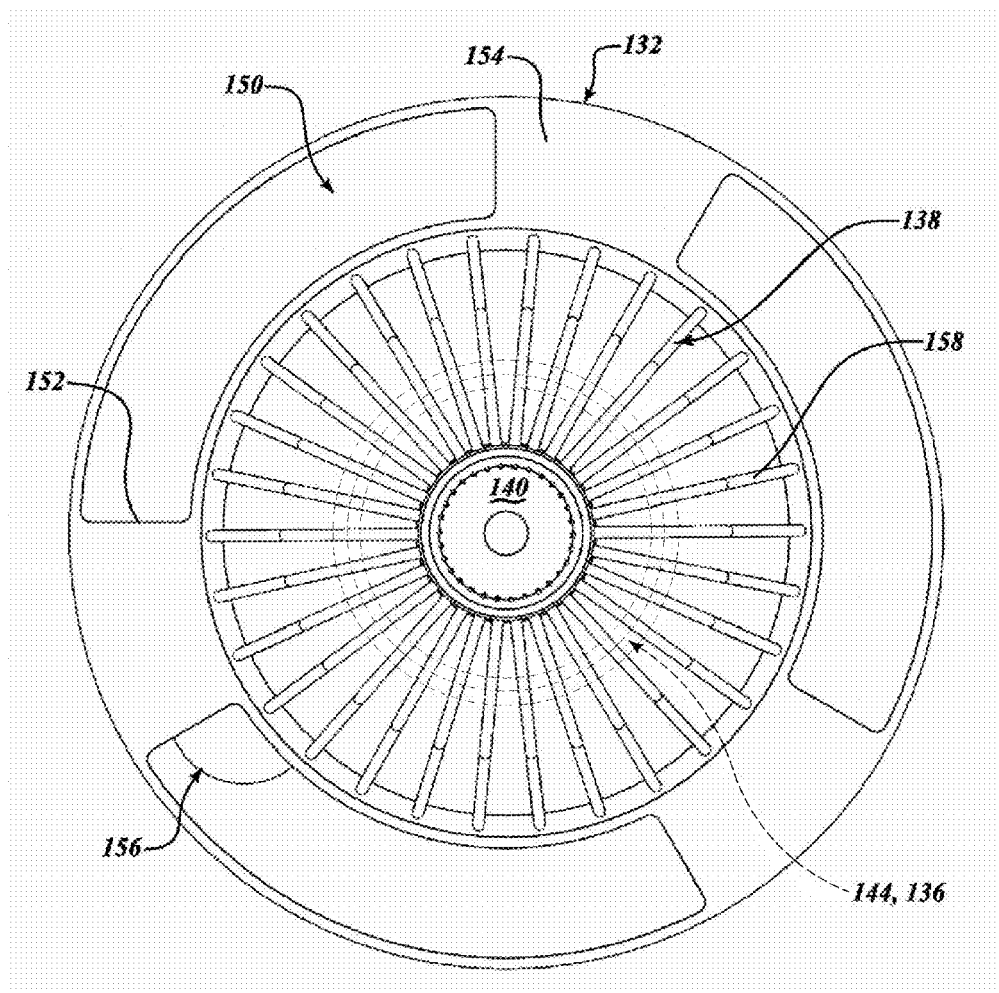
FIGS. 10-15 are top, bottom, front, back, right, and left plan views, respectively, of the second embodiment of FIG. 9.
Figure 11:
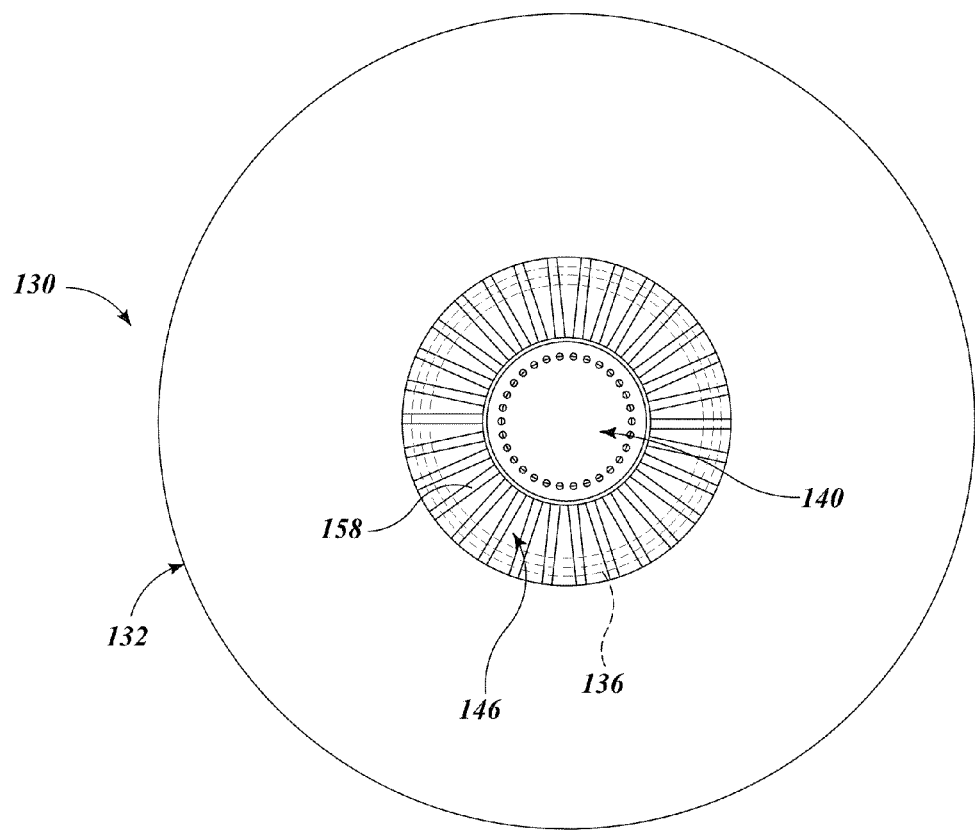
Figure 12:
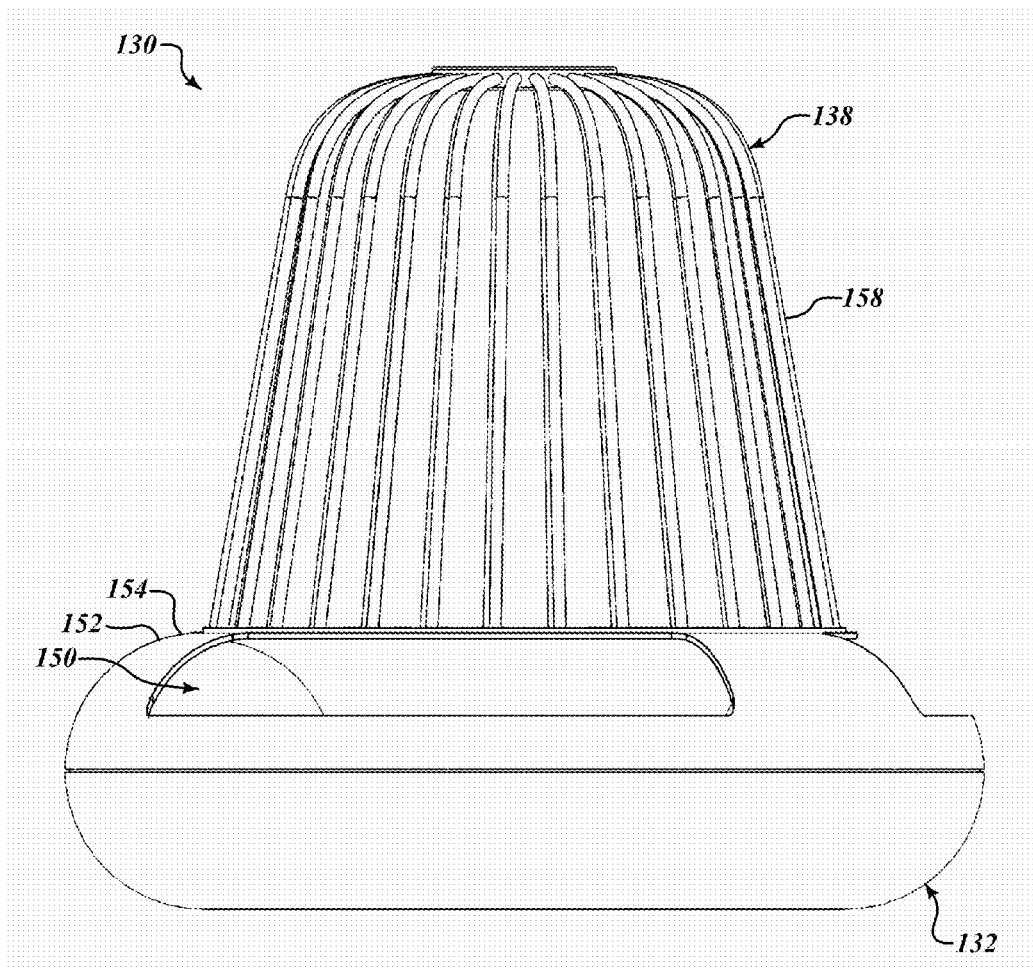
Figure 13:
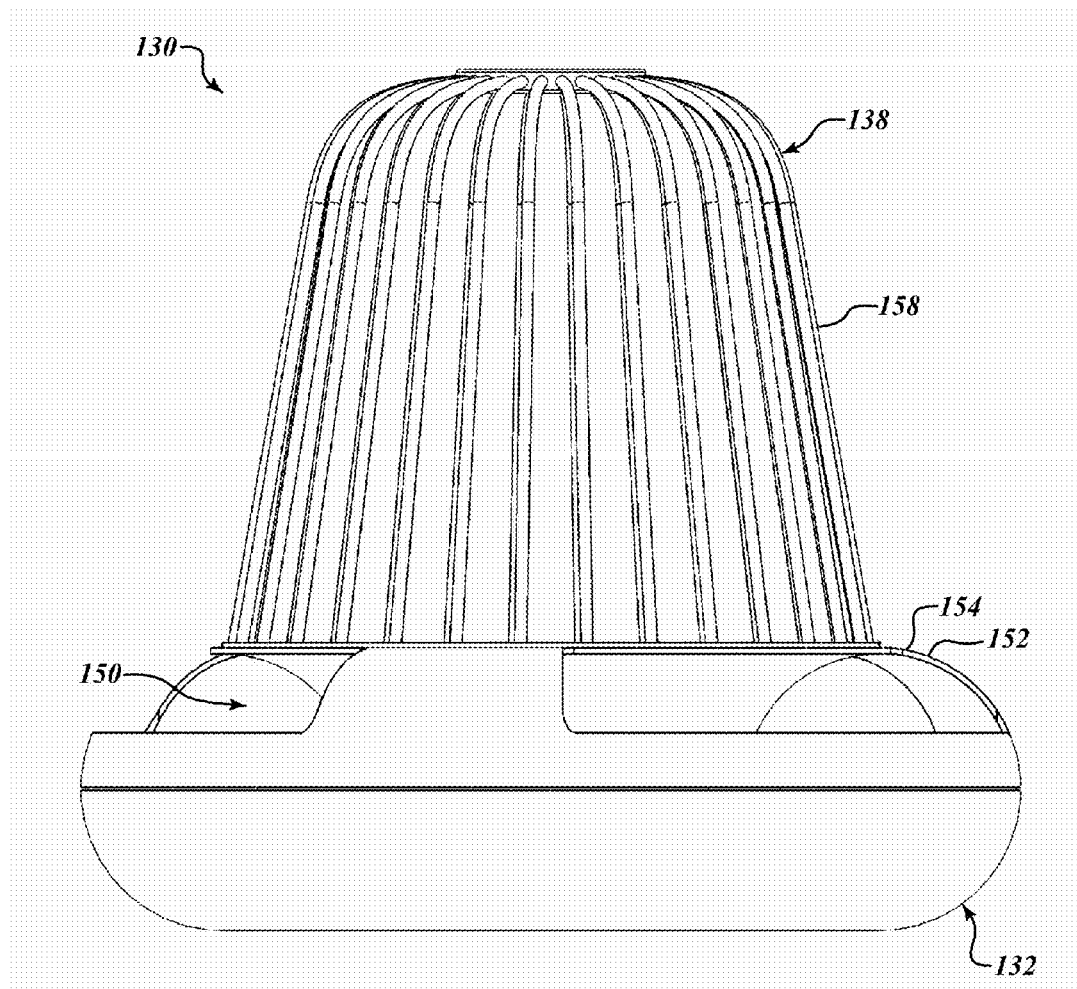
Figure 14:
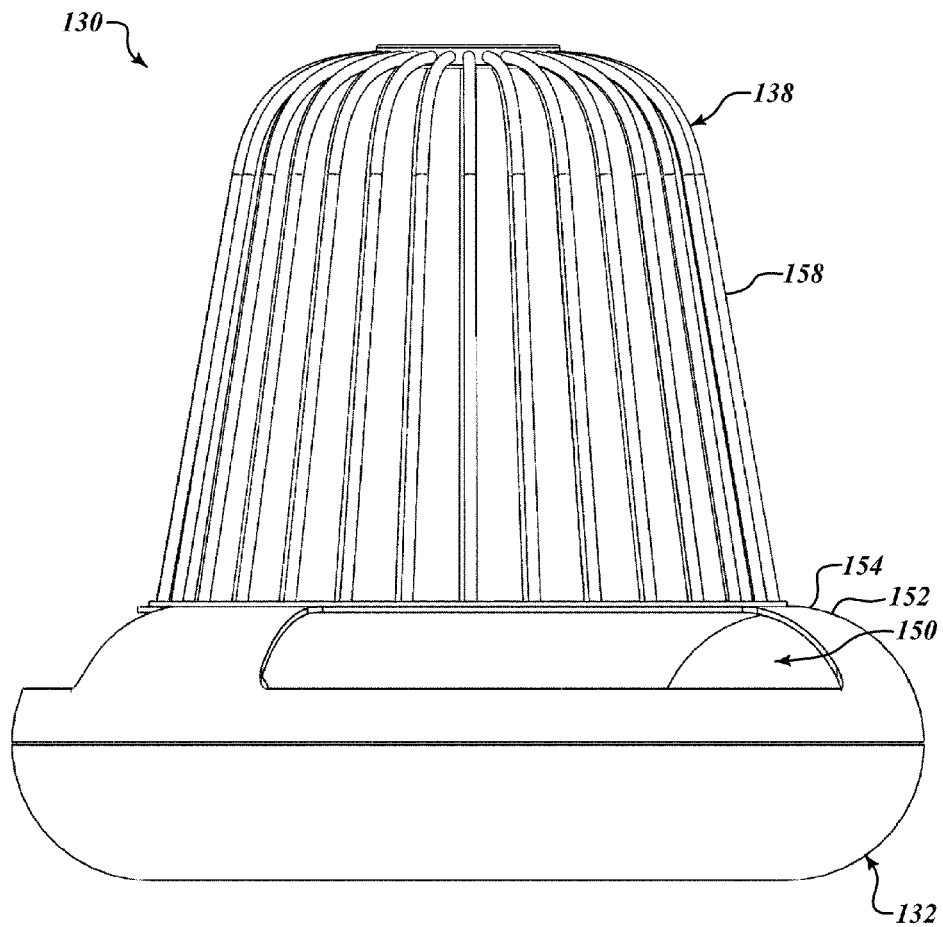
Figure 15:
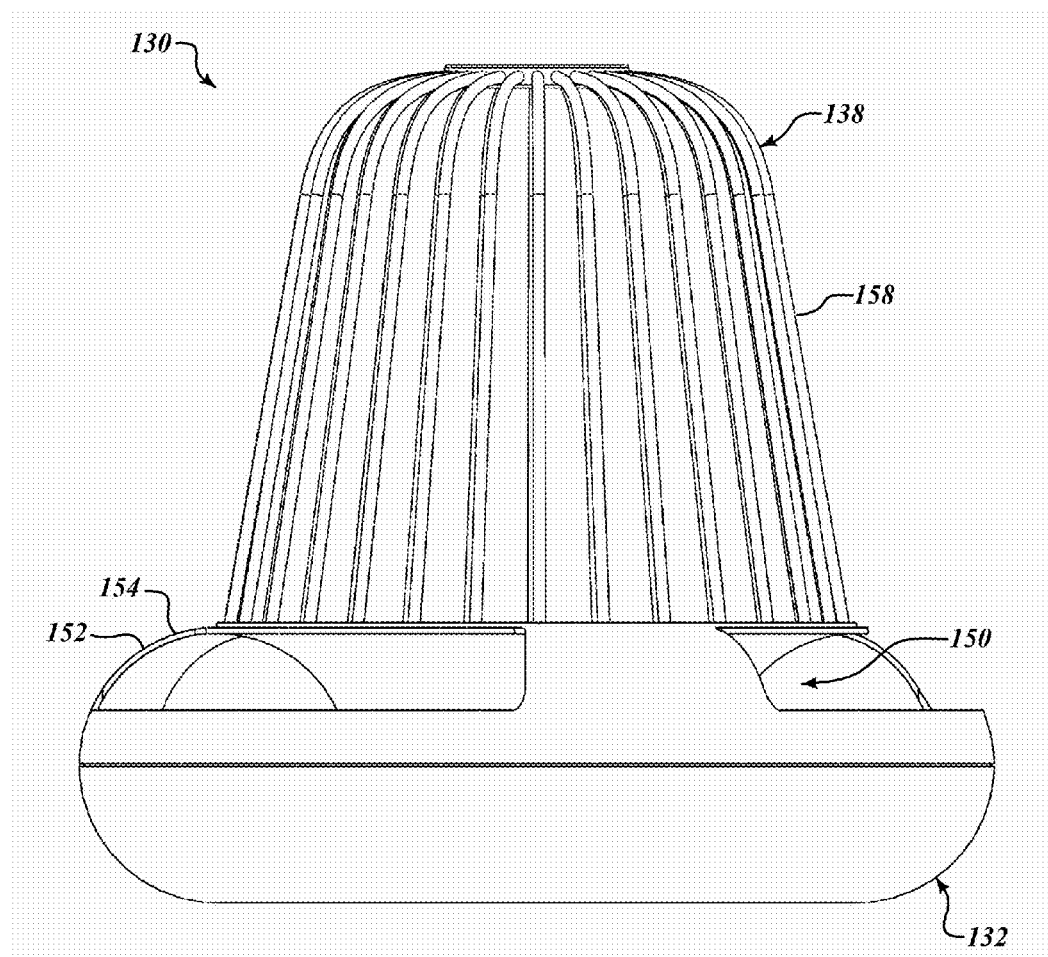

Referring initially to FIG. 1, shown therein is a first embodiment of the present disclosure in the form of a wobbling live catnip cat toy 100. The main components of the toy 100 are shown more clearly in FIG. 8 to include a wobble base 102 formed to have at least a partially semispherical or hemispherical shape and a planter insert 104 that receives a grow sponge 106. A protective enclosure in the form of a plant cage 108 is provided that fits to the wobble base 102 and encompasses the grow sponge 106 and plant insert 104. The cage 108 can include a watering cap 116 as an optional feature. A ball 110 is attached via an elastic string 112 to a resilient mast 114 that is mounted on the watering cap 116 at the top of the cage 108.

A live catnip plant 118, shown in phantom in FIG. 1, is grown within the grow sponge 106.

The cage 108 includes a plurality of ribs 120 having a first end 122 attached to a ring-shaped base 124 and a second curved end 115 attached to the watering cap 116, which has a smaller diameter than the ring-shaped base 124 to present a truncated cone shape. The ribs 120 are ideally spaced apart to prevent the animal, such as a cat, from reaching its limbs or paws into the interior of the enclosure. Thus, the spacing can be selected for a particular animal or made small enough to prevent most animals or pets from having access to the interior of the enclosure. Alternatively, the ribs 120 can be spaced apart a distance sufficient to allow the animals paws or leg to reach into the enclosure without having direct access to or contact with the object inside the enclosure. The determination of the spacing of the ribs will be a function of the size of the animal and the distance of the object in the interior from the ribs 120. Preferably, the ribs are spaced a distance to provide limited access into the interior while still preventing complete contact with the inside the enclosure. This permits the animal, such as a cat, to reach a portion of the object, in this case a plant, but is kept from unlimited access that could result in the plant's demise or destruction of the object.

In an alternative embodiment (not shown), the ribs can be formed as louvers, preferably vertically oriented, although they may be horizontally oriented, that can be turned in a fashion similar to window blinds, so as to adjust the size of the opening. Known means may be employed for moving the louvers, including individual louver movement or use of a linkage that connects two or more louvers that enables a user to adjust the orientation or position of the louvers relative to the rest of the enclosure.

The weight of the grow sponge 106 and plant insert 104 along with the catnip 118 is used to keep the device 100 in an upright position. Additional weights can be added to the wobble base 102 for further stability. The ribs 120 are spaced apart around the circumference of the device 100 to provide an opening for the fragrance of the catnip 118 to be smelled by the cat. In addition, it provides access for sunlight and oxygen and for watering.

Watering may also be done through the cap 116, such as through openings provided therein or through use of the watering cap in the top, as described below.

The device 100 utilizes the rounded wobble base 102 so that the entire assembly can rock and wobble as it is played with by the cat. The weight of the growth medium for the plant is positioned low enough within the wobble base 102 to provide the stability as described above. That feature in combination with the tall, lightweight top portion, keeps the assembly from being tipped completely over.

To increase attractiveness to the cat and encourage playing, the mast 114 on top has an elastic tether 112 and ball 110 attached thereto. The ball moves around as the assembly or device 100 wobbles, providing a "target" on which the cat can focus its attention.

Ideally, the components are made of injection molded plastic or similar material. The grow sponge or growth medium 106 from which the live catnip plant can simply be dirt or other material that is more stable and not as prone to spilling when the toy moves about. An example would be peat wrapped in a porous mesh or the grow sponge 106.

The planter insert 104 contains the live plant 105 and nests into the wobbler base 102 where it is held in place by the plant cage 108. Ideally, the plant cage can snap into place on the wobbler base 102, although fasteners can be used if desired. A wide lip of the ring-shaped base 124 retains the planter insert 104 in position in the wobbler base 102.

The top 116 of the plant cage 108 has the watering cap 116 configuration so that when water is poured into the cap, it rains down onto the plant as a shower, allowing the plant to be cared for without the need to disassemble the product. Thus, there are openings 126 around the perimeter of the cap 116, which has a dome shape in the center that extends upward from a circumscribing channel having the openings therein. The openings are sized and shaped to admit a sprinkling of water on to the plant 118 in the interior of the enclosure or cage 108. The top of the dome shaped cap may itself be dished and include one or more holes, and holes for watering may also be formed in the convex side of the dome.

It will be noted in the side and front and rear plan views that the wobble base 102 has a cross-sectional configuration that is not hemispherical or semicircular. In other words, the bottom surface 128 of the wobble base 102 has a flat section that provides stability to maintain the device 100 in an upright position. Thus, the sides 129 of the wobble base 102 can have a semicircular or arcuate shape that meets with the flat base 128 to permit rocking or wobbling of the base 102 while the flat section 128 provides stability and maintains the device 100 in an upright position.

The radius of curvature of the sides 129 and the length of the flat base 128 are not critical and are a matter of design ornamentation in order to provide a pleasing appearance. This is also true for the shape and size of the ribs 120 in terms of their cross-sectional diameter, as well as their length and radius of curvature at the second end 115. The height and shape of the mast 114 is also a matter of design ornamentation. Moreover, the dome or cap 116 has a preferred dome shape, although the radius of curvature of the dome remains a matter of style and cosmetic appearance. Thus, while the overall appearance, including size and shape of the various embodiments illustrated and described herein, as well as certain components thereof, is a matter of cosmetics and ornamentation, the functional features described herein are to be considered apart from the cosmetic aspects of the design.

Figure 16:
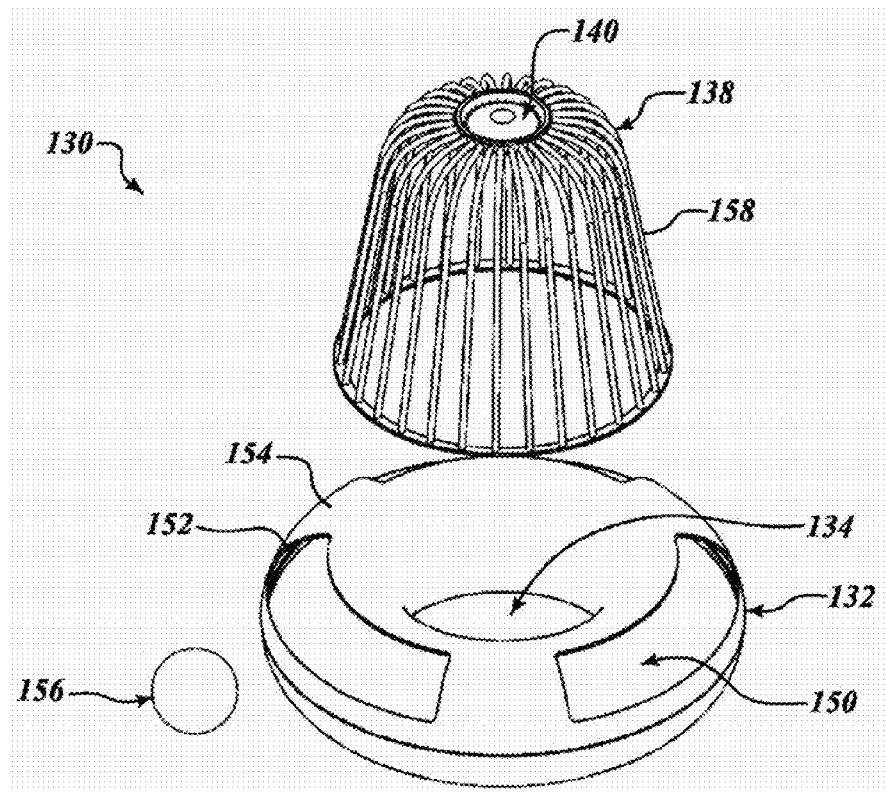
FIG. 16 is an exploded isometric view of the second embodiment of FIG. 9.
Figure 16:
Figure 16:
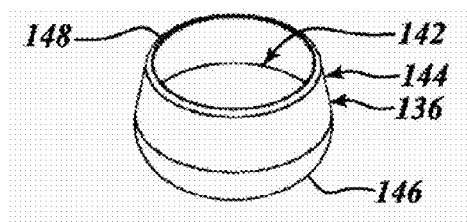
Figure 17:
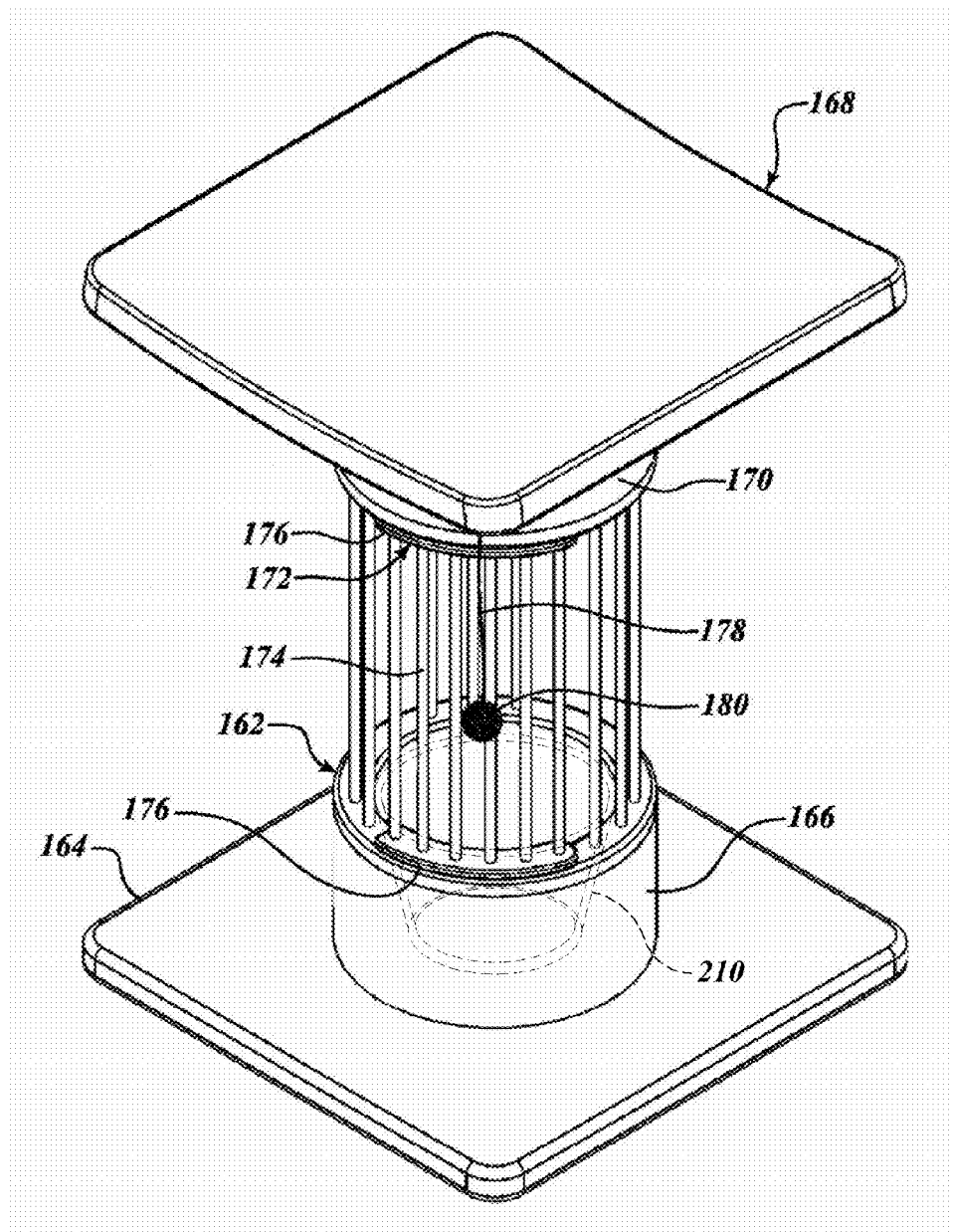
FIG. 17 is an isometric view of a third device formed in accordance with the present disclosure.

Referring next to FIGS. 9-13, shown therein is a second device formed in accordance with the present disclosure. The second device 130 is a ball ring version of the live catnip cat toy 100 shown in FIGS. 1-8. More particularly, this embodiment provides an interactive toy for the cat. As shown in the exploded view of FIG. 16, this embodiment includes three main components: (a) a ball ring 132 having a donut shape with a central axial opening 134, (b) a plant pot 136 sized and shaped to be received within the opening 134, (c) and a cage top 138 with watering cap 140. The plant pot is sized and shaped to receive a live catnip plant within a hollow interior 142. The interior is circumscribed by an exterior wall 144, the diameter of which decreases from the open bottom 146 toward the top 148.

The ball ring 132 has a hollow interior 150 seen through cutouts 152 in the sidewall 154 of the ring 132. A ball 156 is sized and shaped to be retained inside the interior 150 of the ring 132 so that it can be reached through the opening 152 without being extracted through the opening 152. Thus, the diameter of the ball 156 is larger than the width or length of the access opening 152 in the ball ring 132. This facilitates playing with the ball by a cat, which can reach in and interact with the ball without removing it.

The cage 138 has the watering cap 140 similar to the watering cap 126 in the embodiment described in FIGS. 1-8. The cage 138 includes a plurality of ribs 158 with a similar truncated cone shape described above with respect to the cage 108 of the device 100 in FIGS. 1-8.

In this embodiment, the device 130 is preferably made of injection molded plastic or similar material. The ball ring 132 is glued, or in some similar way, permanently attached to the cage 138 so that the cage 138 sits around the pot 136 to protect the plant. The cap 140 allows water to be poured into the pot 136 to sustain the life of a plant contained therein. Thus, as water is poured into the water cap 140, it rains out onto the plant in a shower pattern.

It will be appreciated that the cage 138 has a different appearance than the cage 108 of the previous embodiment. This is a matter of cosmetics and appearance and does not affect the function of the toy 130. In this embodiment, the toy 130 does not rock or roll. Rather, it remains stationary on a supporting surface.

It is to be appreciated that aside from the functional features described above, there are many ornamental aspects to this particular embodiment, including the size and shape of the openings 150, the radius of curvature of the ball ring, the taper and shape of the plant pot 136, as well as the sizing and shaping of the cage 138 and water cap 140.

Turning next to FIGS. 17-25, shown therein is a third embodiment of the present disclosure in which the device or toy 160 is formed to have a cage 162 supported on a substantially flat, rectangular base 164 having a platform 166 separating and elevating the cage 162 from the base 164. A top 168 having a similar size and shape to the base 164 is supported above the cage 162 by an extension piece 170 that is similarly sized and shaped to the platform 166.

Figure 18:
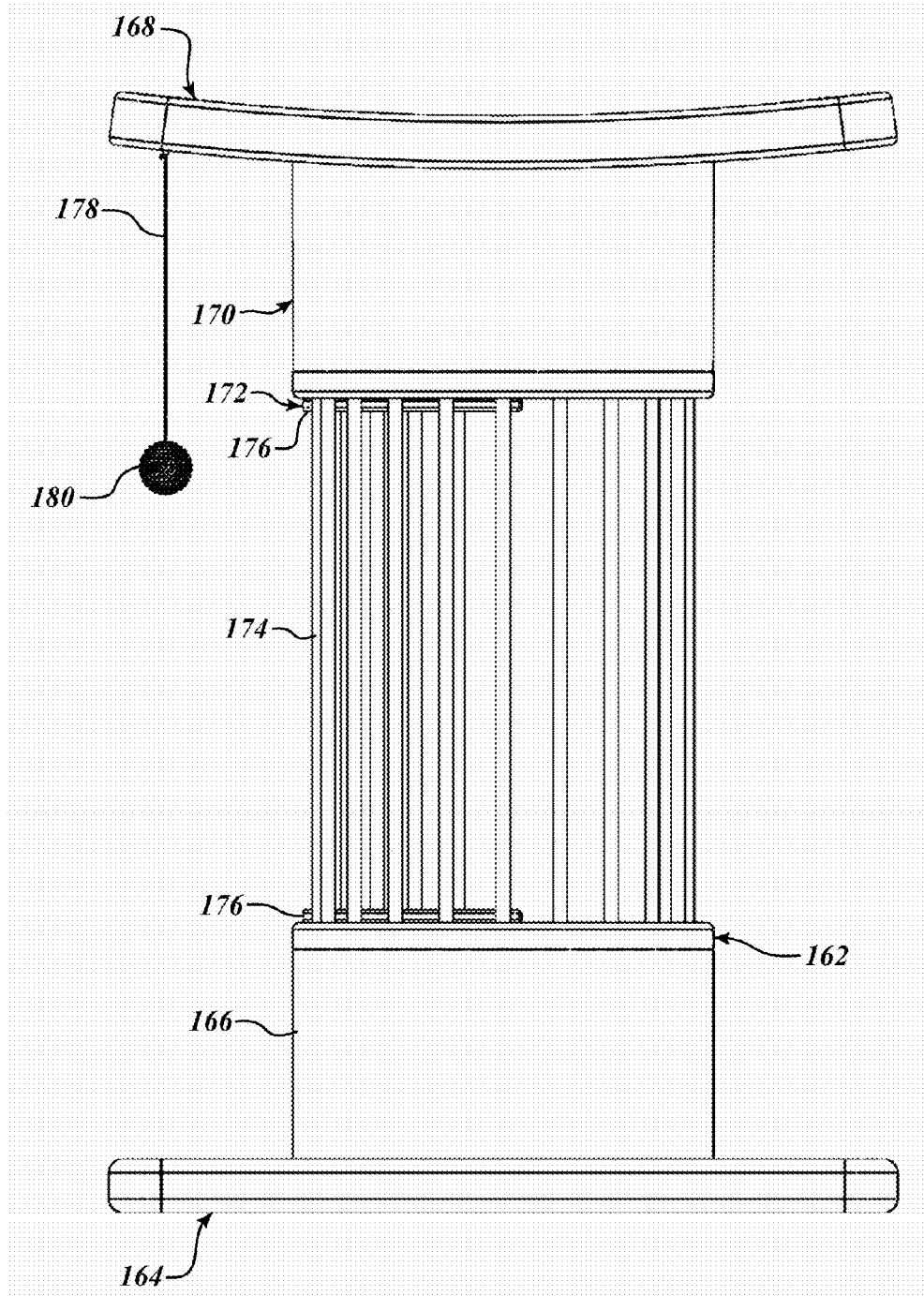
FIG. 18 is an isometric view of the device of FIG. 17 showing the door in an opened configuration.
Figure 19:
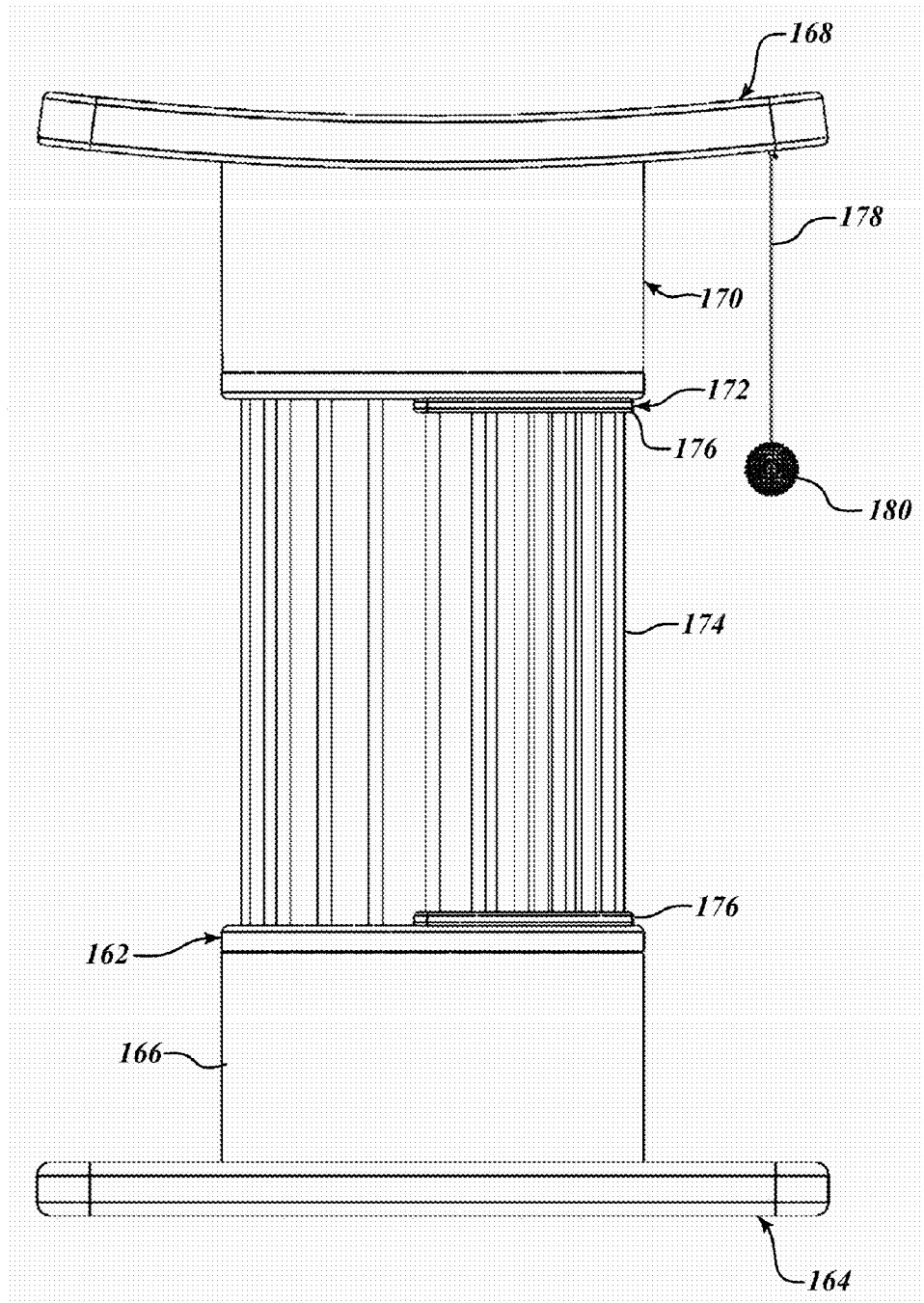
FIGS. 19-24 are top, bottom, front, back, right, and lift side plan views, respectively, of the third embodiment of FIG. 17.
Figure 20:
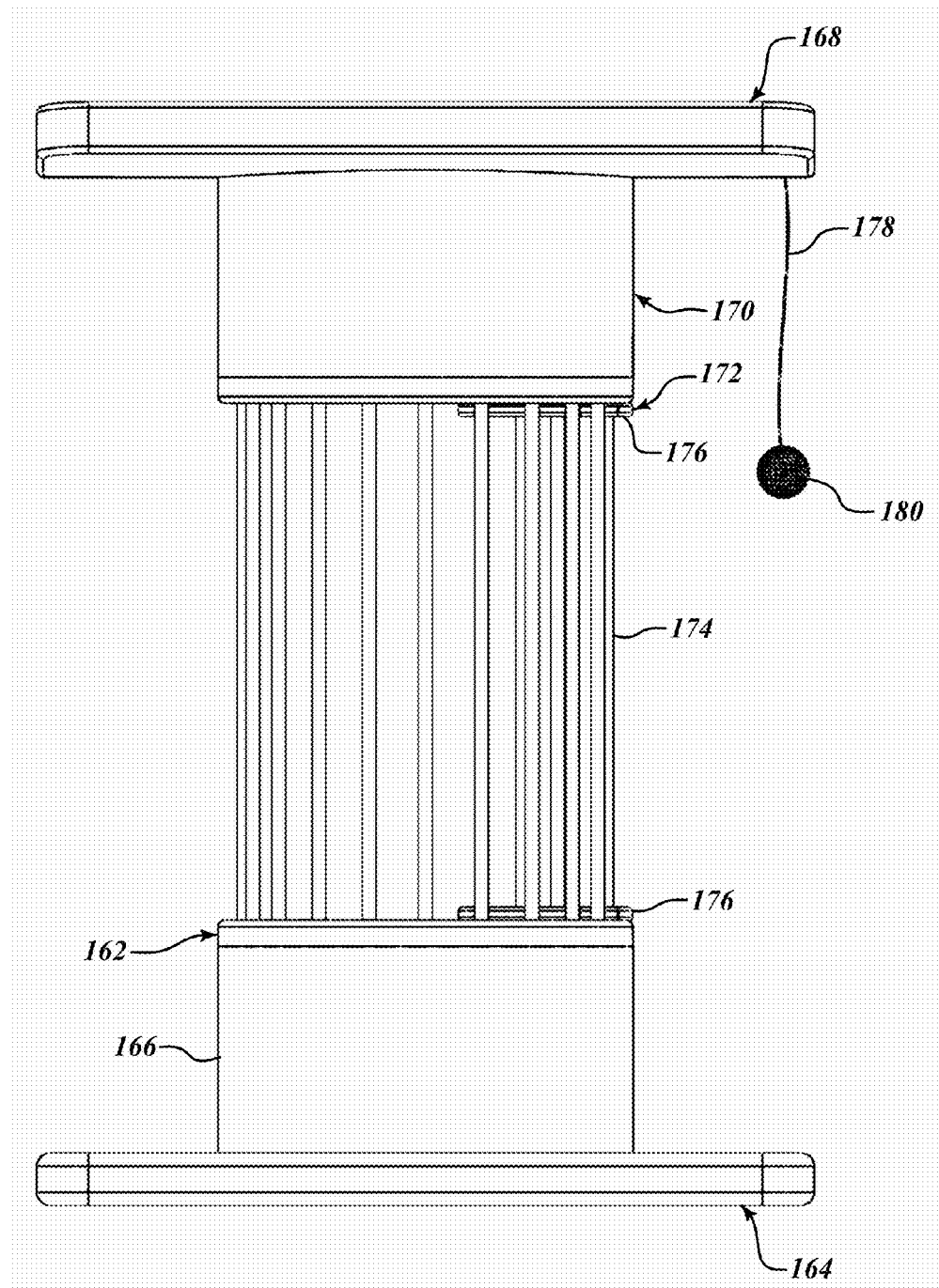
Figure 21:
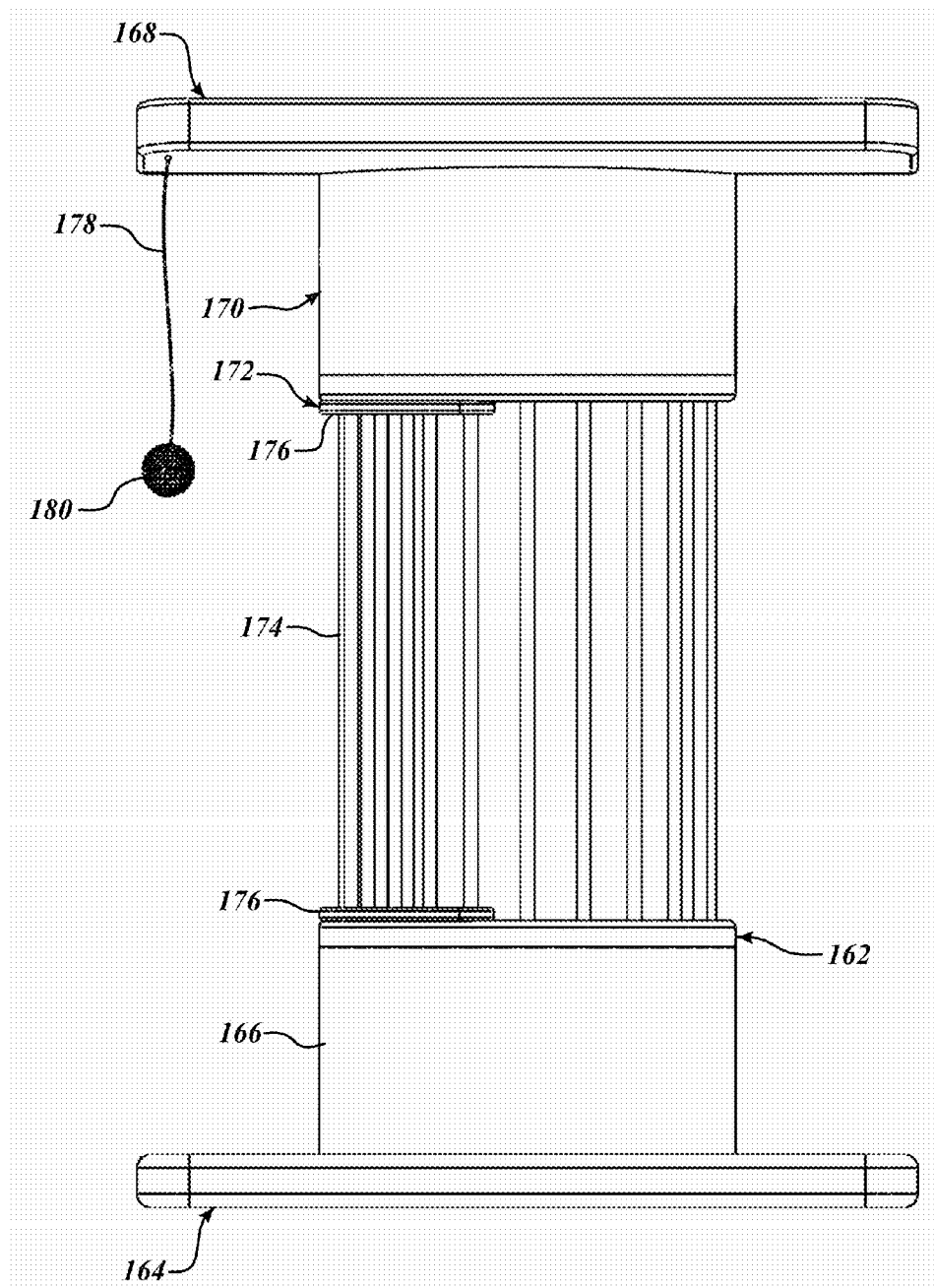
Figure 22:
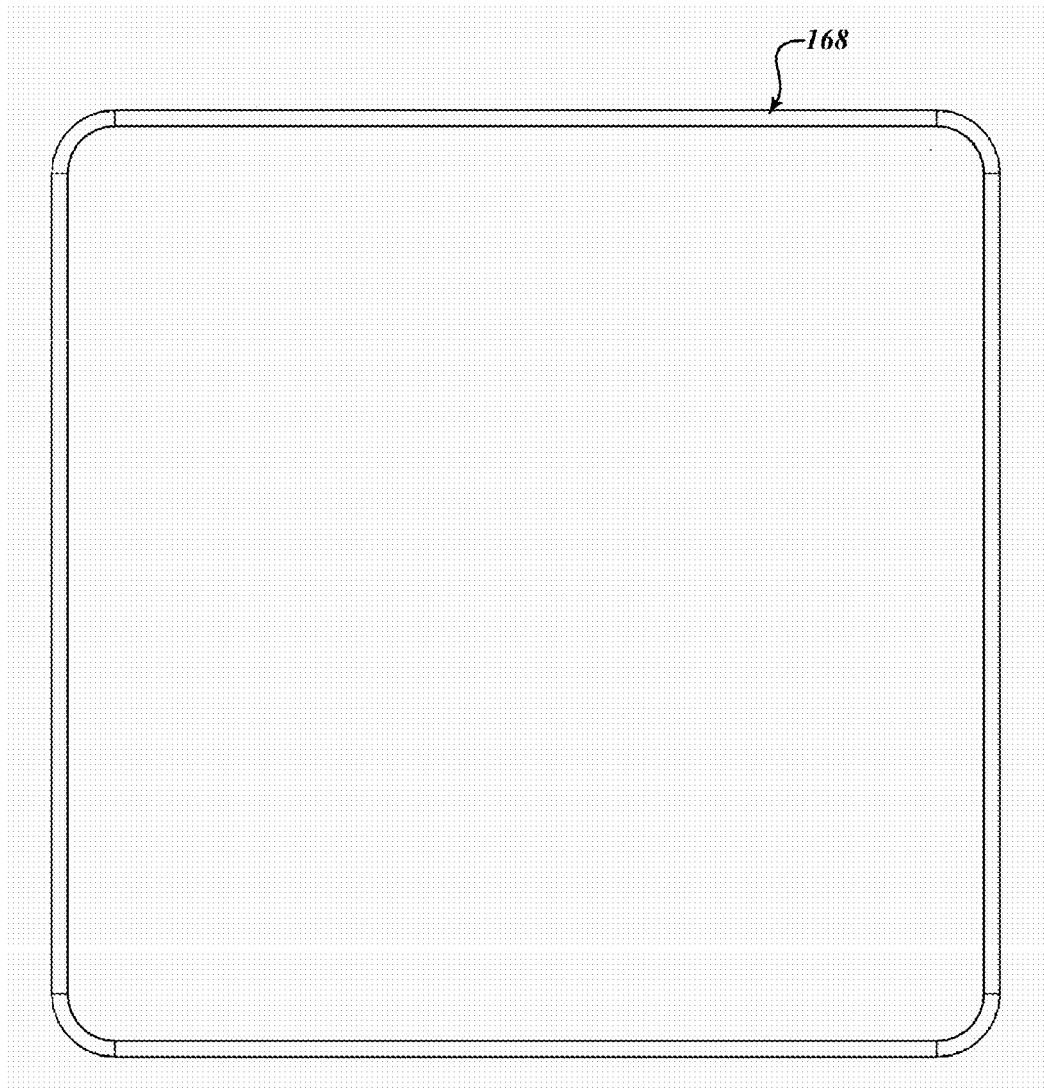
Figure 23:
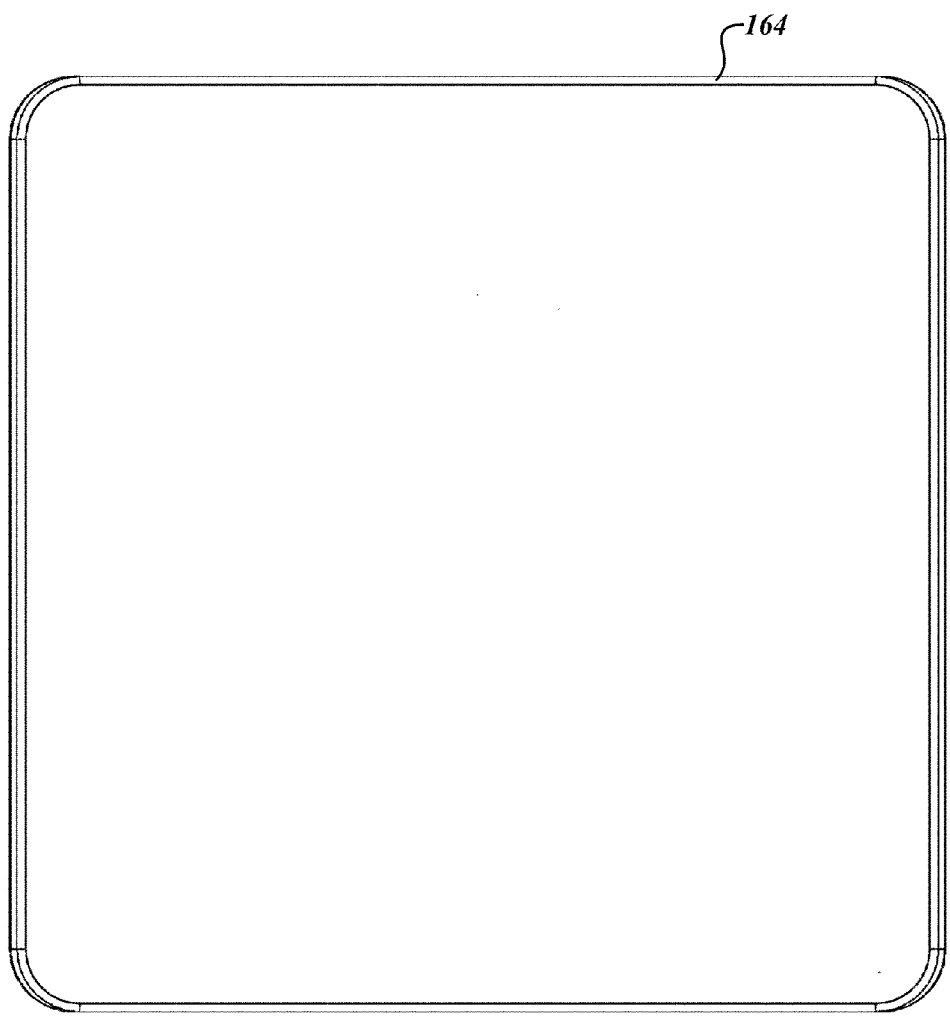
Figure 24:
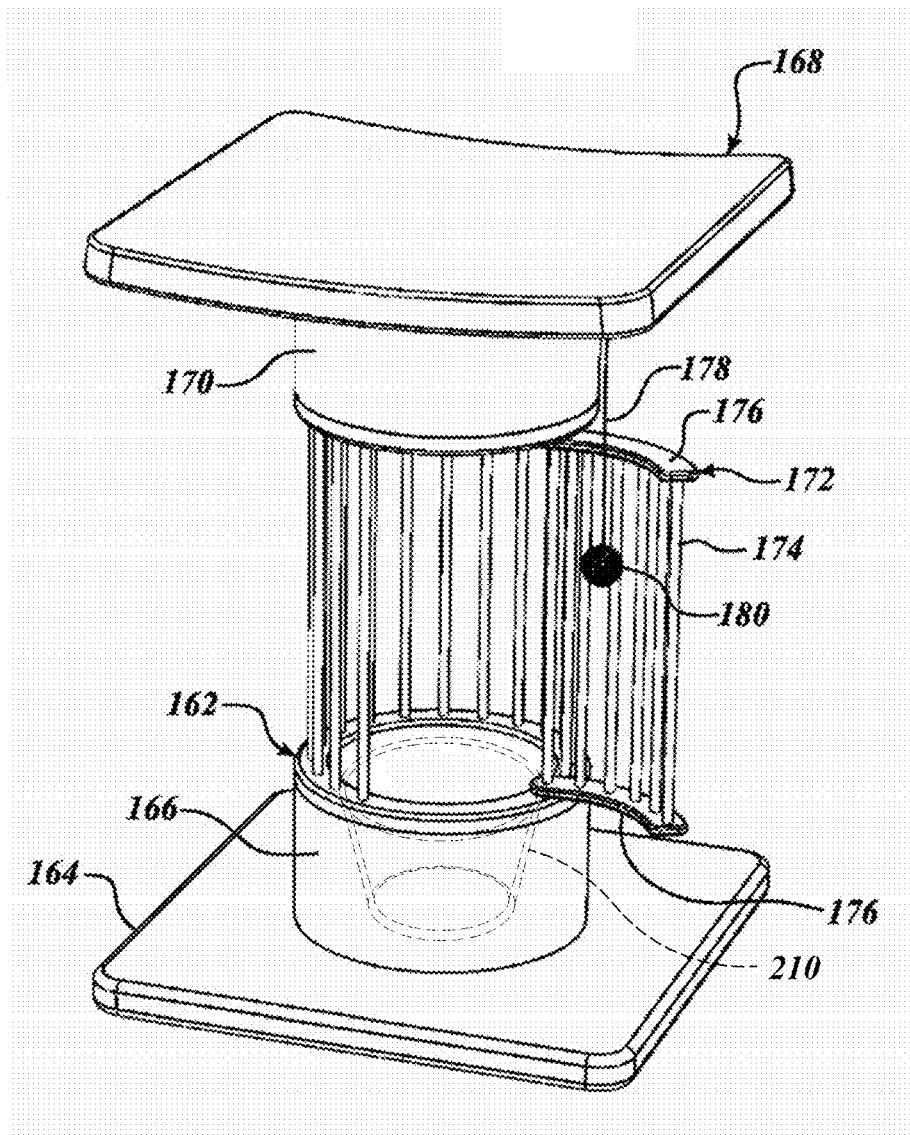
Figure 25:
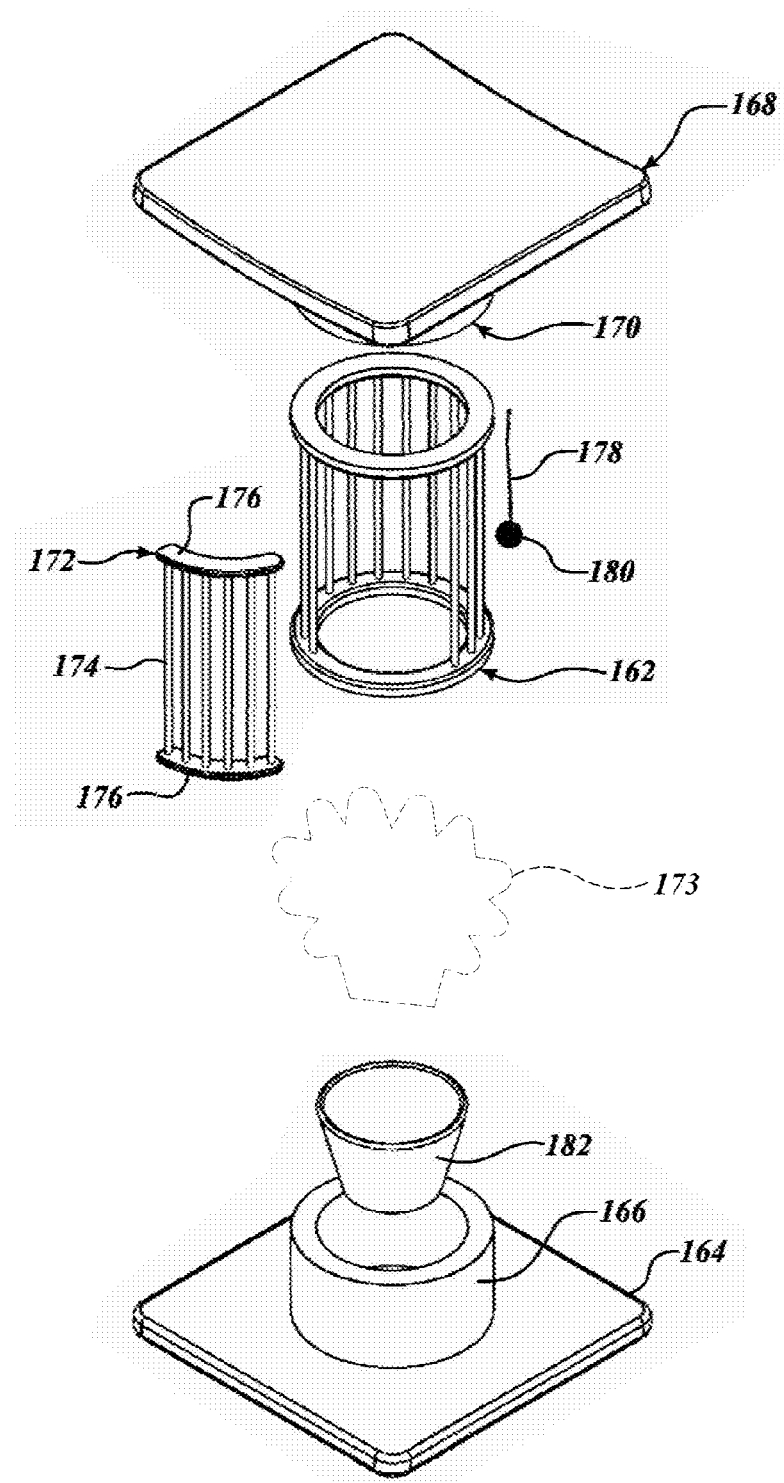
FIG. 25 is an exploded isometric view of the embodiment of FIG. 17.
Figure 26:
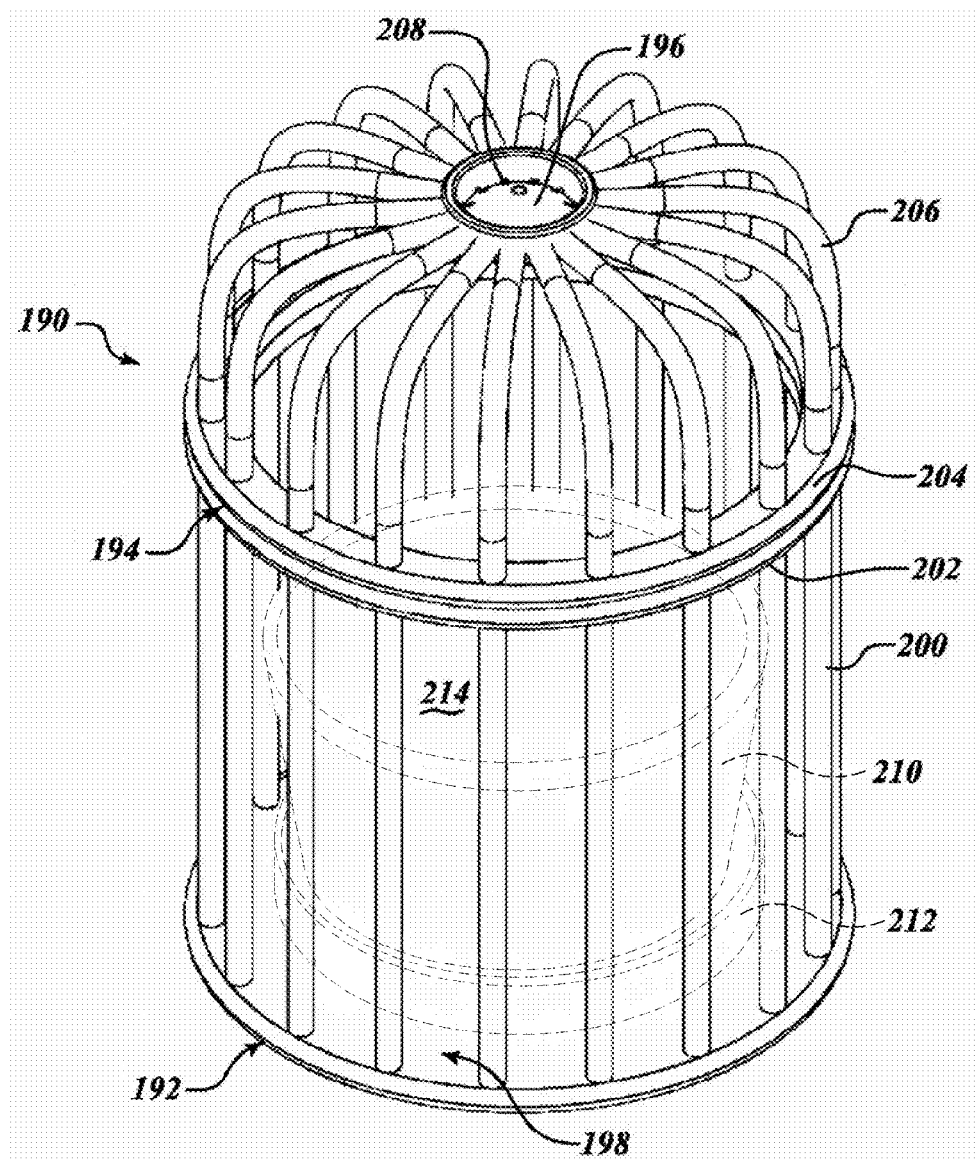
FIG. 26 is an isometric view of a fourth embodiment of the present disclosure.
Figure 27:
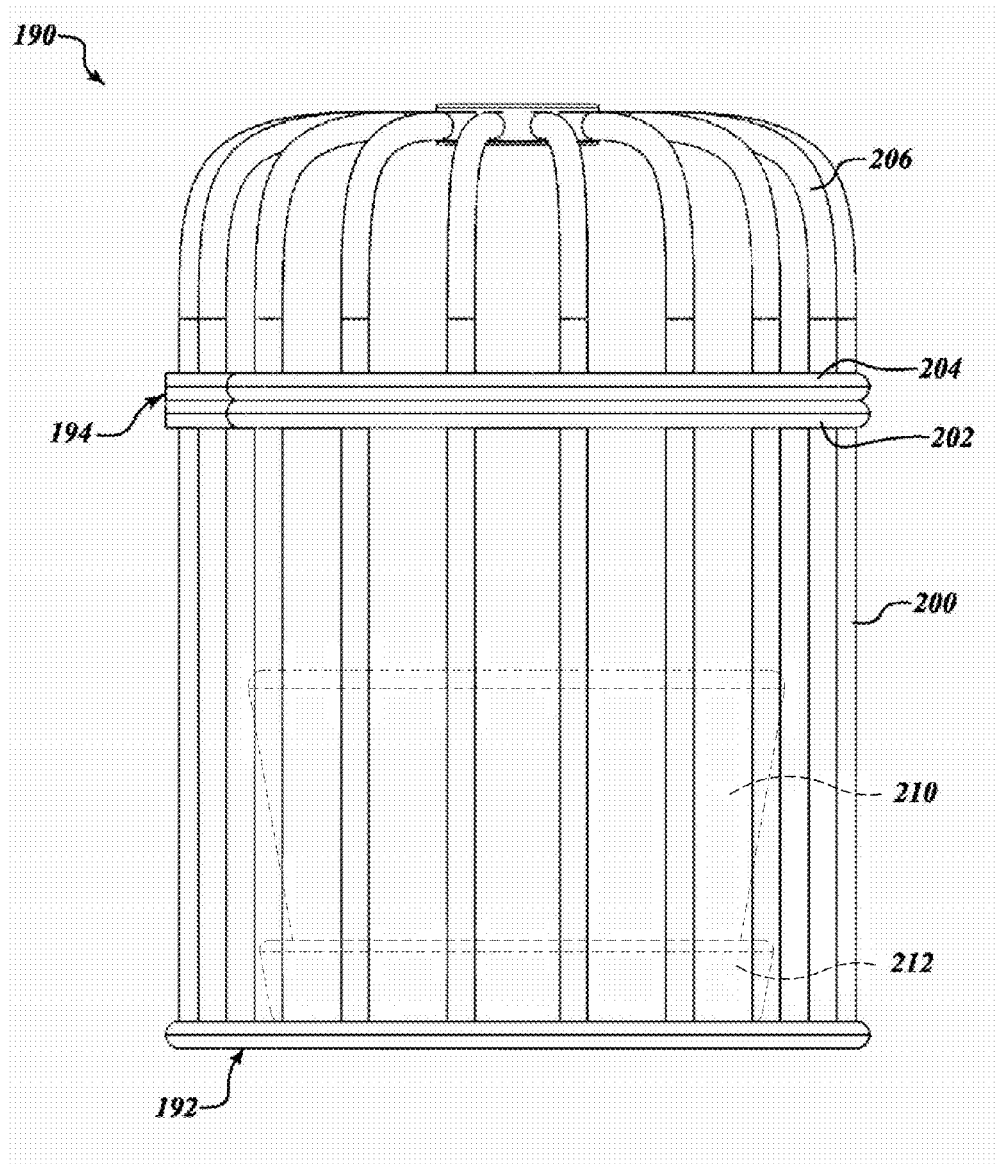
FIGS. 27-32 are top, bottom, front, back, right, and left side plan views, respectively, of the device of FIG. 26.

As shown in FIG. 18, the cage 162 has a door 172 hingedly attached to one of the plurality of ribs 174 that form the cage or, alternatively, formed of a plurality of the ribs 174 in which one of the ribs acts as a pivot point to allow the door 172 to swing between an open and a closed position. The plurality of ribs 174 that form the door 172 are held in position by top and bottom horizontal supports 176 that have an arcuate shape to match the radius of curvature of the cylindrically-shaped cage 162. A string 178 supports a ball 180 from the top 168. As can be seen in the front view of FIG. 21, as well as in the back view shown in FIG. 22, the top 168 has an arcuate cross-sectional shape from right to left side. The radius of curvature is a matter of design choice as is the size and shape of the components of this particular embodiment of the present disclosure except as where dictated by function. As shown in FIG. 25, a pot 182 is provided that is sized and shaped to be received inside the platform 166 attached to the base 164. An optional saucer may be included below the pot 182 to retain any spillage of water or dirt.

In this particular embodiment the base 164 and top 168, as well as the platform 166 and extension 170, can be made of any rigid material, such as particle board, and can be covered in a plush material, such as carpet or cloth. Ideally a latch is provided for the door 172 to ensure the cat cannot open the door and have access to the live plant 173. The cage 162 can be made from wood, plastic, or similar materials and finished with a substance that is not harmful to pets.

Turning next to FIGS. 26-34, shown therein is a fourth embodiment of the present disclosure in the form of a static or fixed cage toy 190 having a cage 192 with a top 194 that incorporates a watering cap 196. Ideally the cage has a complete bottom 198 to which are attached a plurality of ribs 200 held in place by a ring-shaped top 202. Thus, the cage 192 has a cylindrical shape defined by the bottom 198, supporting ribs 200, and ring-shaped top 202. The ribs 200 are spaced apart around the circumference of the bottom 198 to provide visual and tactile access to the interior of the cage 192 yet preventing a cat from reaching its head or paws into the interior of the cage 192. The top 194 has a ring-shaped base 204 that supports a plurality of ribs 206 having an arcuate shape that extend up and curve inward toward the watering cap 196 where they are connected together to form a dome shape. The ribs 206 are spaced around the circumference of the ring-shaped base 204 to match the spacing of the ribs 200 on the cage 192. The radius of curvature of the ribs 206 on the top 194 is a matter of design choice and has no functional purpose.

The watering cap 196 is preferably dome-shaped and has a plurality of openings 208 formed around at least the periphery as described above that allows water to trickle down from the cap 196 to the interior of the cage 192 and onto a plant 173 contained therein.

Ideally a plant is contained within a pot 210 that may be supported by a saucer 212 inside the case 192. Dirt 214 or other plant life sustaining material is contained within the pot 212.

Figure 33:
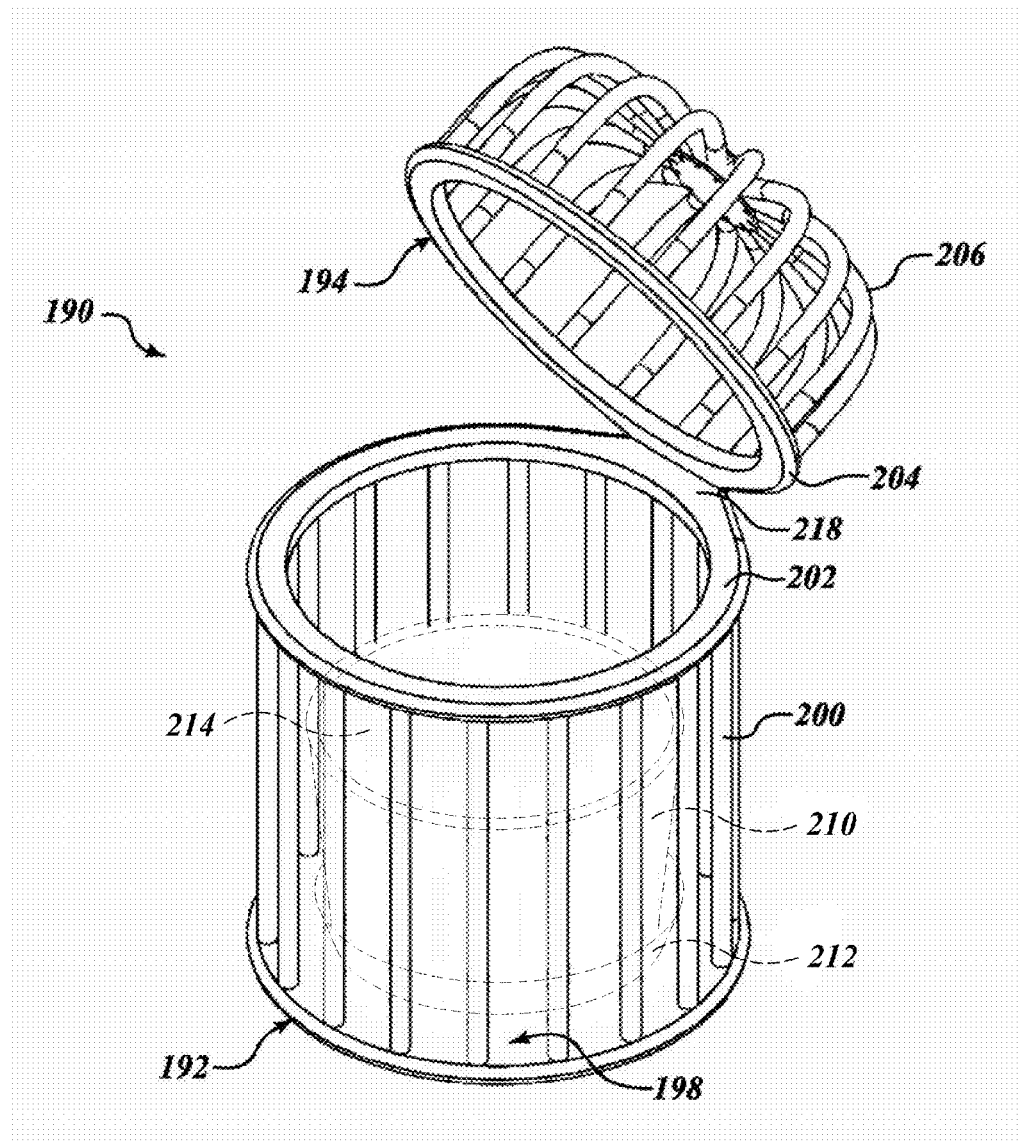
FIG. 33 is an isometric view of the device of FIG. 26 showing the top in an opened configuration.
Figure 34:
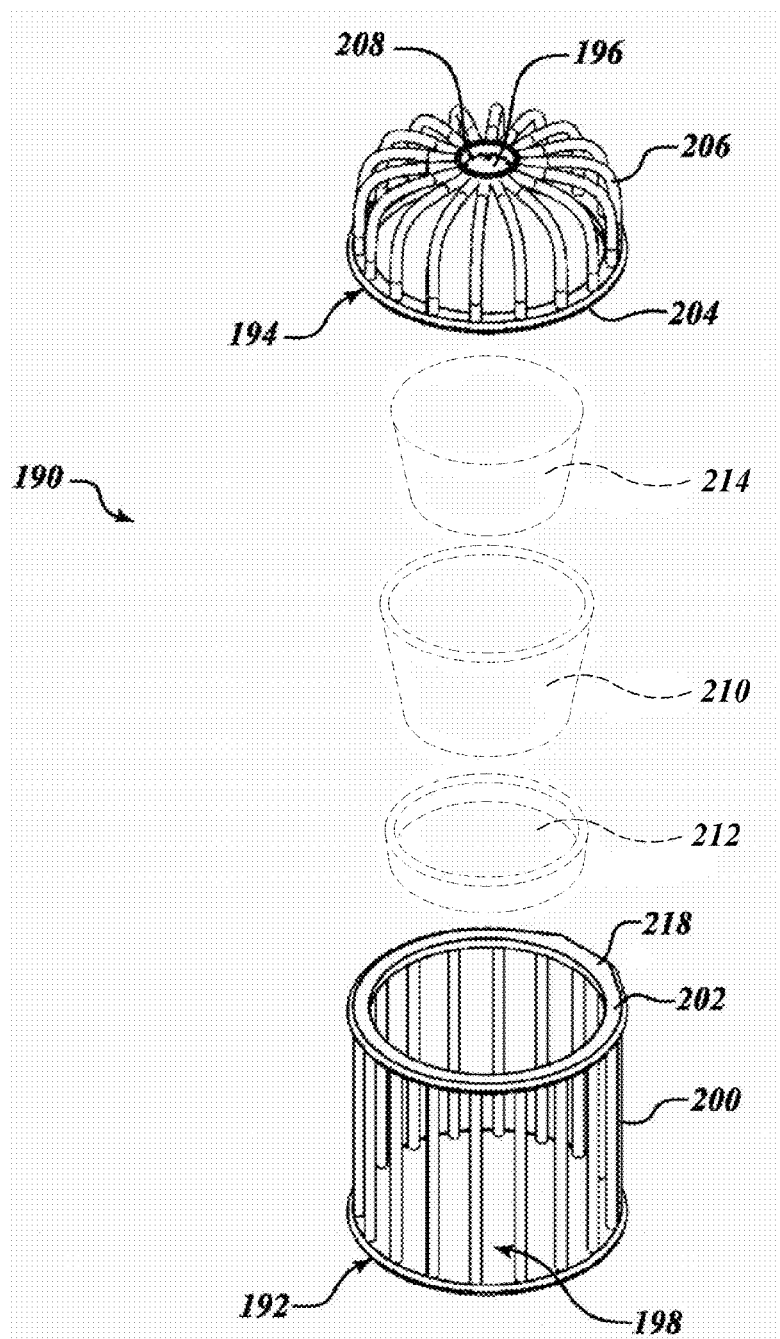
FIG. 34 is an exploded isometric view of the device of FIG. 26.
Figure 35:
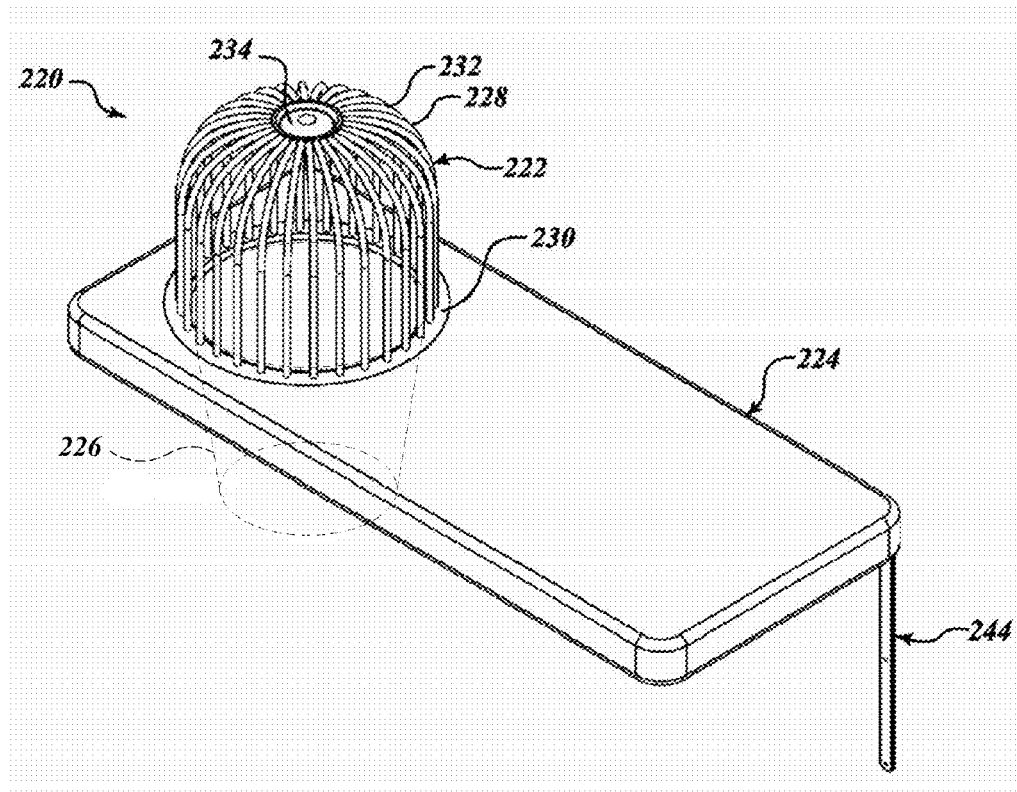
FIG. 35 is an isometric view of a fifth embodiment of the present disclosure.
Figure 36:
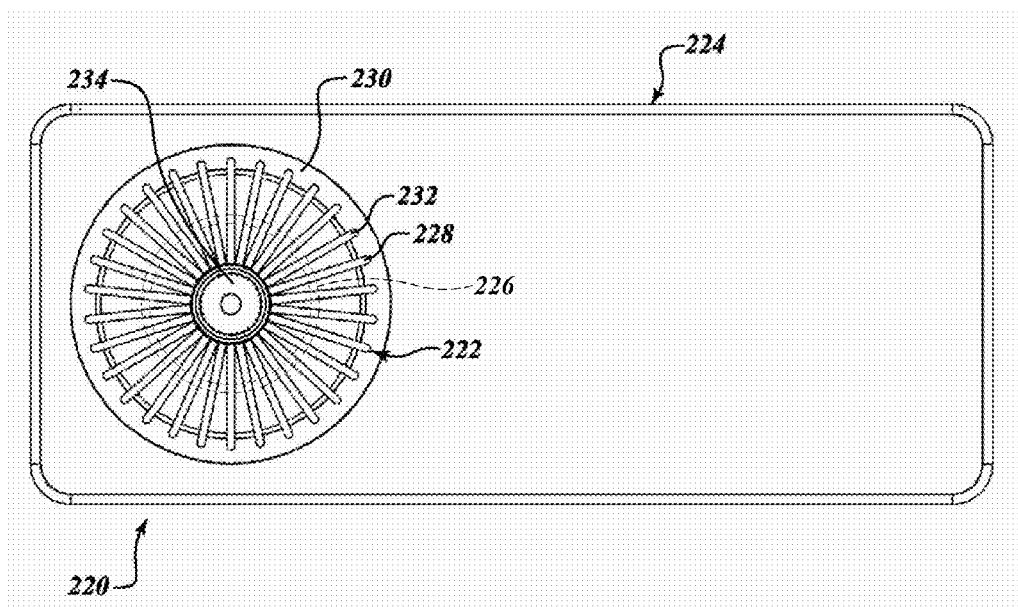
FIGS. 36-41 are top, bottom, front, back, right, and left side plan views, respectively, of the device of FIG. 35.
Figure 37:
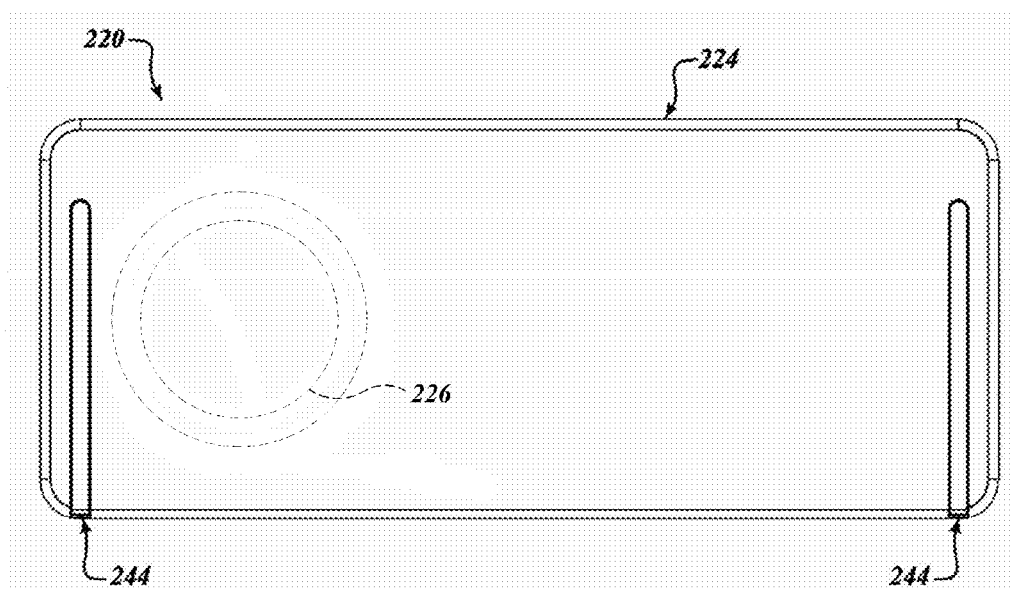
Figure 38:
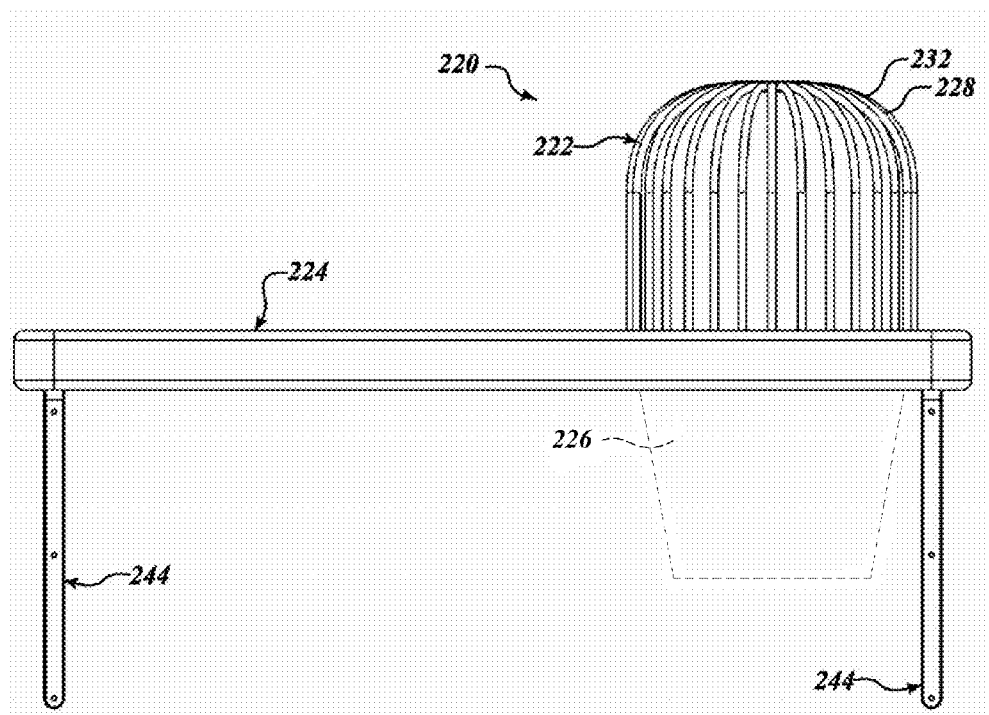
Figure 39:
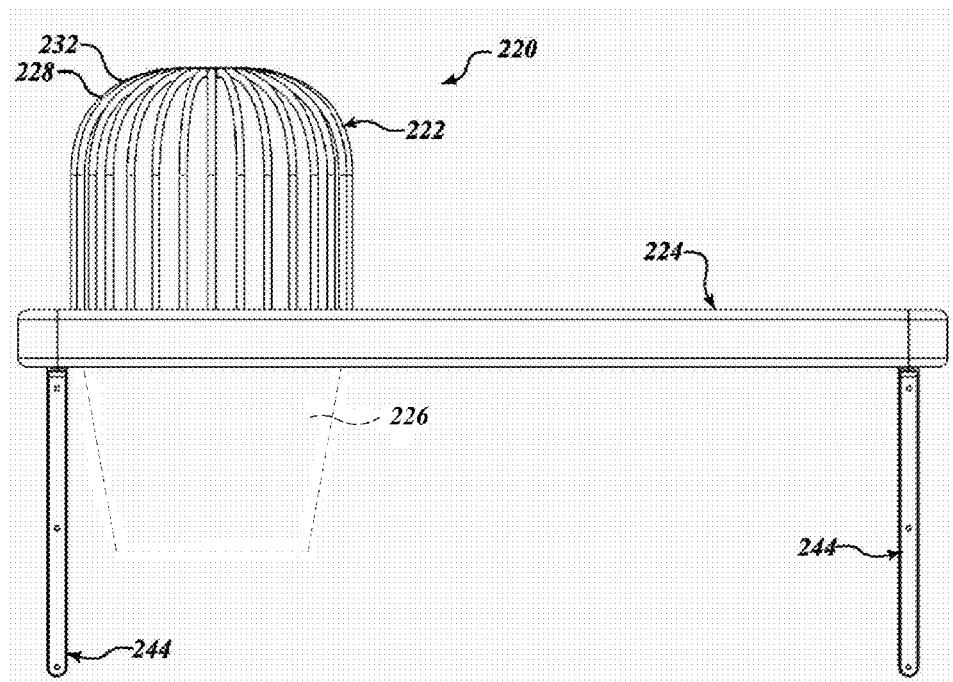
Figure 40:
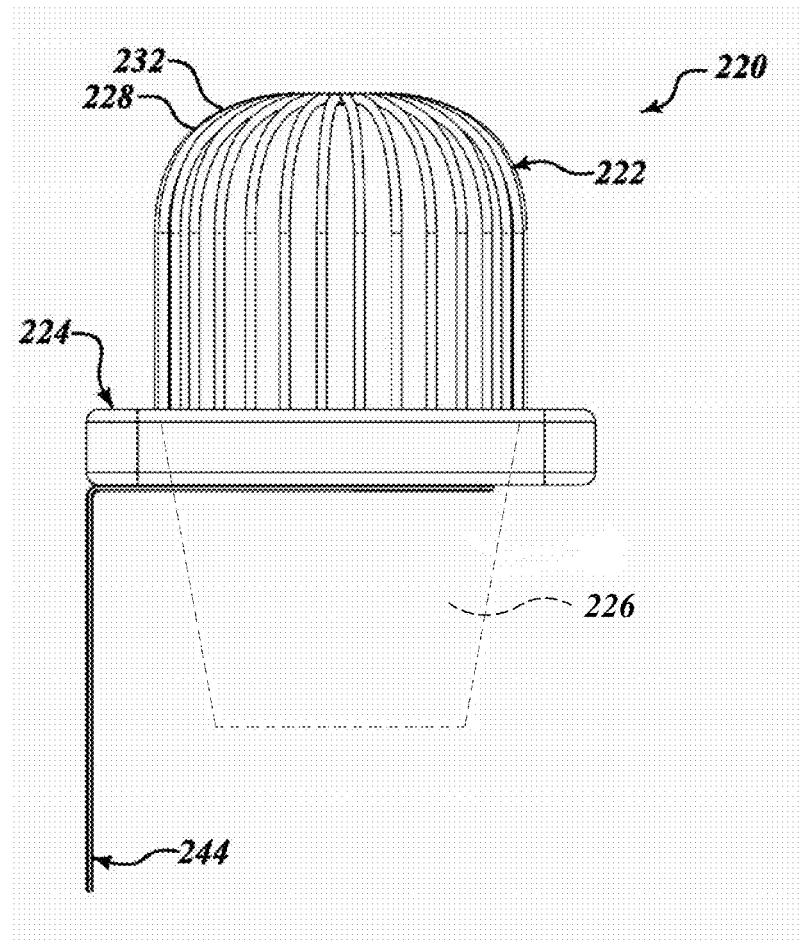
Figure 41:
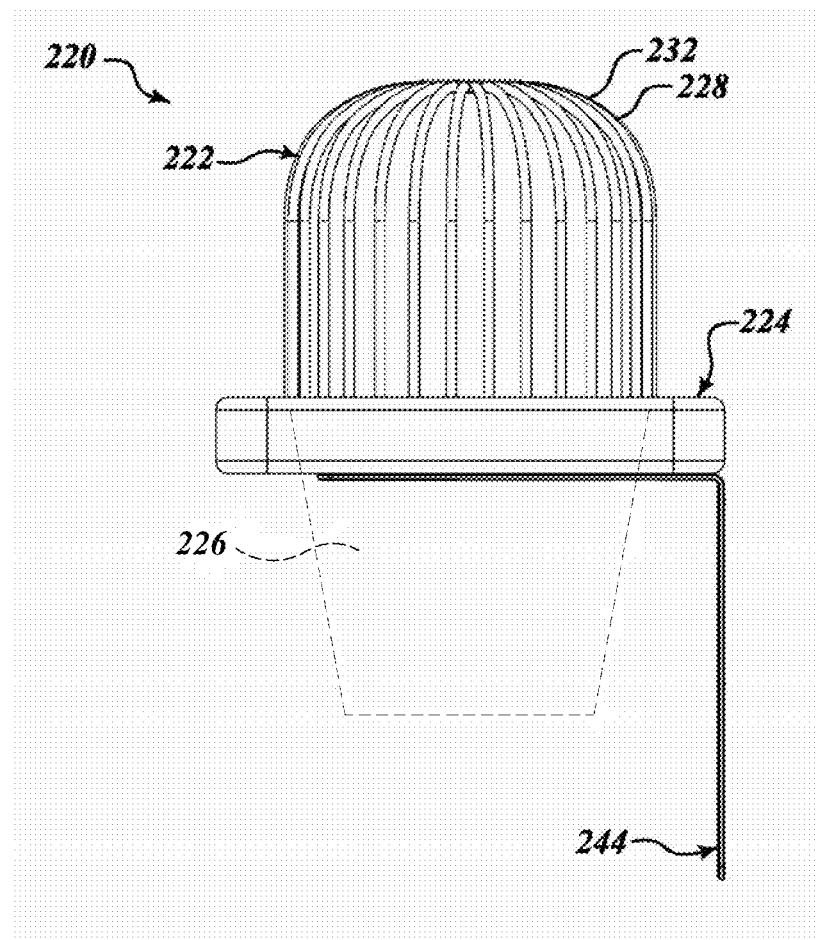
Figure 42:
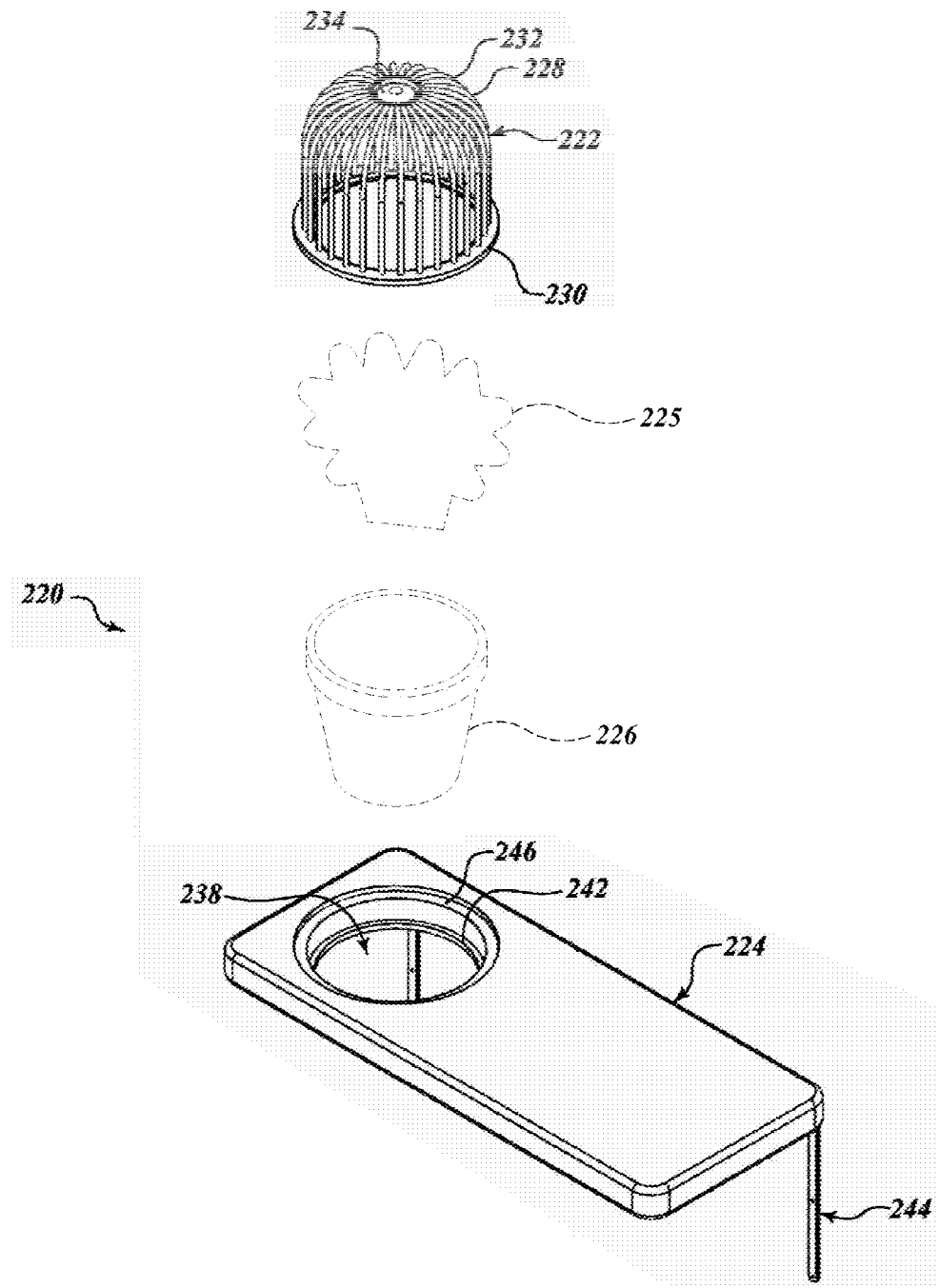
FIG. 42 is an exploded isometric view of the device of FIG. 35.
Figure 43:
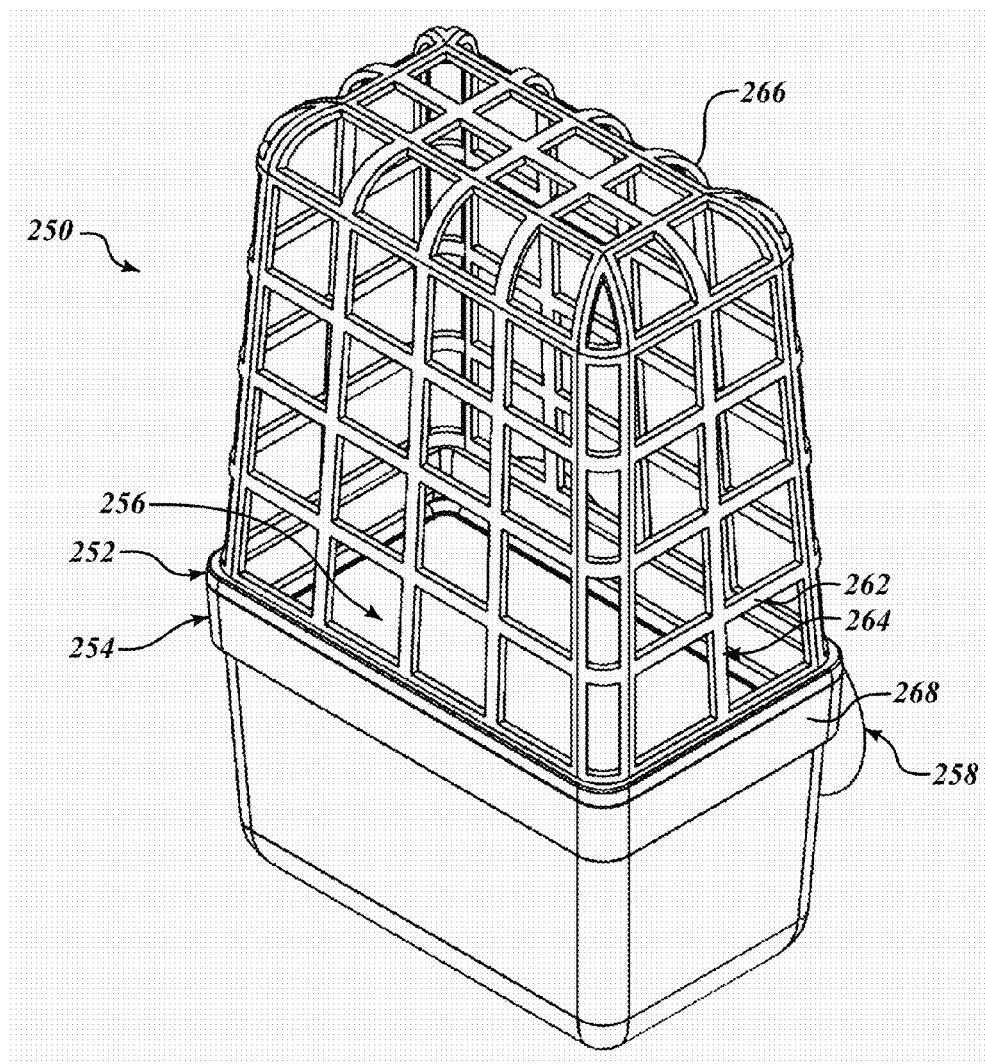
FIG. 43 is an isometric view of a sixth device formed in accordance with the present disclosure.
Figure 44:
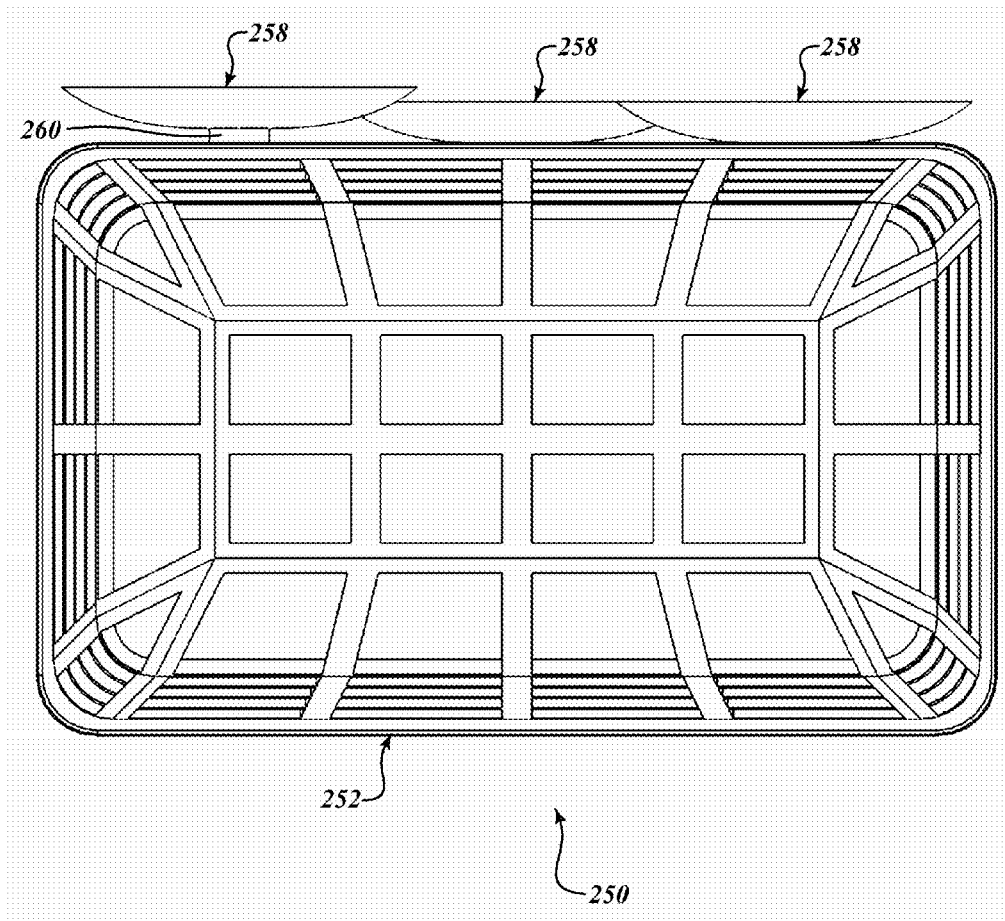
FIGS. 44-49 are top, bottom, front, back, right, and left side plan views, respectively, of the device of FIG. 43.
Figure 45:
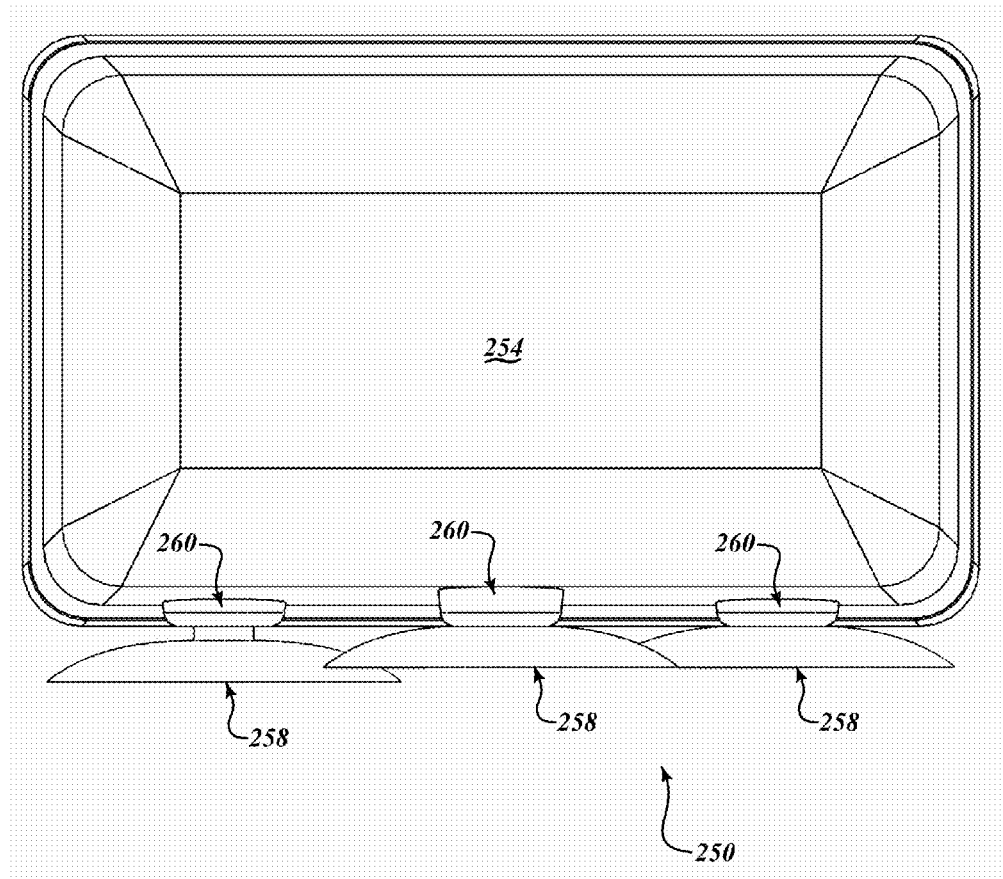
Figure 46:
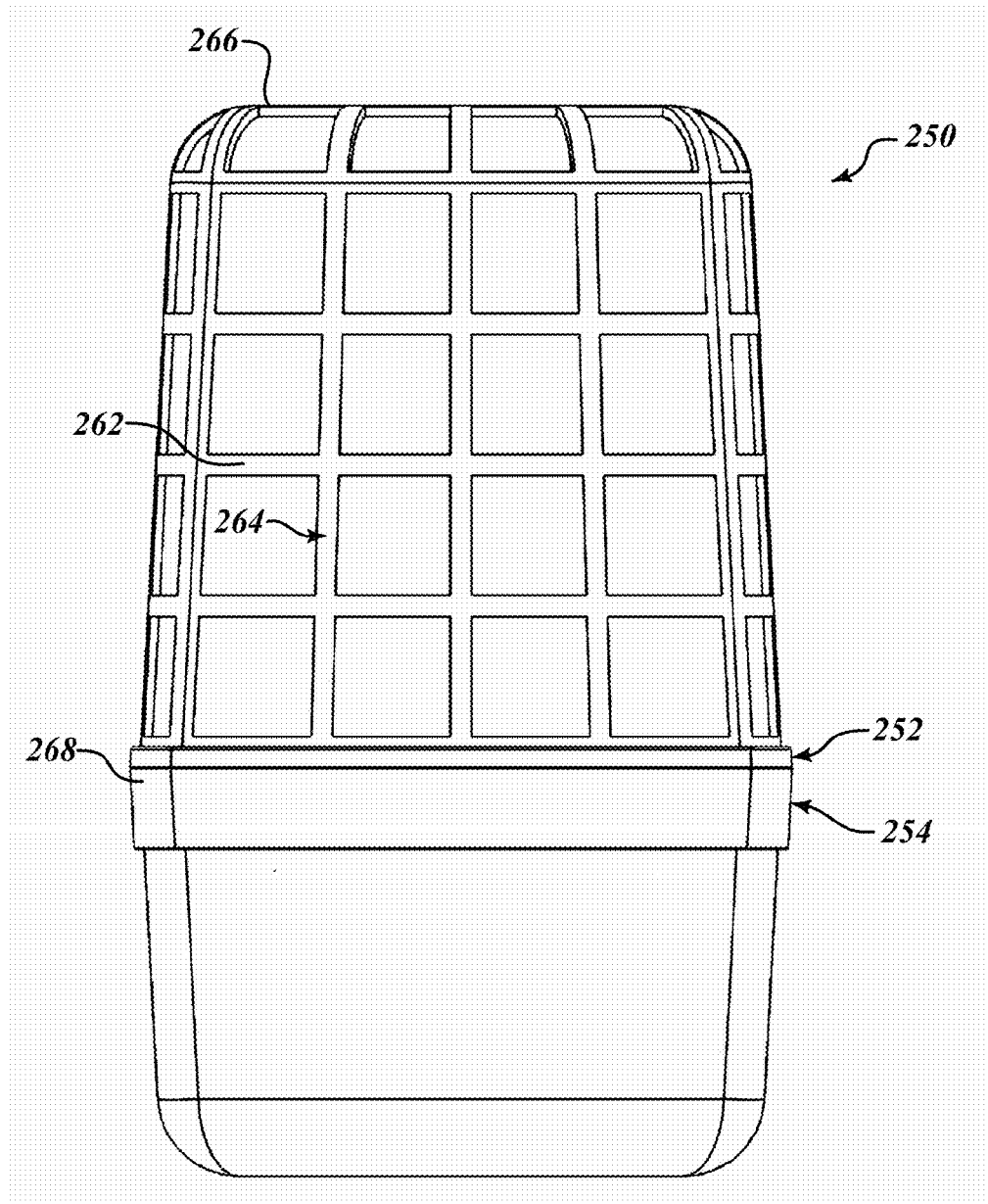
Figure 47:
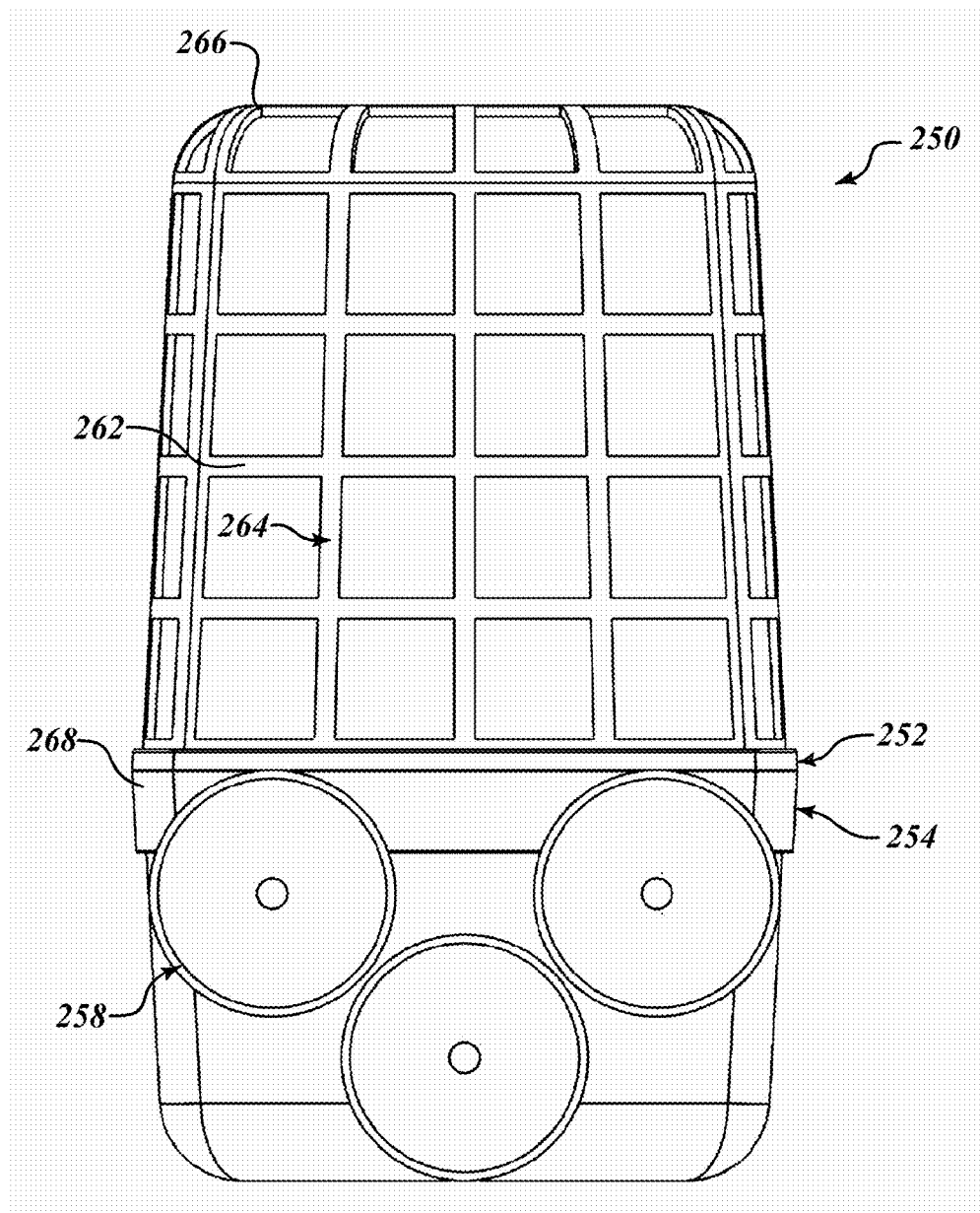
Figure 48:
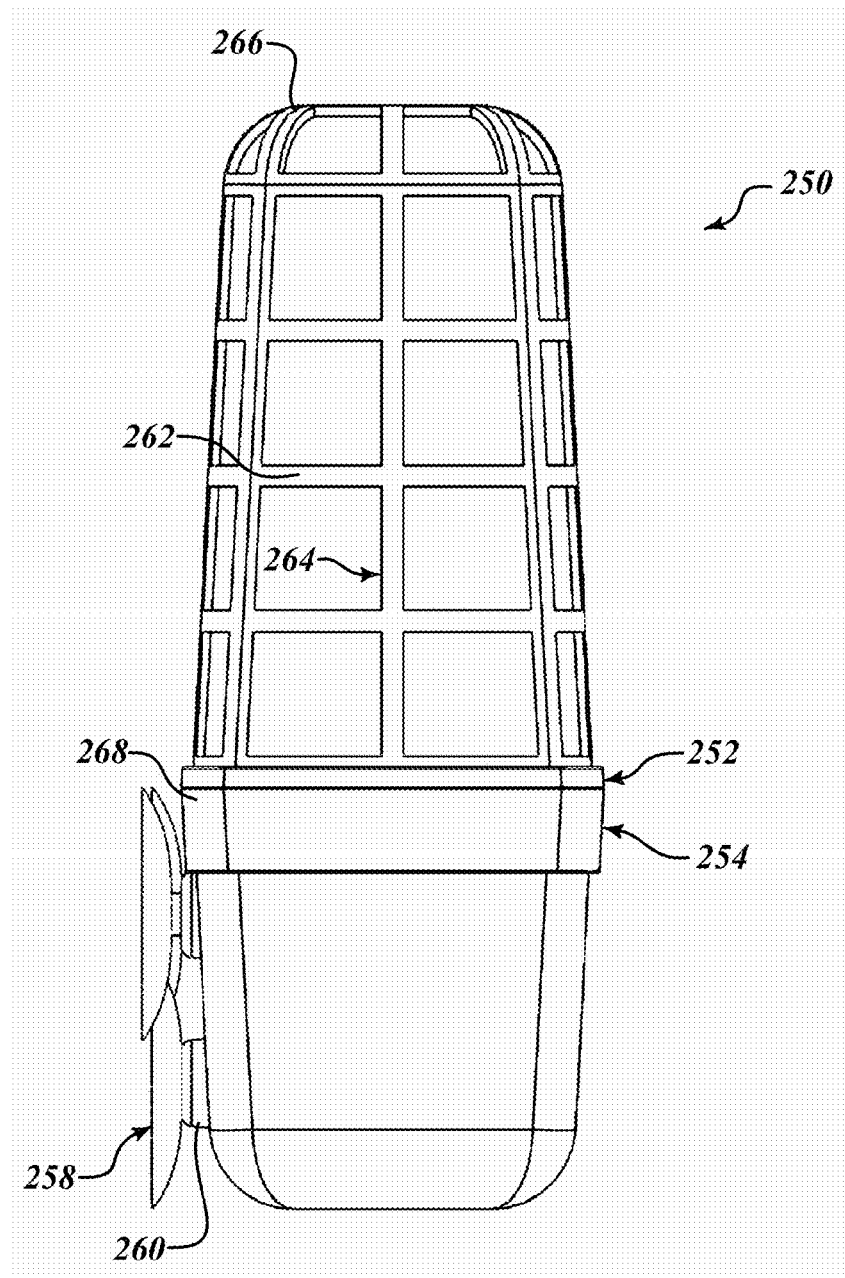
Figure 49:
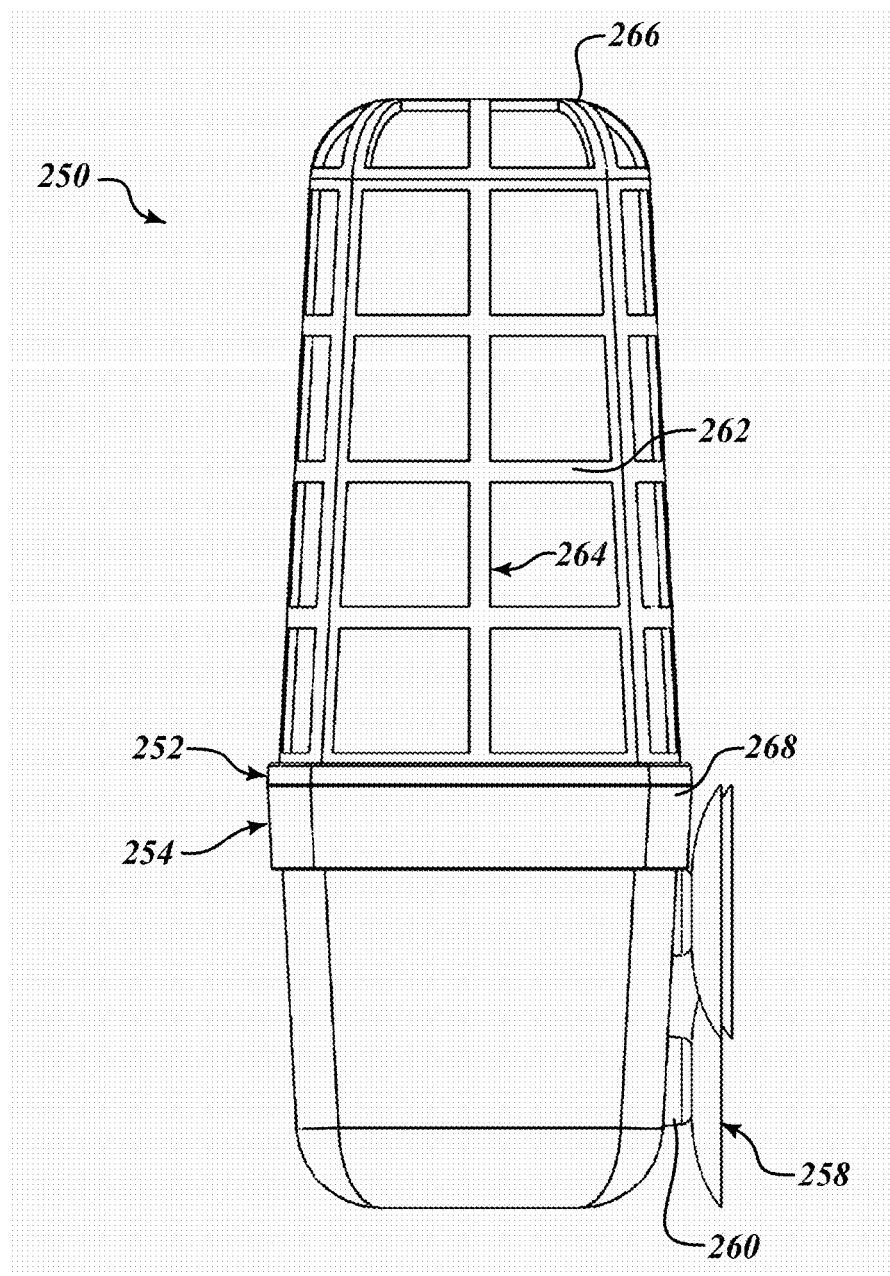

As shown in FIG. 33, the top 194 is ideally hingedly attached to the cage 192 and held in place in a closed configuration by a catch or latch (not shown) that is readily commercially available and will not be described in detail herein. Thus, a piano hinge or other known hinge-type device (not shown) can be used to attach the top 194 to the cage 192. Other known attachments can be used to removably attach the top 194 to the cage 192.

Figure 28:
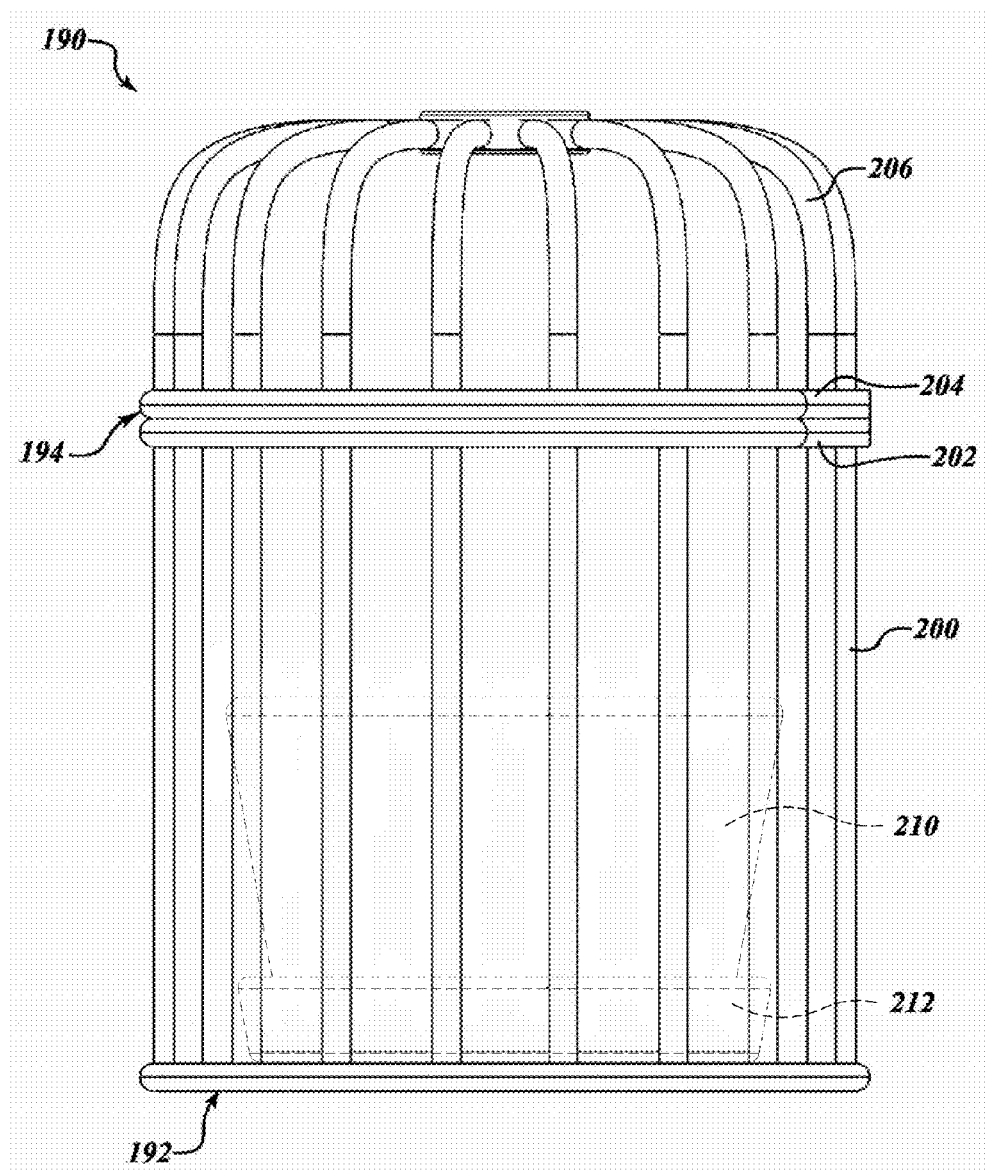
Figure 29:
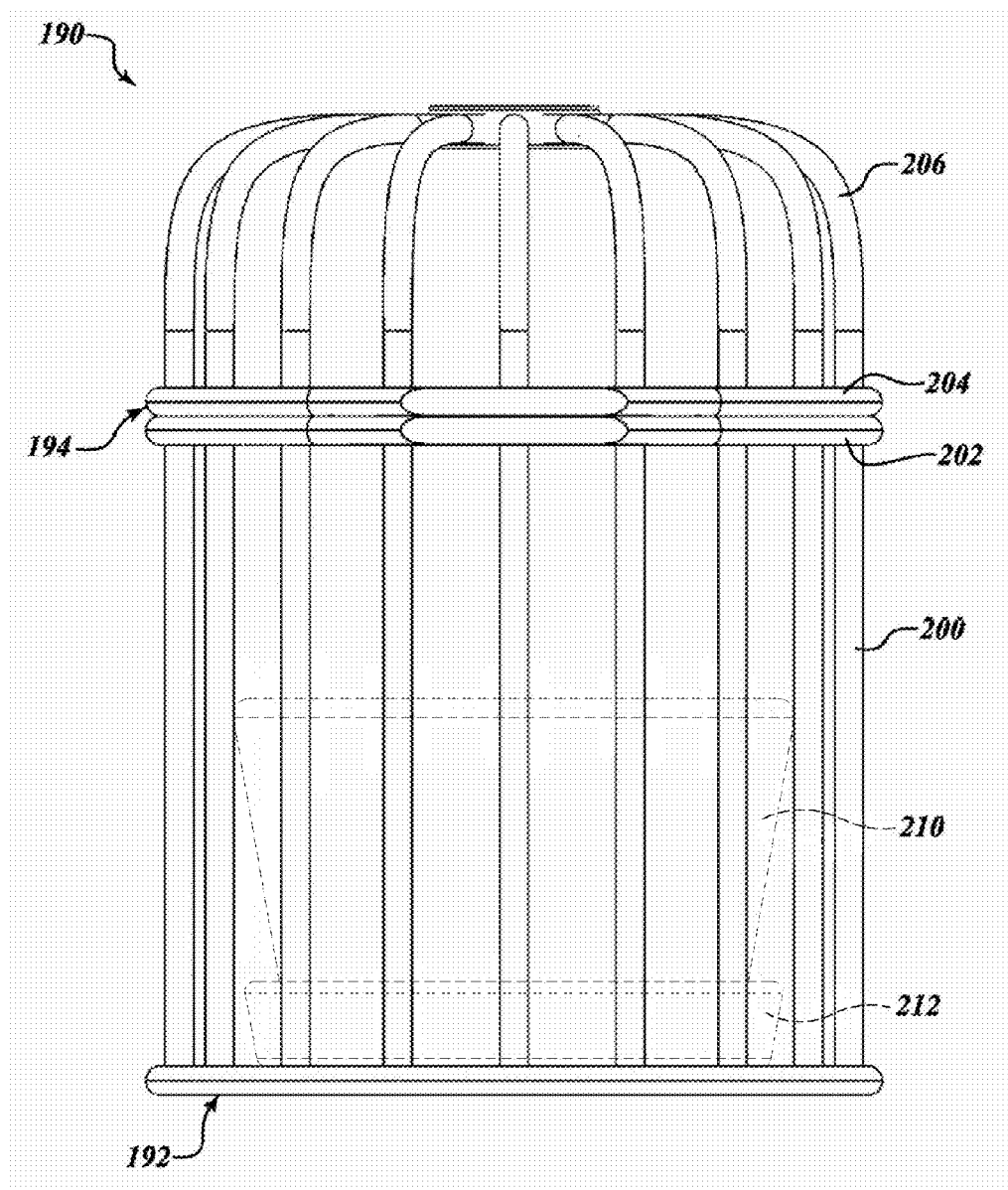
Figure 30:
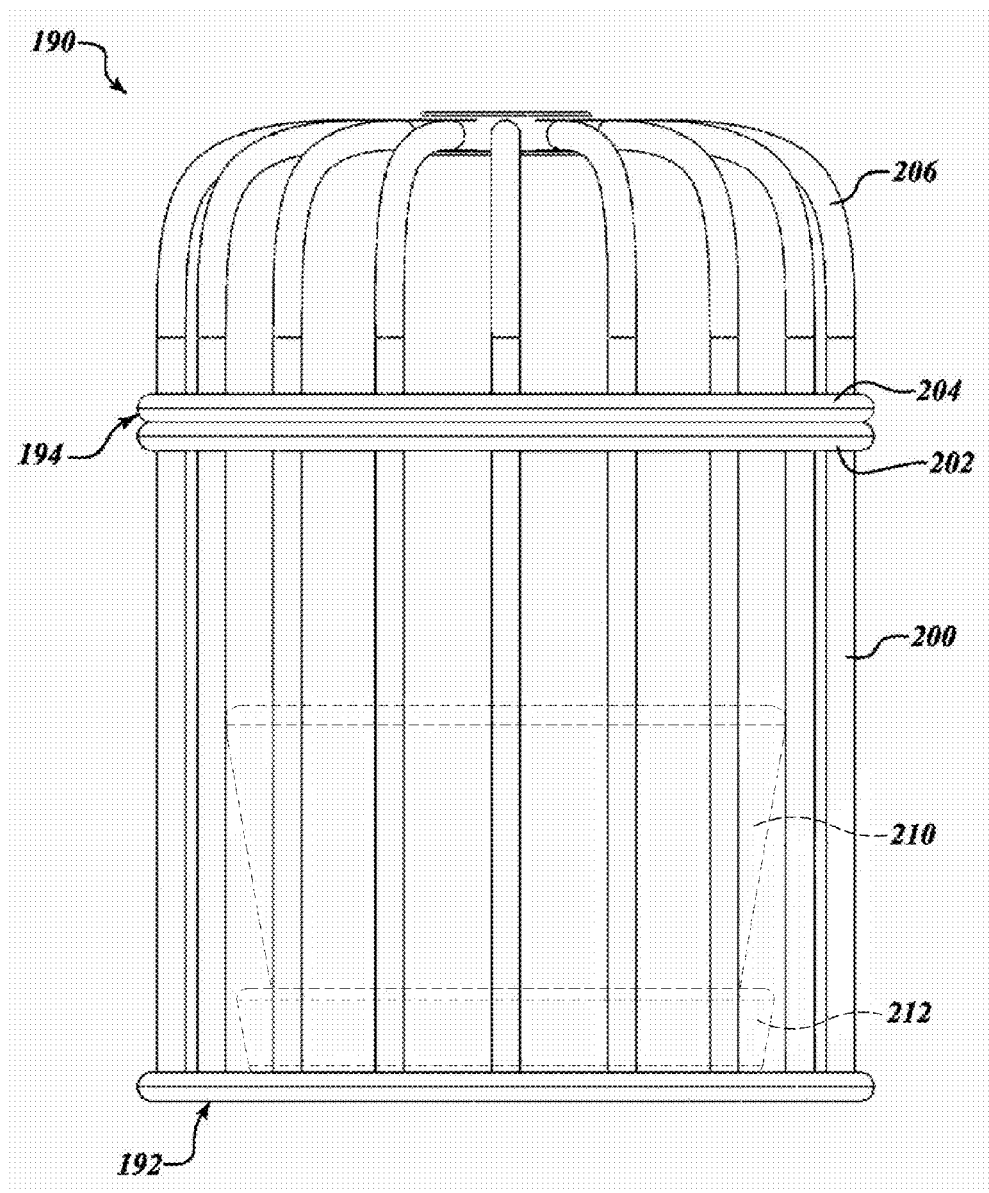
Figure 31:
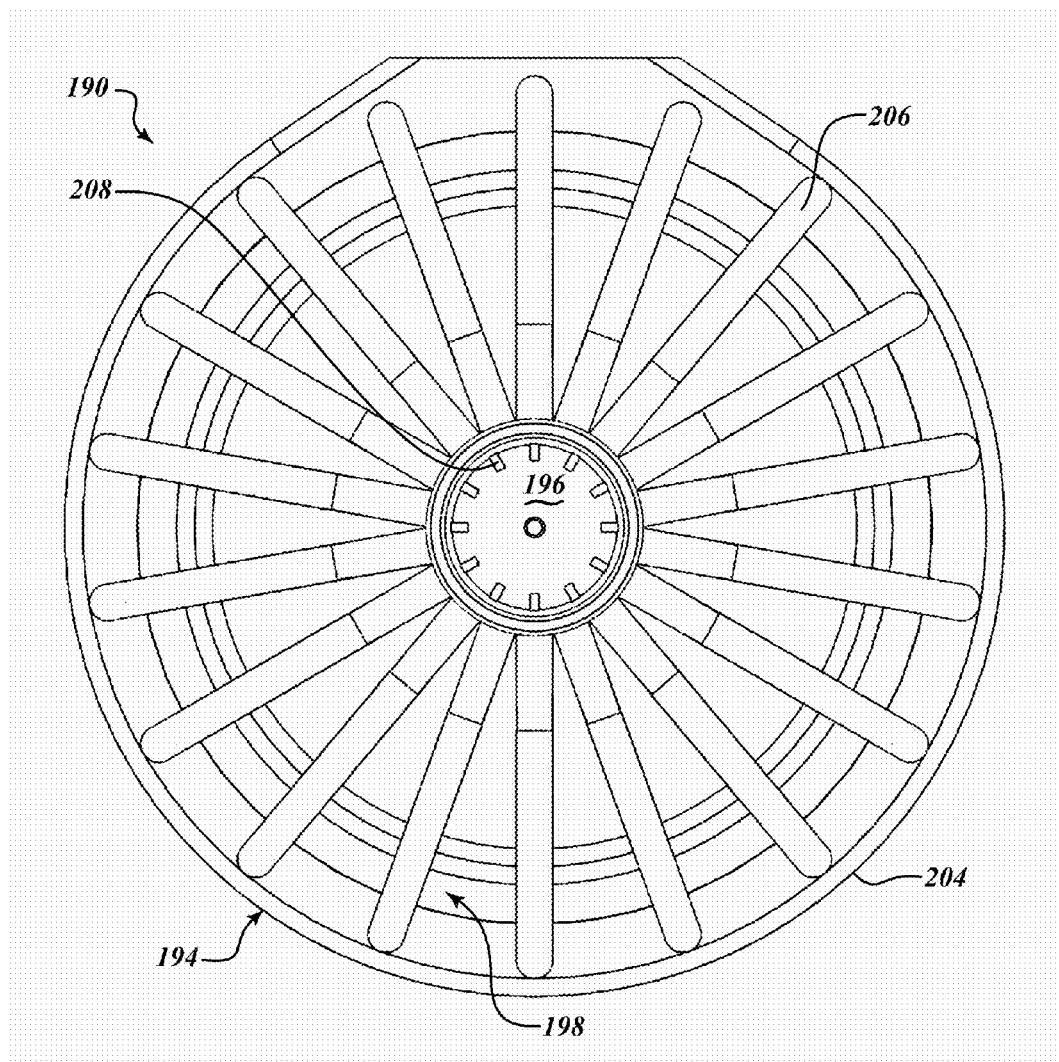
Figure 32:
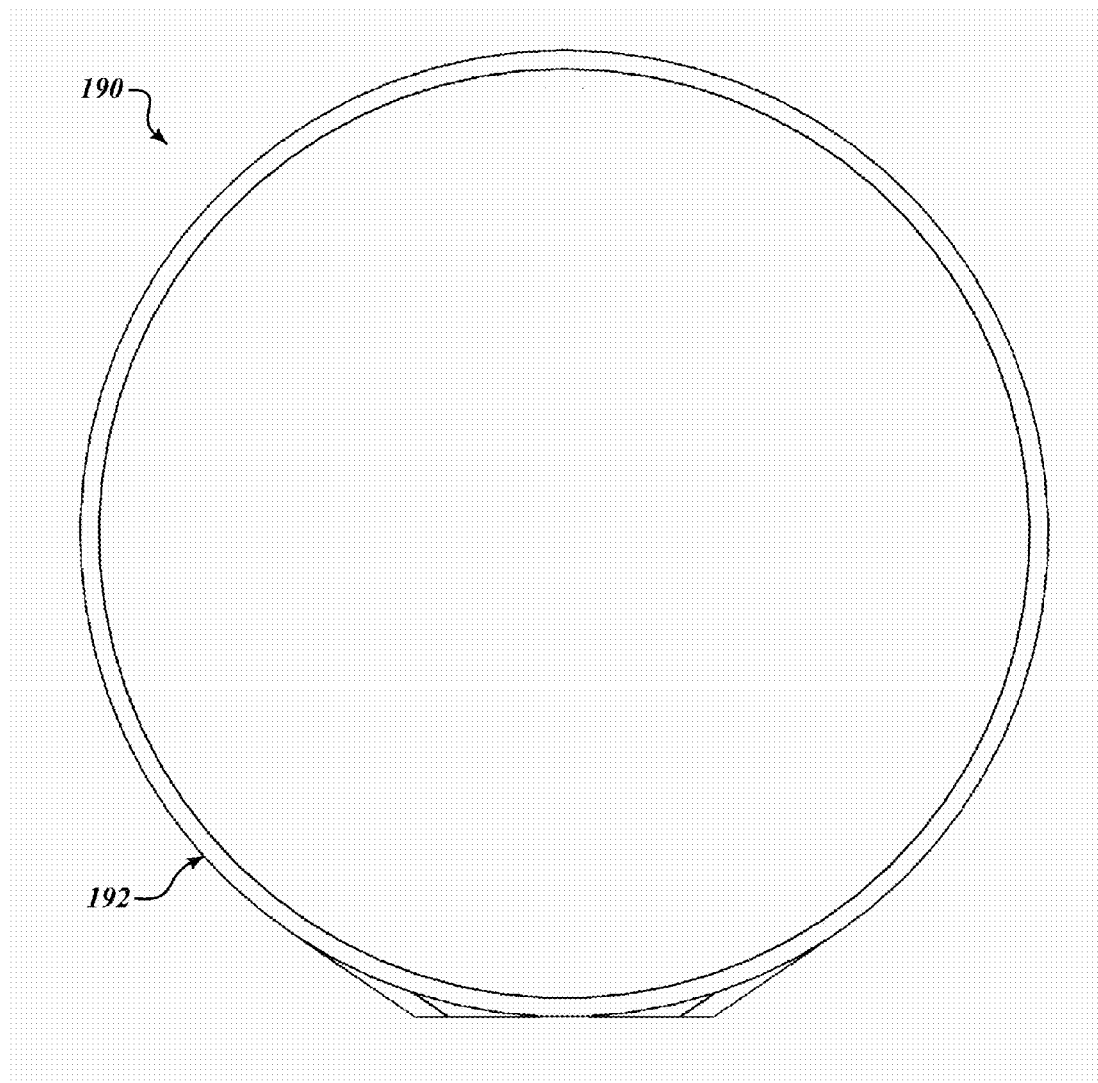

As shown in the top view of FIG. 28, a small extension piece 216 can be formed on the top 194, and in particular on the ring-shaped base 204 with a matching extension 218 on the ring-shaped top 202 of the cage 192 to support a hinge mechanism.

Ideally the device 190 of this embodiment of the present disclosure covers the plant and growing medium completely and provides sufficient room for the plant to grow to a healthy size. The spacing between the ribs 200, 206 are large enough to allow light and air to the plant to allow the plant, as it approaches its maximum size, to protrude outside the containment of the cage 192 a small amount. Thus, as a catnip plant (not shown) grows inside the cage 192, the cage 192 and top 194 protect it from the cat while still allowing the cat to smell and enjoy the plant. This results in the case "playing" with the enclosure by rubbing against it and attempting to reach the plant inside.

As the plant grows, it eventually reaches the bounds of the protective covering provided by the cage 192 and top 194, and protrudes through the spacing between the ribs 192, 206. The cat can and will eat the protruding leaves, keeping it at a mowed down level with the structure. Eating the catnip provides further entertainment for the cat and increases its interest since the freshly broken shoots increase the amount of scent given off by the plant.

The watering cap 196 distributes water to the plant to aid in successful cultivation of the plant. As water is poured into the dome-shaped cap 196, the small holes 208 in the bottom and sides thereof create a spray-like pattern of water onto the plant below as described above in previous embodiments. This not only saves the owner the trouble of opening the top 194 every time the water needs to be watered, but it also provides a low impact method of delivering water to the plant that does not damage the growth medium or the plant itself.

Although this embodiment is designed to be free standing, it can be used as is or modified to be used with other structural components. For example, shown in FIGS. 35-42 is a fifth embodiment of the present disclosure in the form of a windowsill live catnip protective enclosure 220 having a dome-shaped cage 222 supported on a windowsill base 224 to cover a plant pot 226 supported on the base 224. The cage 222 has a plurality of ribs 228 supported by a ring-shaped base 230 in which the ribs 228 have an arcuate top portion 232 that all joint together at a watering cap 234 that is of a similar configuration to the watering cap 196 described in the previous embodiment. In other words, the cap 234 is dome-shaped and surrounded by a plurality of openings 236 to facilitate water raining down onto a plant 225 contained in the pot 226.

The base 224 has an opening 238 formed therein that is sized and shaped to support the pot 226 within the opening. In this embodiment, the pot 226 has a circumscribing ridge 240 that forms a projection extending from the pot 226 around the top thereof. The opening 238 in the base 234 has a circumscribing flange 242 formed at a bottom thereof that is sized to support the pot 226, i.e., to have a smaller diameter than the circumscribing ridge 240 of the pot 226. Thus, the bottom of the pot 226 extends below a bottom of the windowsill 224 as shown in the front, back, right, and left plan views.

This windowsill version of the live catnip enclosure of the present disclosure is designed to be installed in a windowsill. It includes support brackets 244 that can screw into a wall, thus providing a platform on which a cat can perch. The support brackets 244 can be made of metal or similar material. The base 224 can be made of any low cost, rigid material, such as particle board, and is wrapped with a plush material such as carpet or fabric.

When installed, the plant pot 226 will rest below the top plane of the base 224 and is held in place by its weight. The cage 222 is affixed to the base 224 by any known means to protect the plant in the pot 226 from the cat, such as described in the previous embodiments. In one embodiment, the cage 222 fits into the same hole 238 and is supported by a second circumscribing flange 246 and is held in place by its own weight. The cage can be made of wood, plastic, or any similar material.

Figure 50:
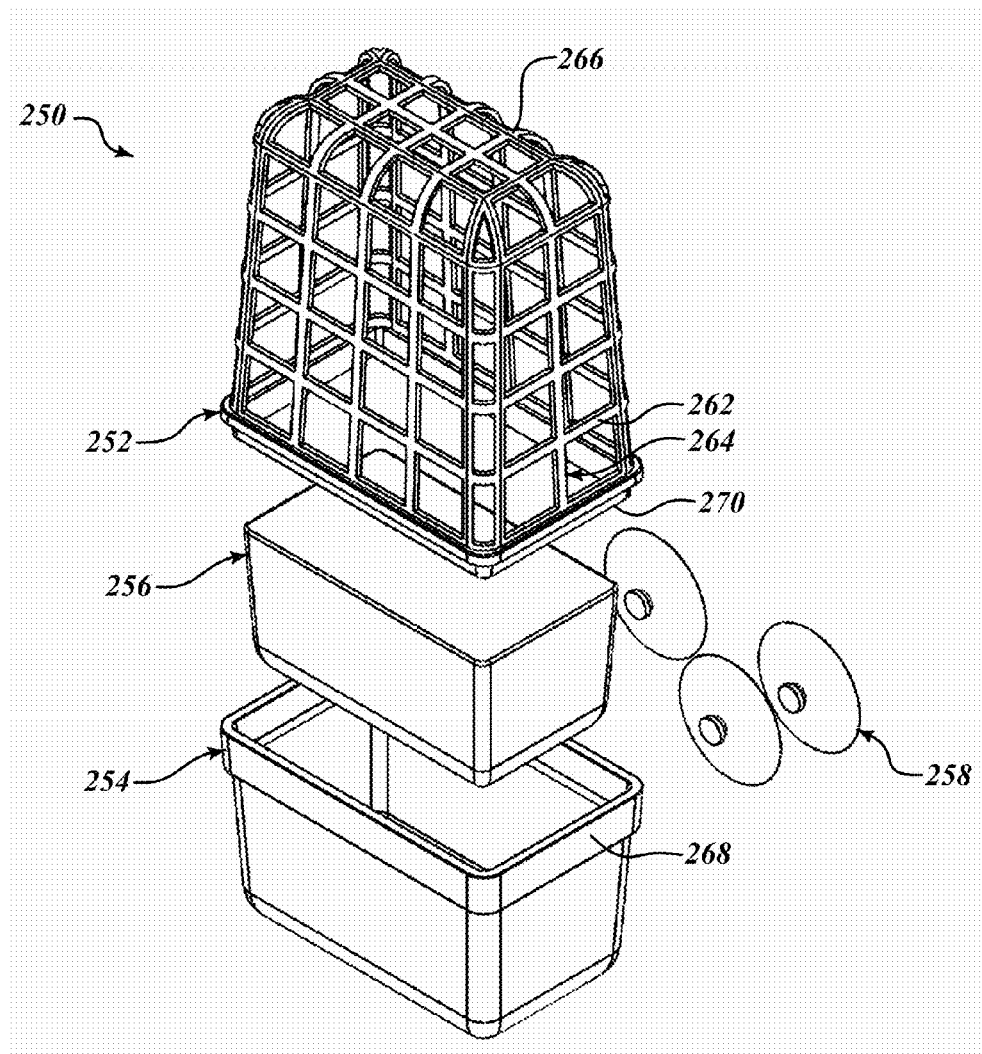
FIG. 50 is an exploded isometric view of the device of FIG. 43.
Figure 51:
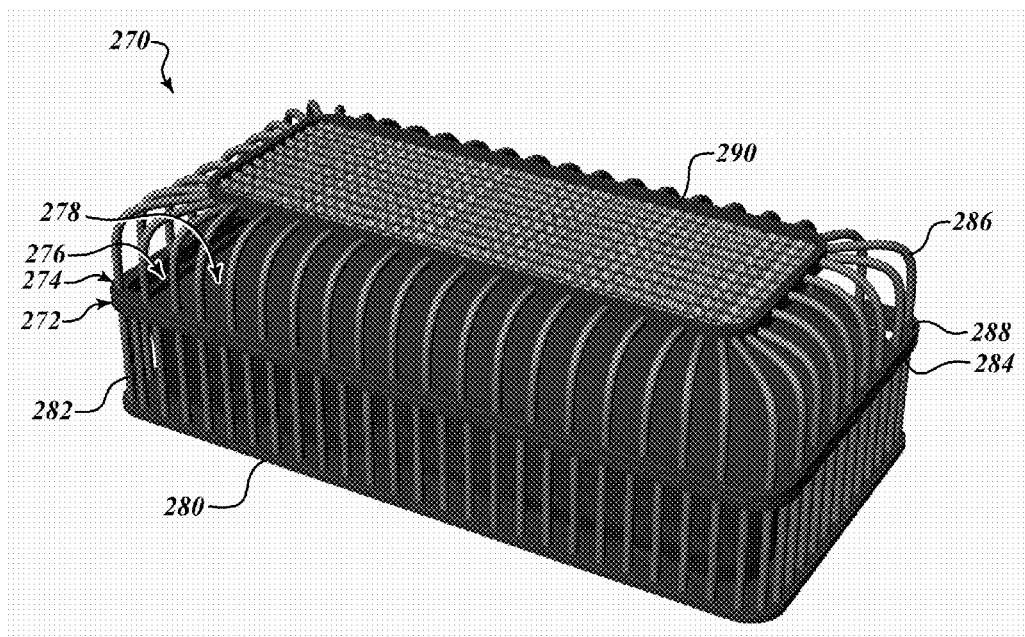
FIG. 51 is an isometric view of a seventh device formed in accordance with the present disclosure.
Figure 52:
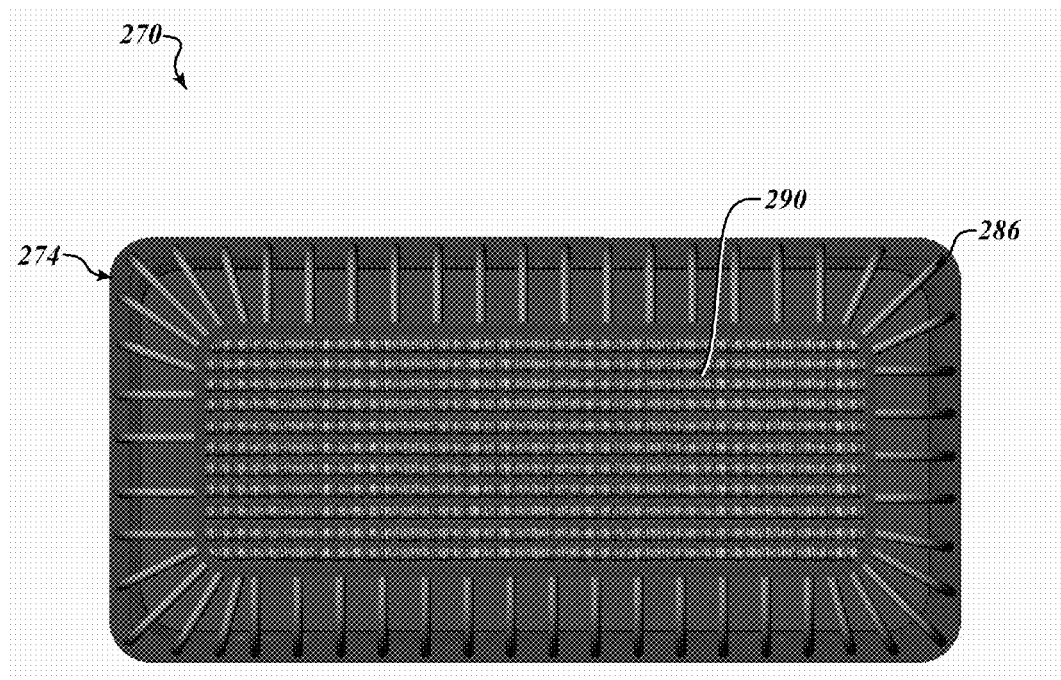
FIG. 52 is an isometric view of the device of FIG. 51 with a top shown in an opened configuration.
Figure 53:
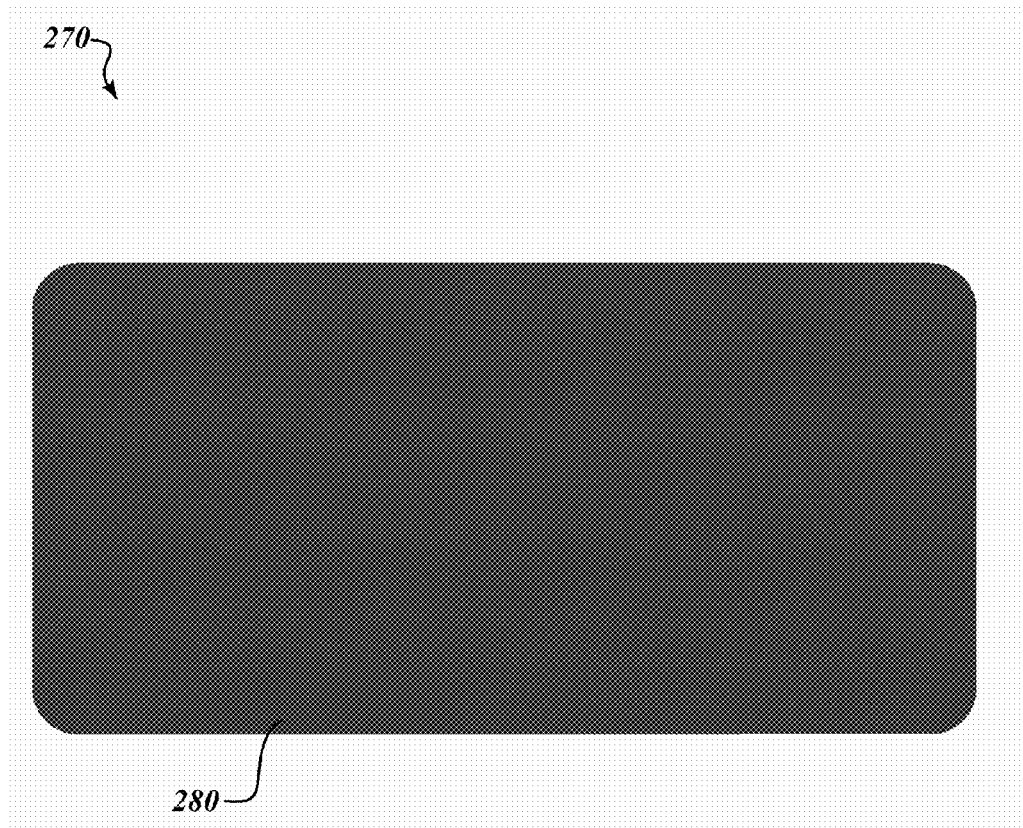
FIGS. 53-58 are top, bottom, front, back, right, and left side plan views, respectively, of the device of FIG. 51.
Figure 54:
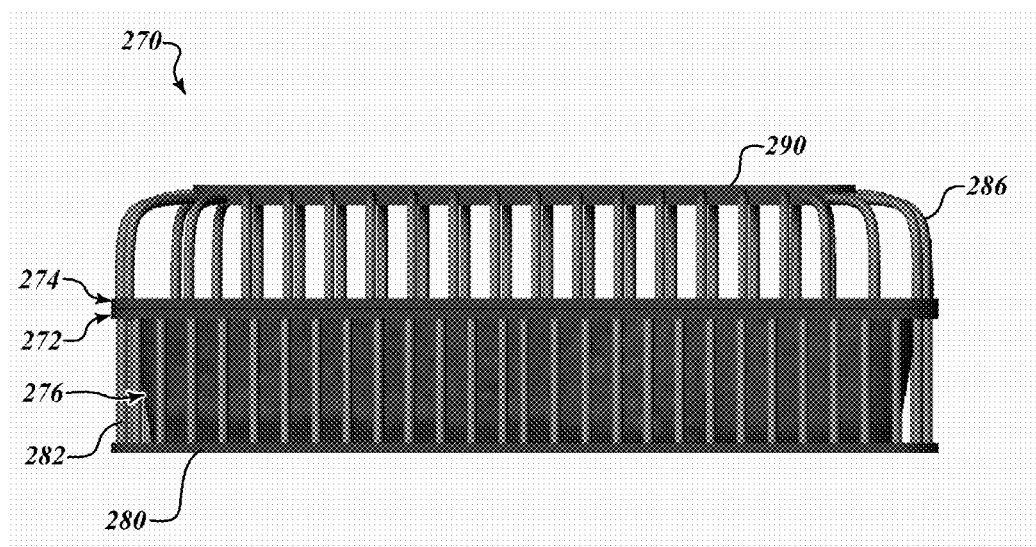
Figure 55:
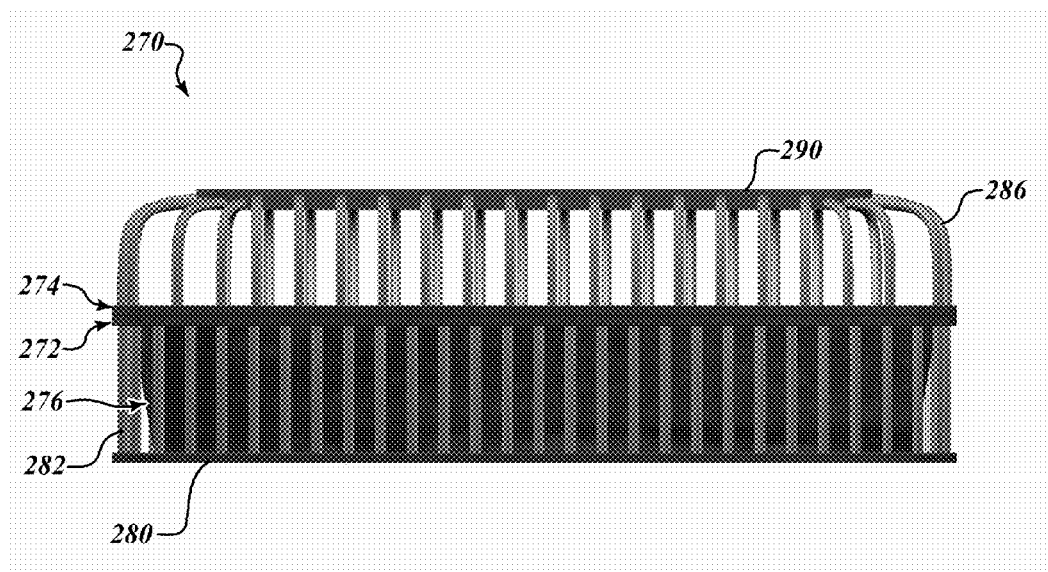
Figure 56:
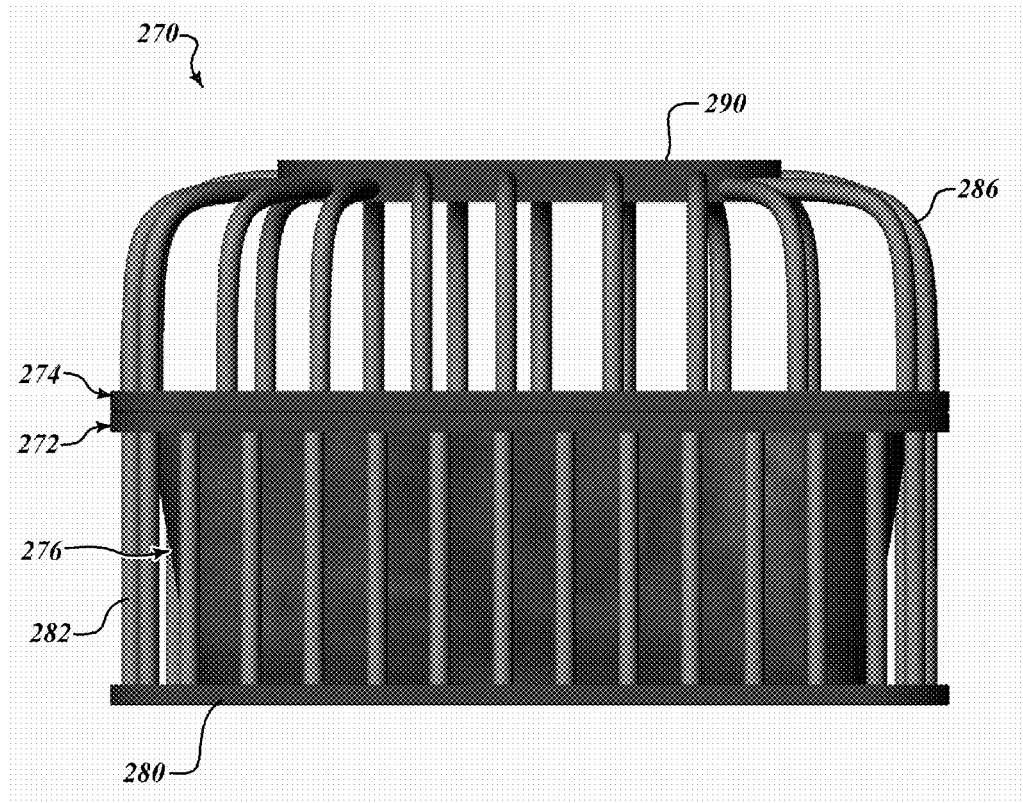
Figure 57:
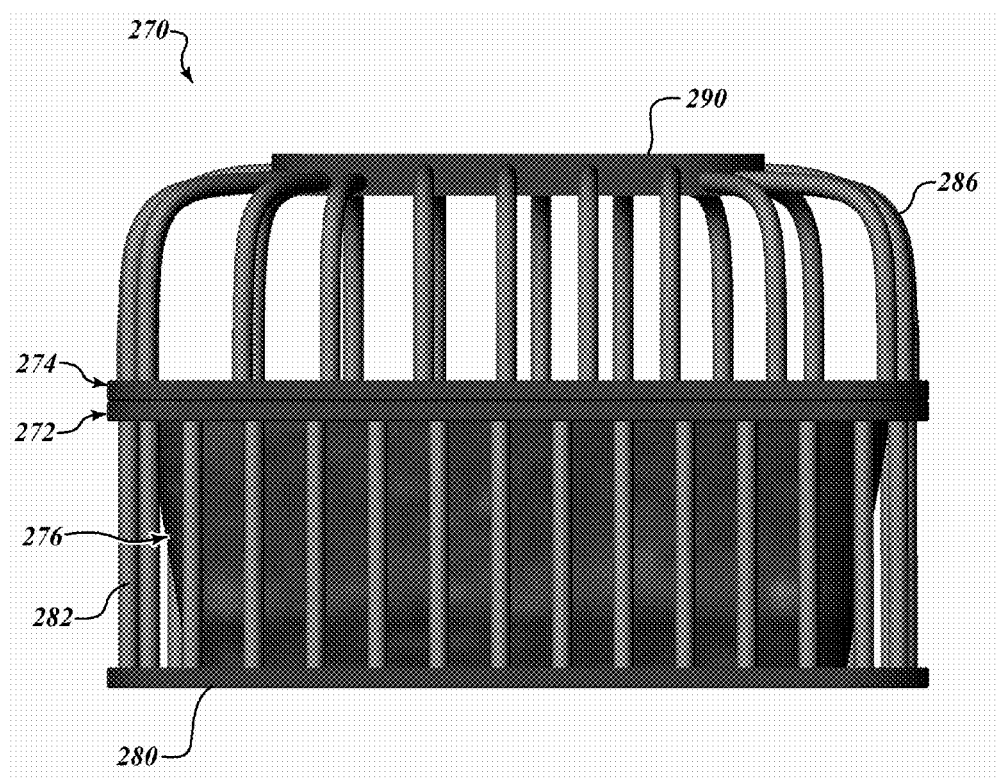
Figure 58:
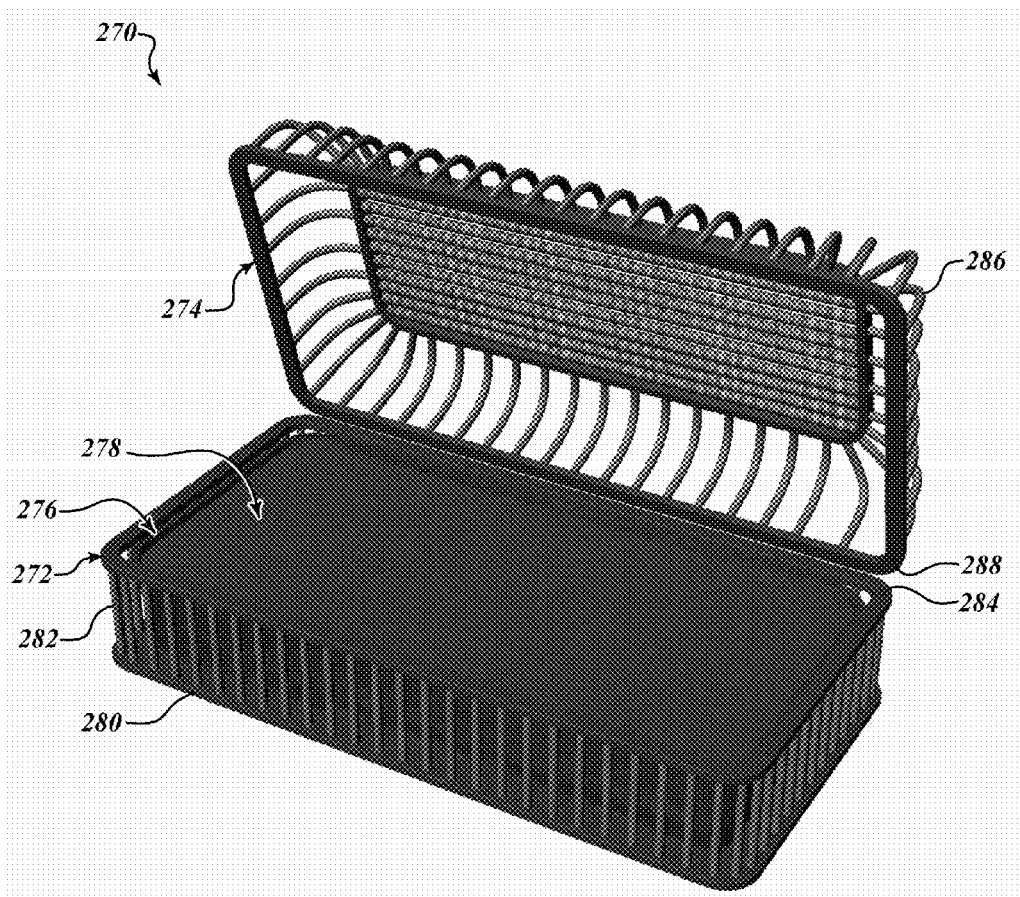
Figure 59:
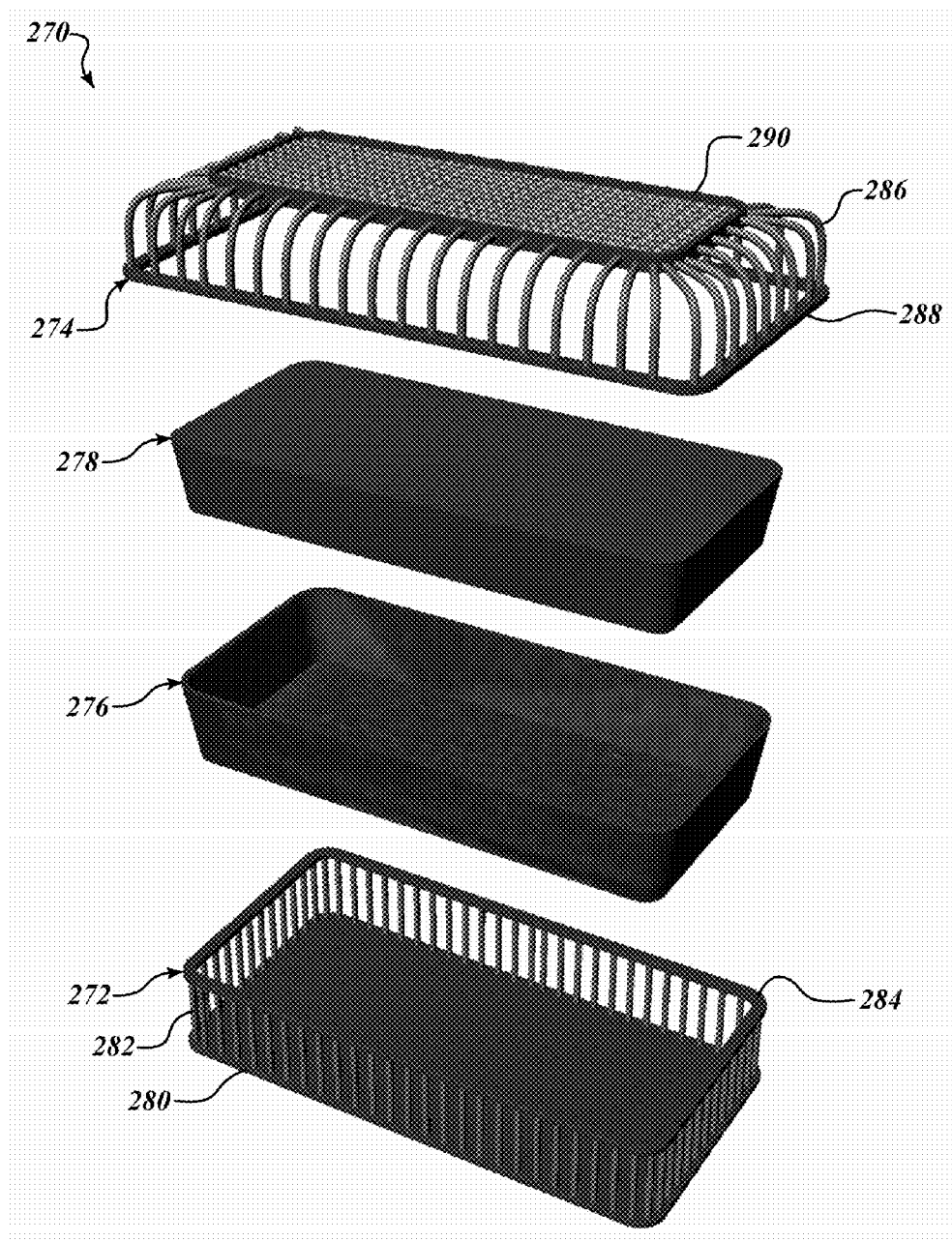
FIG. 59 is an exploded isometric view of the device of FIG. 51.
Figure 60:
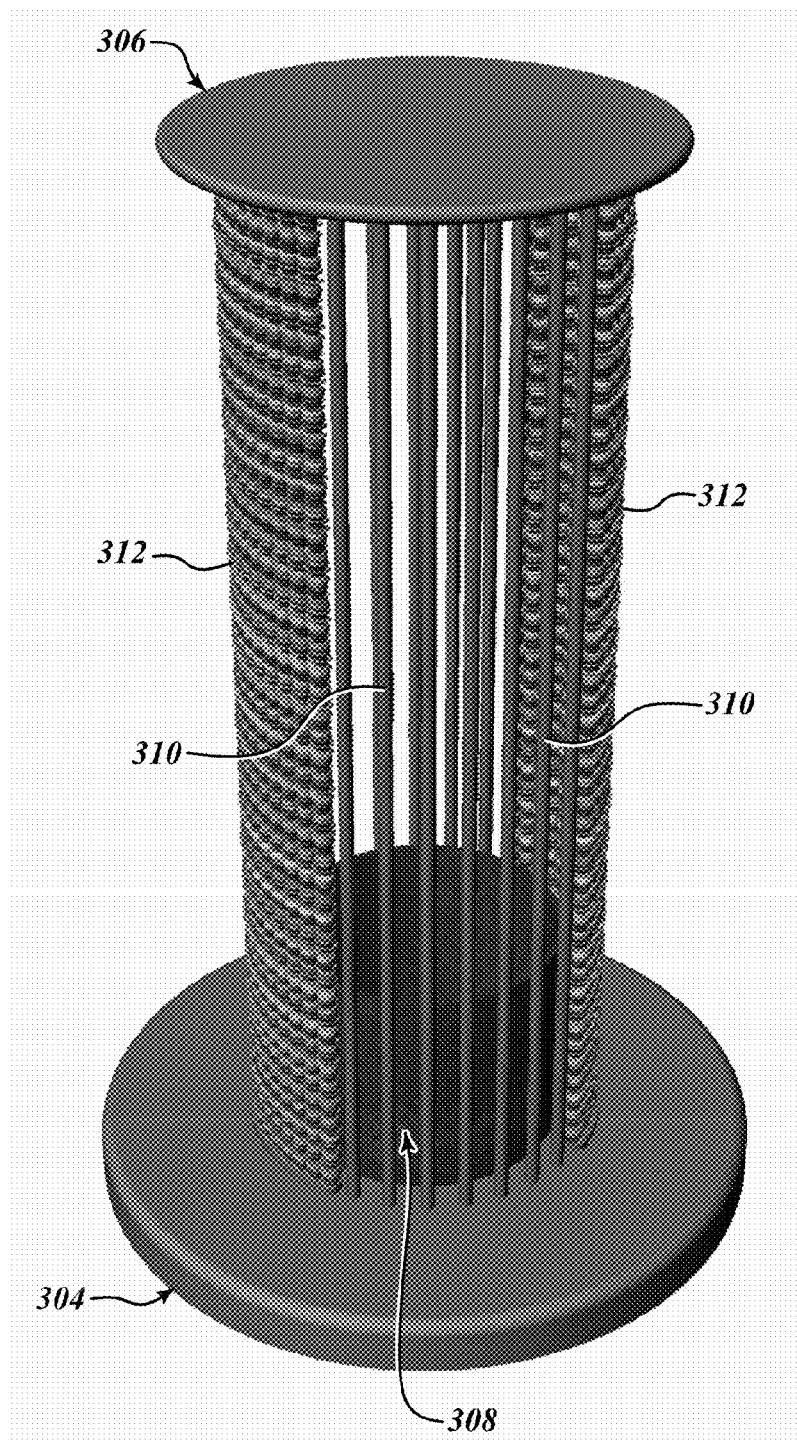
FIG. 60 is an isometric view of an eighth device formed in accordance with the present disclosure.
Figure 61:
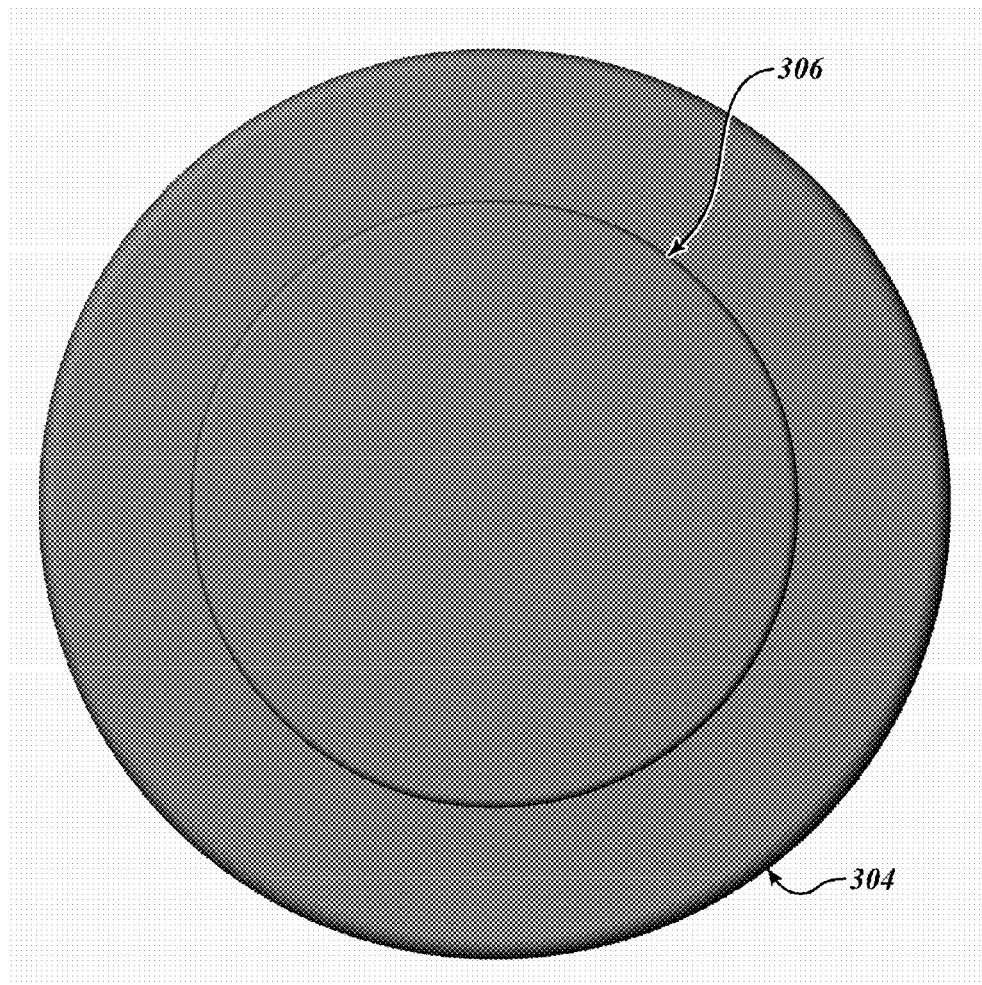
FIGS. 61-66 are top, bottom, front, back, right, and left side plan views of the device of FIG. 60.
Figure 62:
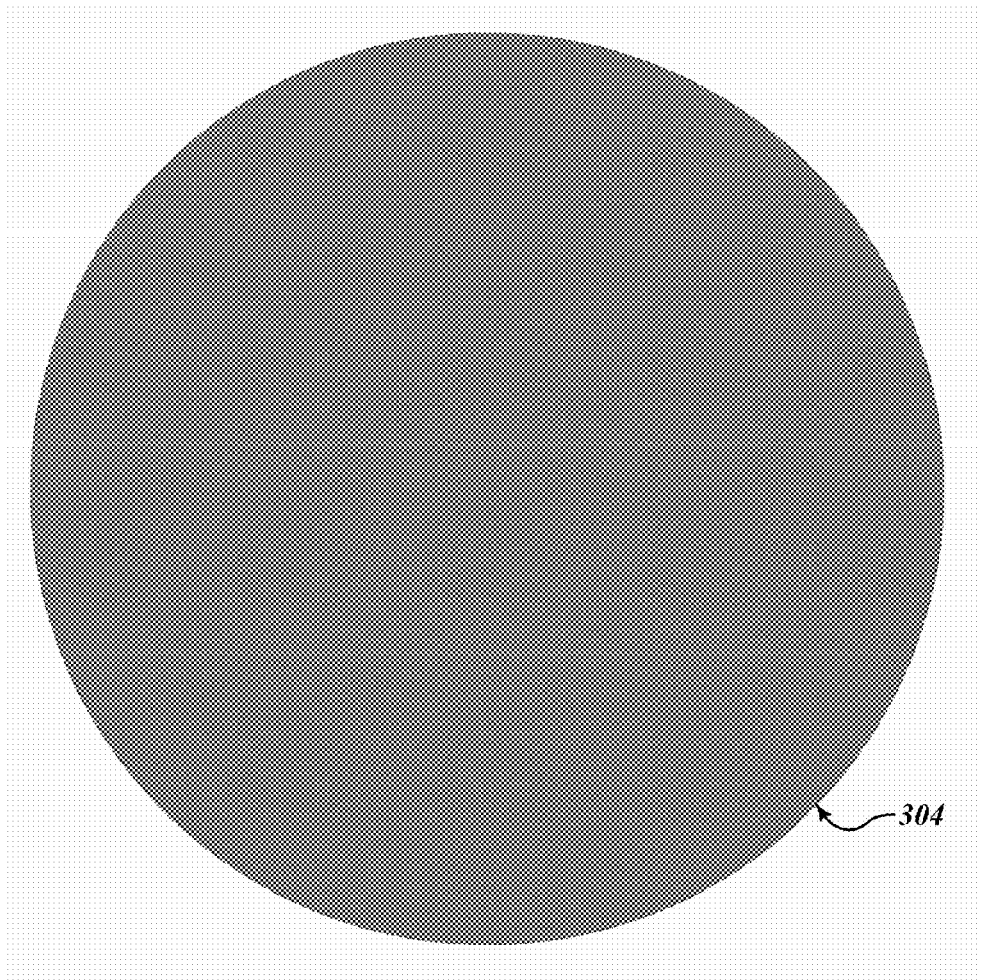
Figure 63:
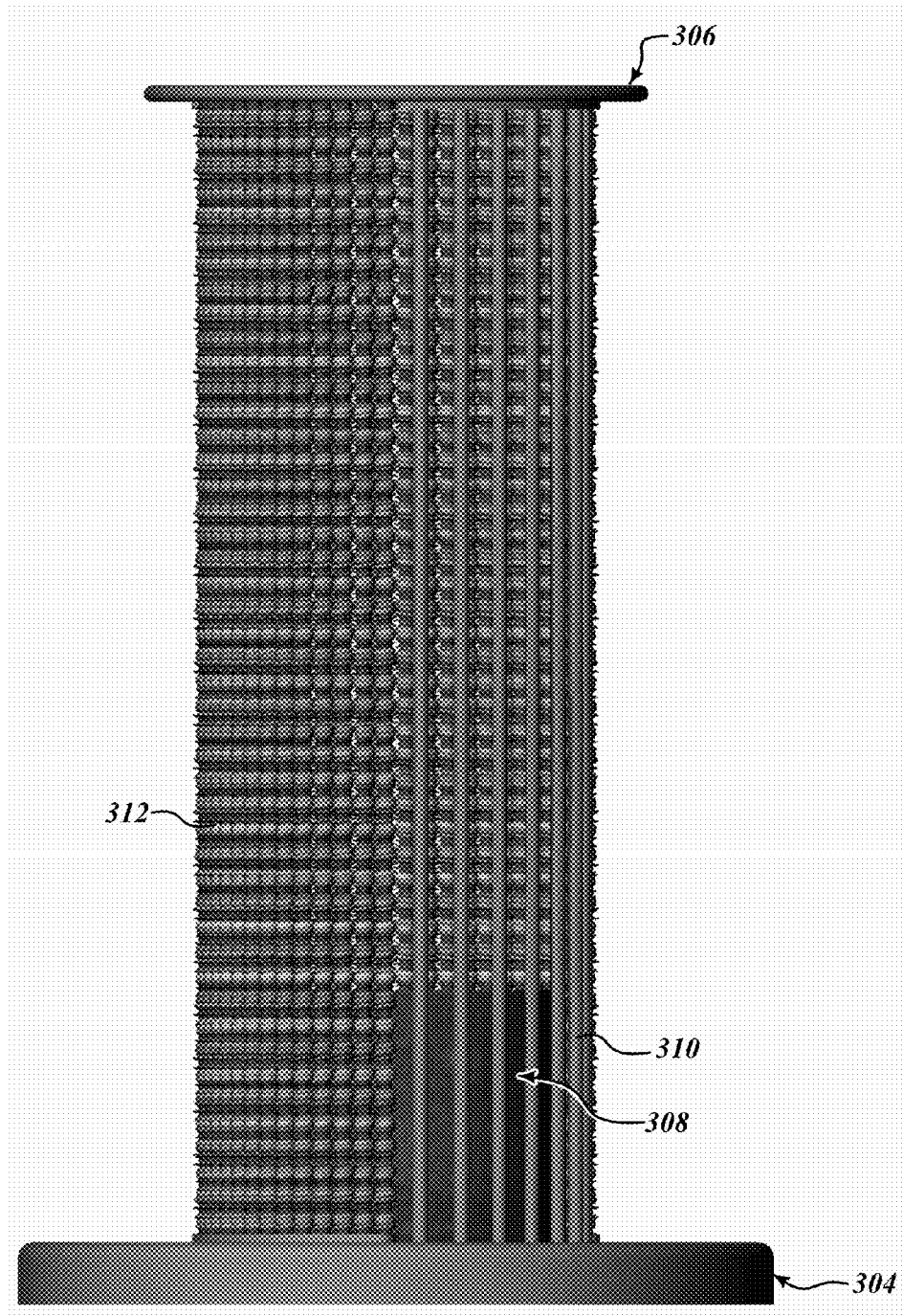
Figure 64:
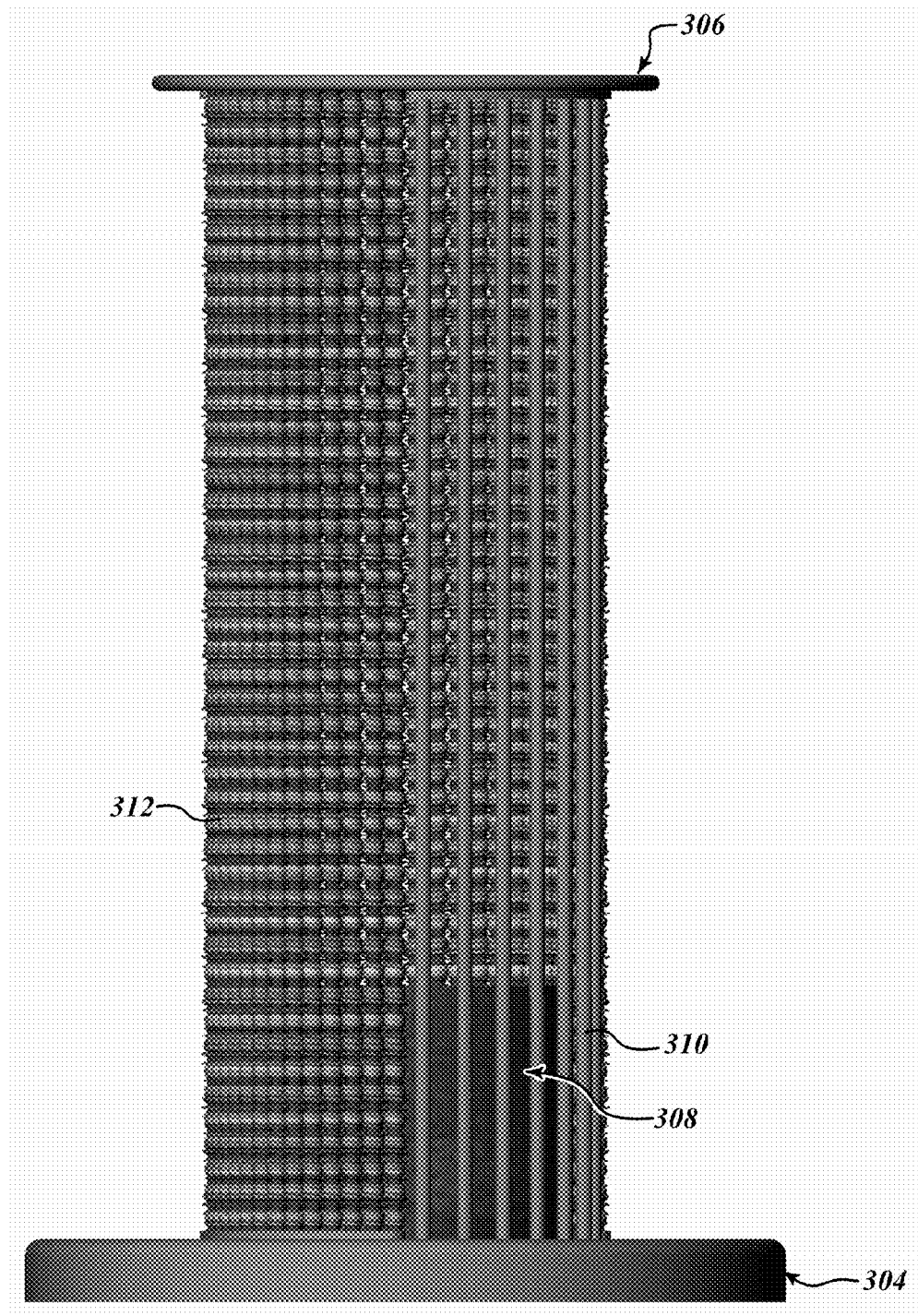
Figure 65:
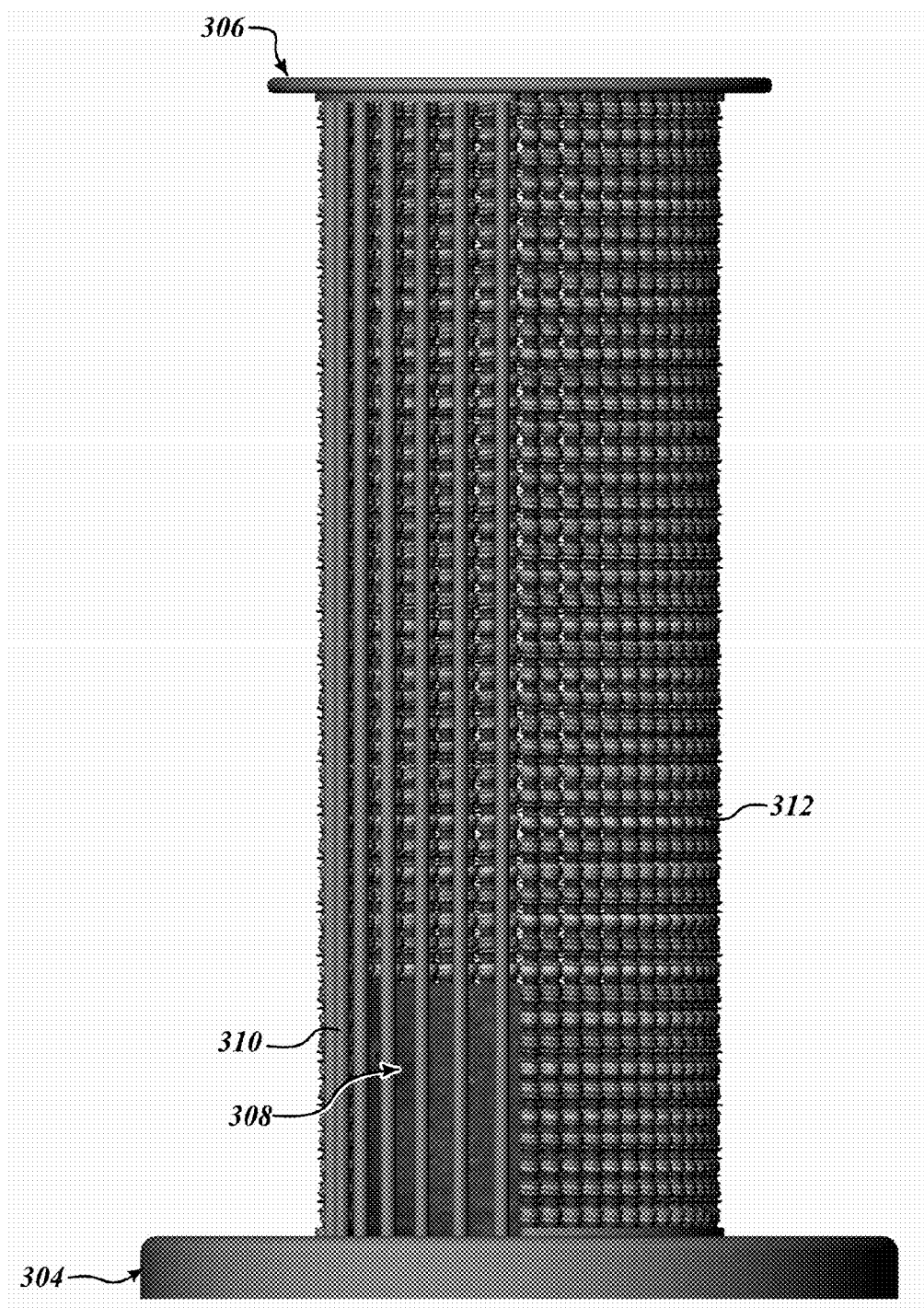
Figure 66:
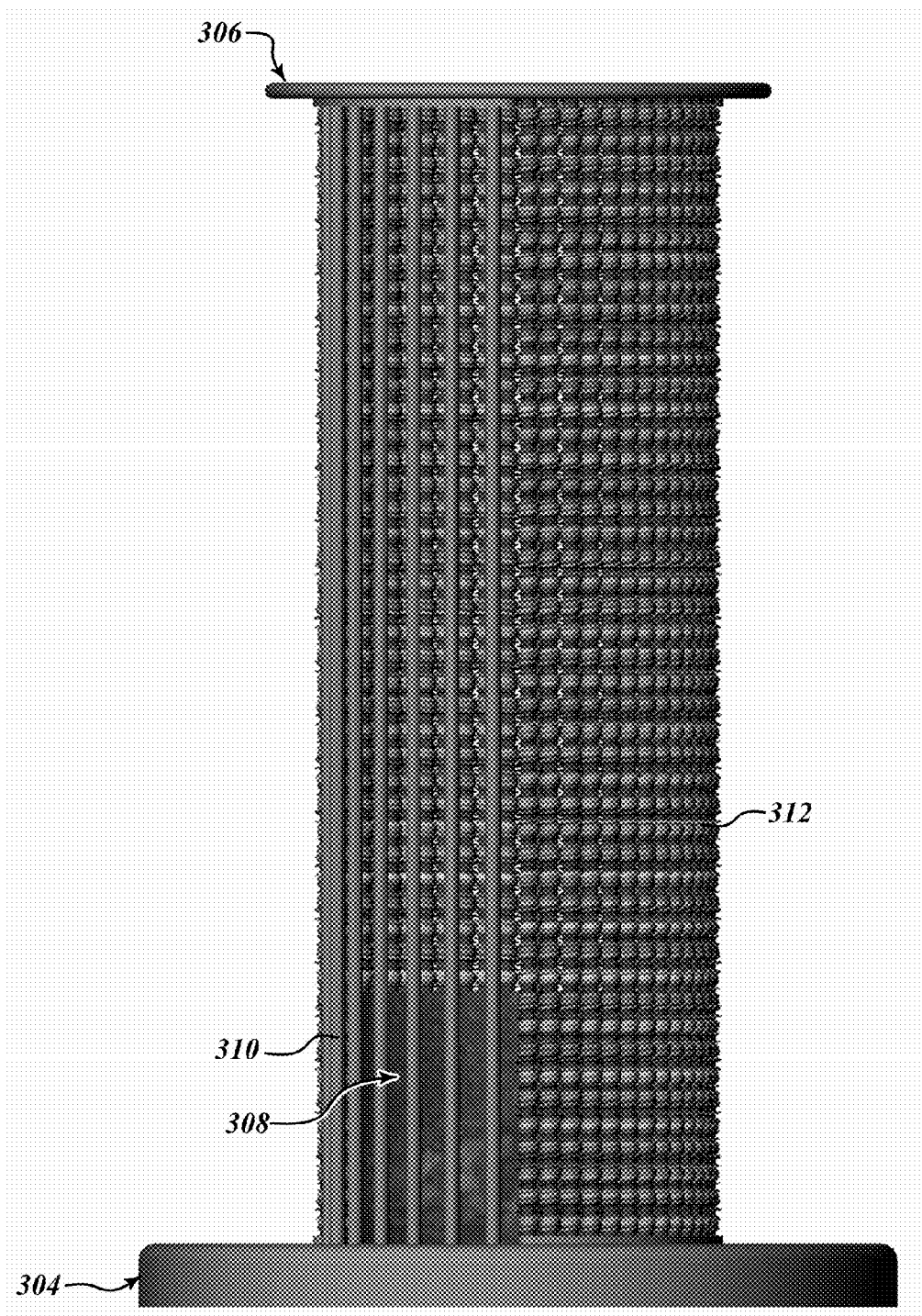

FIGS. 43-50 show a sixth embodiment of the present disclosure in which a live catnip cat toy device 250 is provided to include, as shown more particularly in the exploded view of FIG. 50, a cage 252 supported on a plant base 254 in which is contained a medium 256 for supporting plant life (not shown). The medium can be dirt or other material as previously described. Also shown are a plurality of suction cups 258 that are attached to the plant base 254 and facilitate attachment of the device 250 to a solid surface, such as glass, wood, metal, and the like. The suction cups 258 are attached to the base 254 via suction cup holders 260 incorporated into or attached to the base 254 in a conventional manner that will not be described in detail herein.

The cage 252 in this embodiment is an integral component, which may be formed of injection molded plastic or similar material, as can be the base 254. The cage 252 has a plurality of horizontal and vertical ribs 262, 264 forming a rectangular plan form shape dome that extends upward to a top structure 266. Here, the vertical ribs 264 curve to a horizontal orientation so that the top is substantially flat, forming a truncated four-sided pyramid-type structure. It is to be understood that the size and shape of the structure is purely ornamental, as are the size and shaping of the ribs 262, 264. The spacing of the ribs 262, 264 is designed to prevent a cat from inserting its paw within the cage yet allowing sufficient light and air into the cage 252 to sustain plant life in the plant medium 256 and to allow the plant to grow out through the cage 252 as described in previous embodiments above.

The base 254 has a circumscribing ridge 268 within internal dimensions large enough to receive an extending flange 270 on the bottom of the cage 252, thus retaining the cage 252 in position on the base 254. Latches or other retaining devices, such as fasteners, may be used to hold the cage 252 to the base 254 to prevent access by the cat or other animal or damage to the plant should the device 250 tipped over or become disconnected inadvertently from a supporting structure. Ideally this embodiment of the present disclosure can be attached to a window to provide light for the plant while still giving the cat limited access to the catnip plant.

A seventh embodiment of the present disclosure is illustrated in FIGS. 51-59 in the form of a horizontal scratcher live catnip protective enclosure 270. As shown more particularly in FIG. 59, the enclosure 270 includes a scratcher bottom 272 supporting a scratcher top 274, preferably hingedly attached to the bottom 272 via conventional hinge (not shown) which will not be described in more detail hereinbelow. For example, the hinge may be a piano hinge attached along one side of the top 274.

A plant pot 276 containing plant sustaining material 278, such as dirt, is retained within in the bottom 272.

The scratcher bottom 272 has a solid bottom surface 280 and a plurality of upright ribs 282 forming the circumscribing walls of the bottom 272. A circumscribing rim 284 defines the top of the scratcher bottom 272. The scratcher top 274 also has a plurality of ribs 286 extending upward from a circumscribing base 288 to a solid top surface 290. Ideally the ribs 286 are curved as they transition from a vertical orientation to a horizontal orientation where they meet at the top 290. The radius of curvature and the cross-sectional configuration and size of the ribs 282 and 286 are a matter of design choice and are chosen for aesthetic appearances. The spacing between the ribs 282, 286 is designed to prevent a cat's paw from being inserted into the interior of the enclosure 270 while permitting light and air into the plant inside the enclosure 270 and to allow the plant to grow outside of the enclosure 270.

The horizontal scratcher live catnip protective enclosure 270 of this embodiment of the present disclosure provides a horizontally oriented scratching surface 290 for cats. Ideally it is made of natural bamboo and sisal or similar materials. The center segment 290 consists of bamboo bars wrapped in sisal, providing an attractive scratching surface. The bamboo bars are spaced close together to create a more solid platform for the cat's claws.

A vertical scratcher live catnip enclosure 300 is illustrated in FIGS. 60-67. In this embodiment, a cylindrical cage 302 is supported on a disk-shaped circular base 304 and has a disk-shaped circular top 306 of smaller diameter than the base 304. A pot 308 is contained inside the cage 302 in which may be placed a live catnip plant with supporting medium (not shown).

Figure 67:
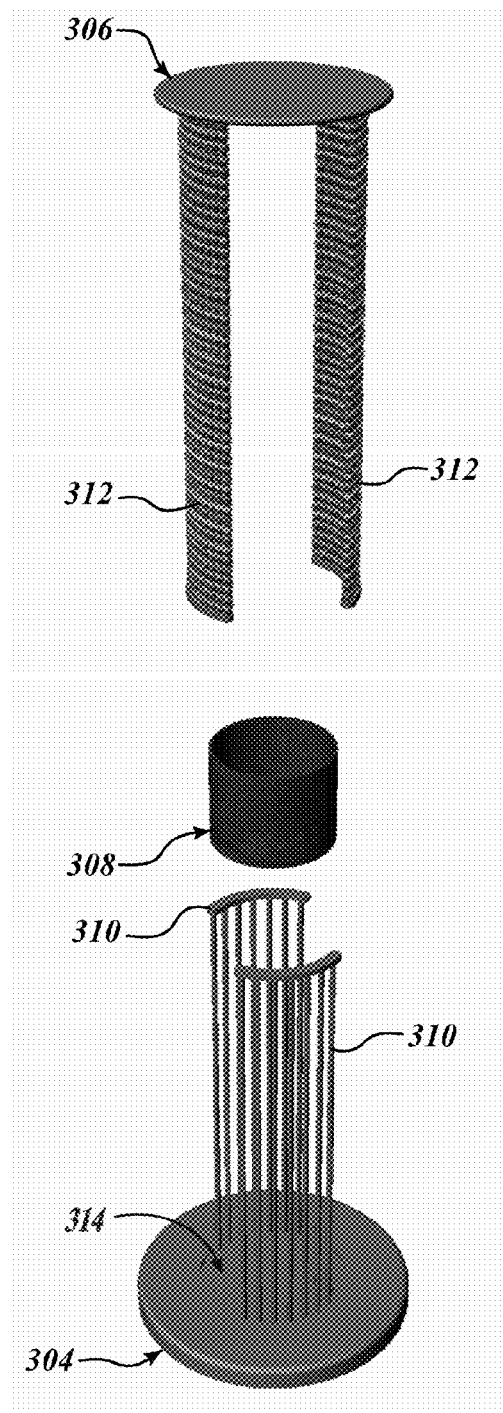
FIG. 67 is an exploded isometric view of the device of FIG. 60.
Figure 68:
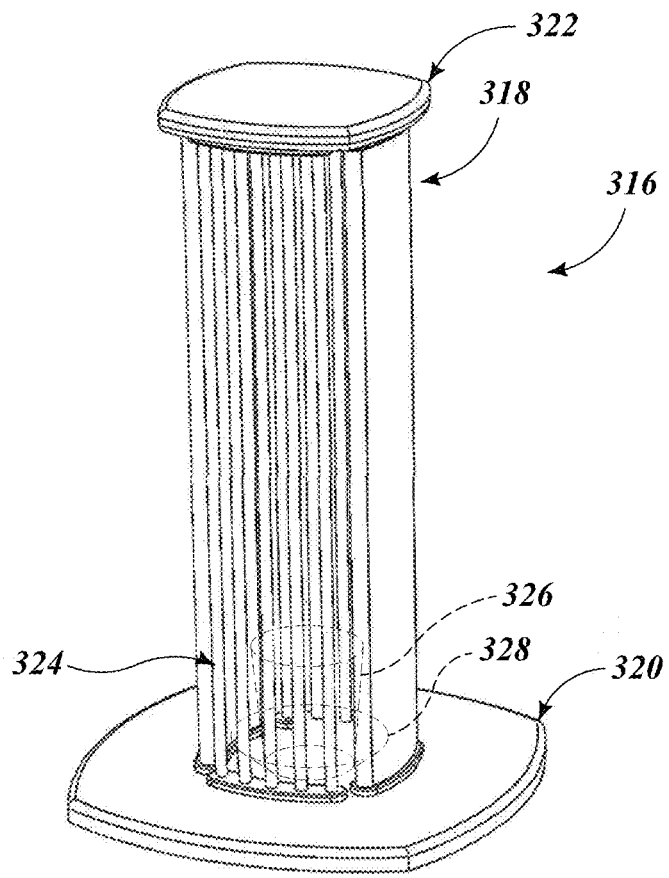
FIGS. 68 and 69 are isometric views of a ninth device formed in accordance with the present disclosure.
Figure 69:
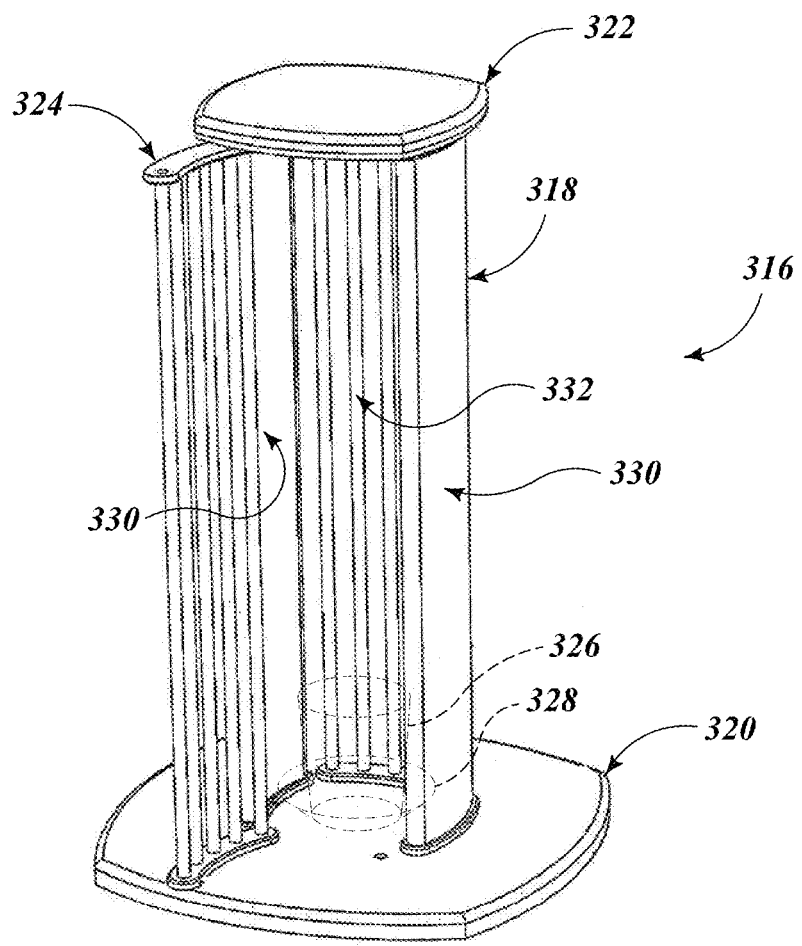
Figure 70:
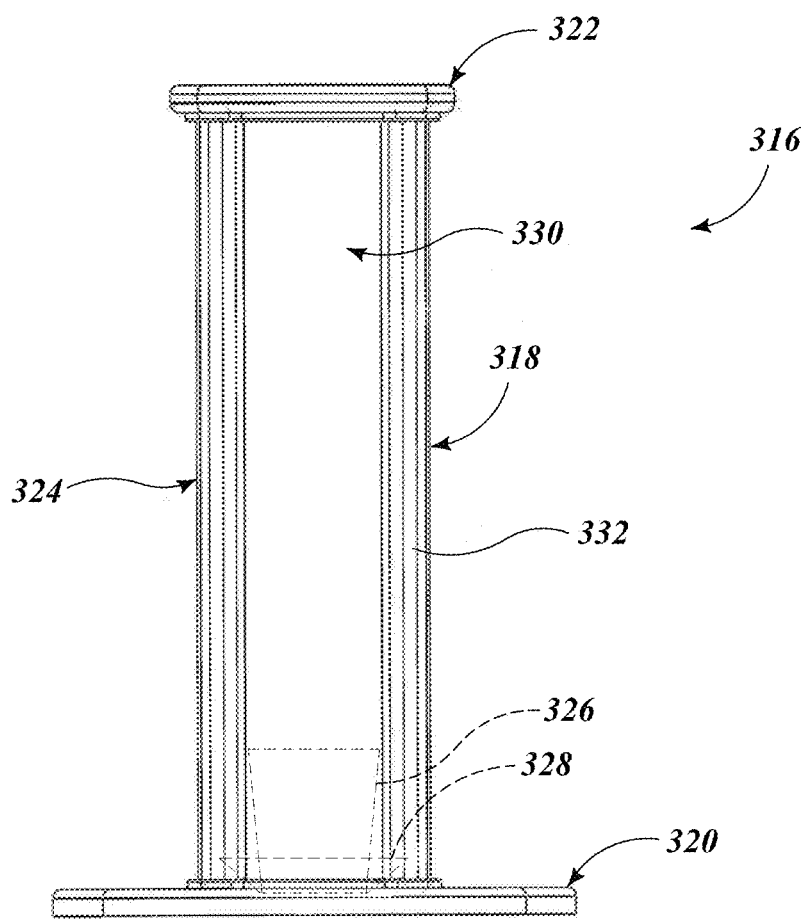
FIGS. 70-74 are left and right side, front, top, and bottom side plan views of the device of FIG. 68.
Figure 71:
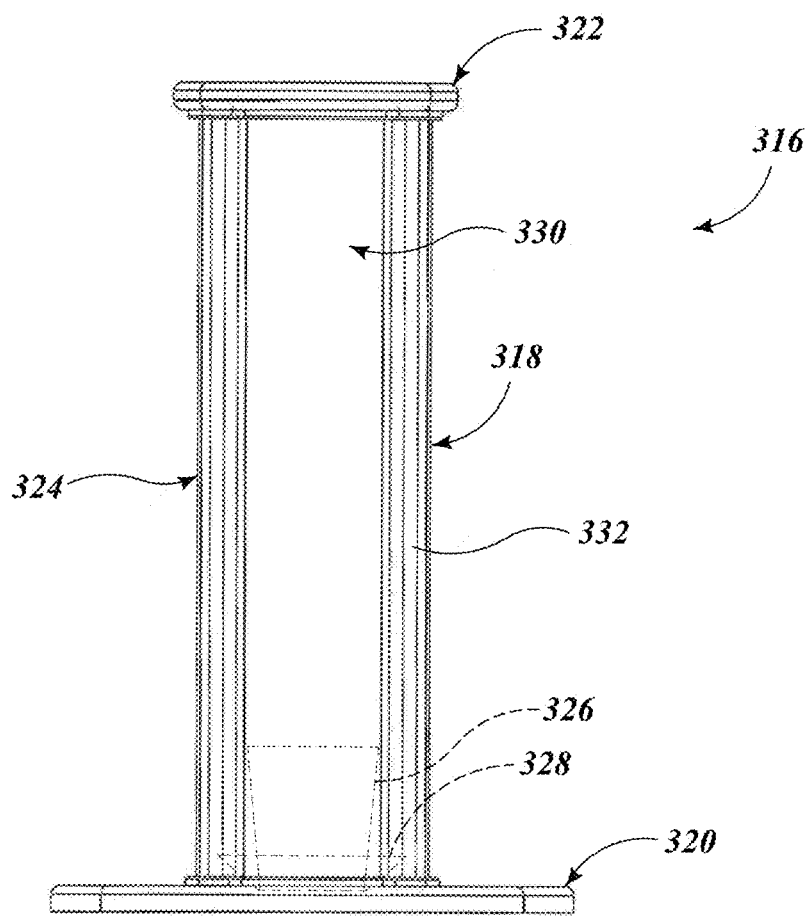
Figure 72:
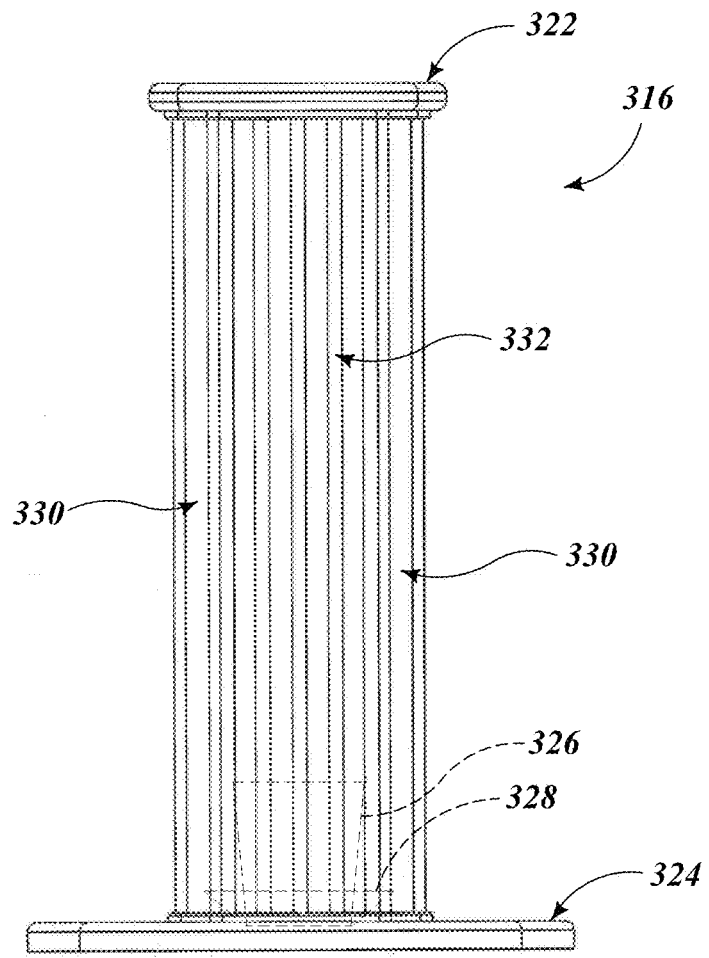
Figure 73:
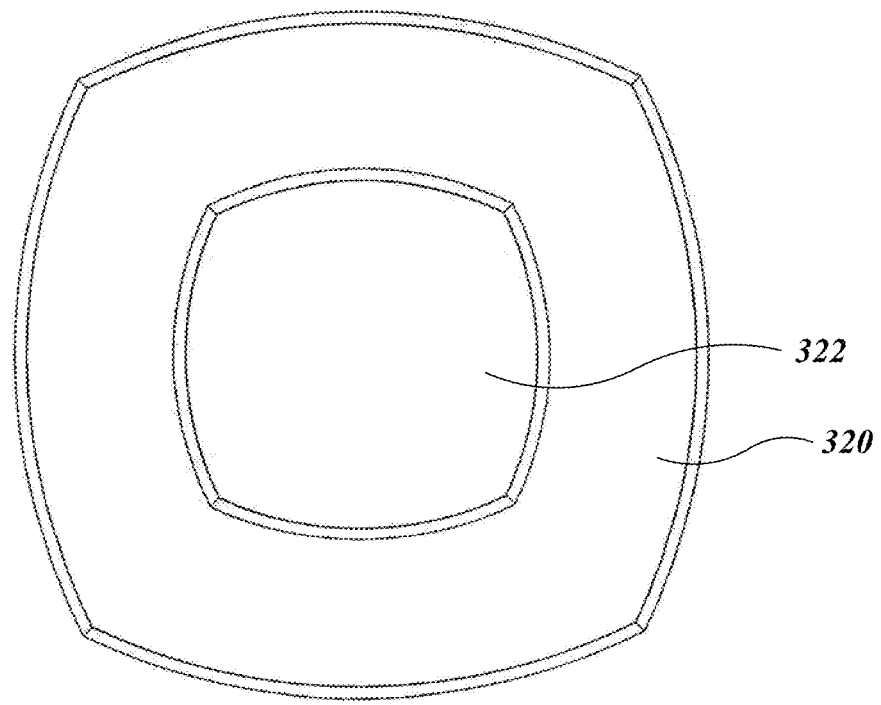
Figure 74:
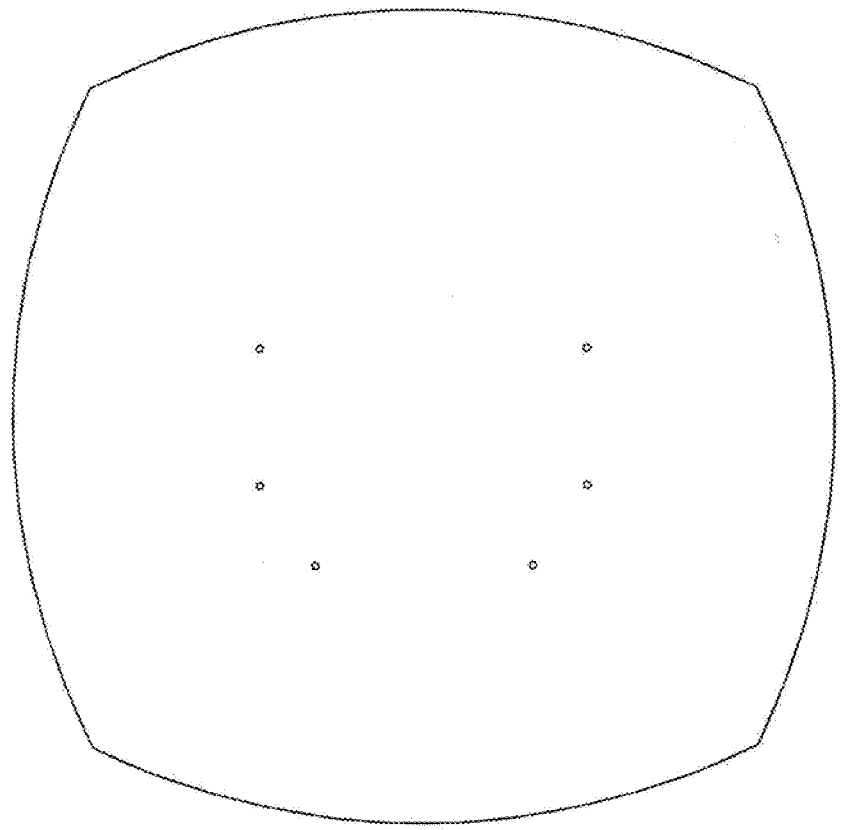
Figure 75:
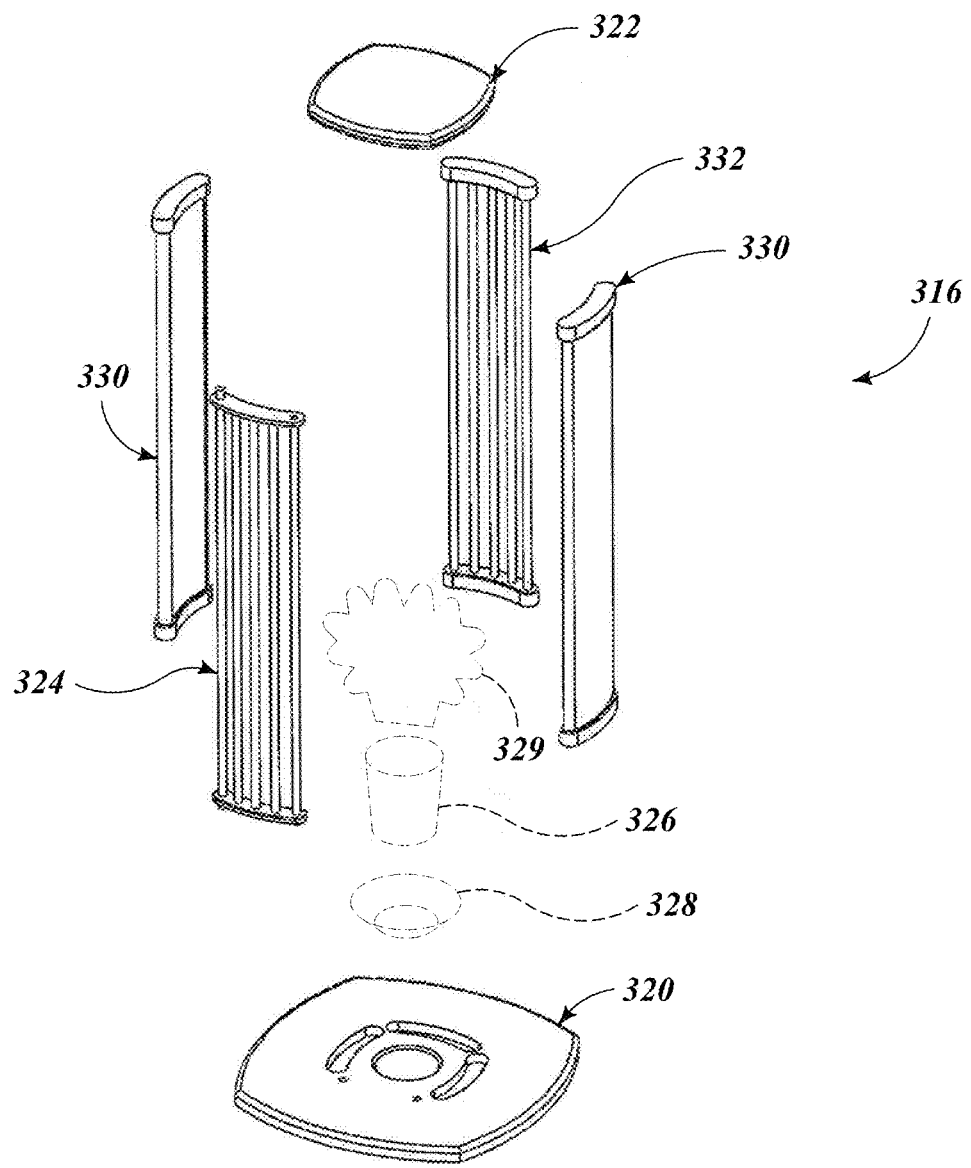
FIG. 75 is an exploded isometric view of the device of FIG. 68.
Figure 76:
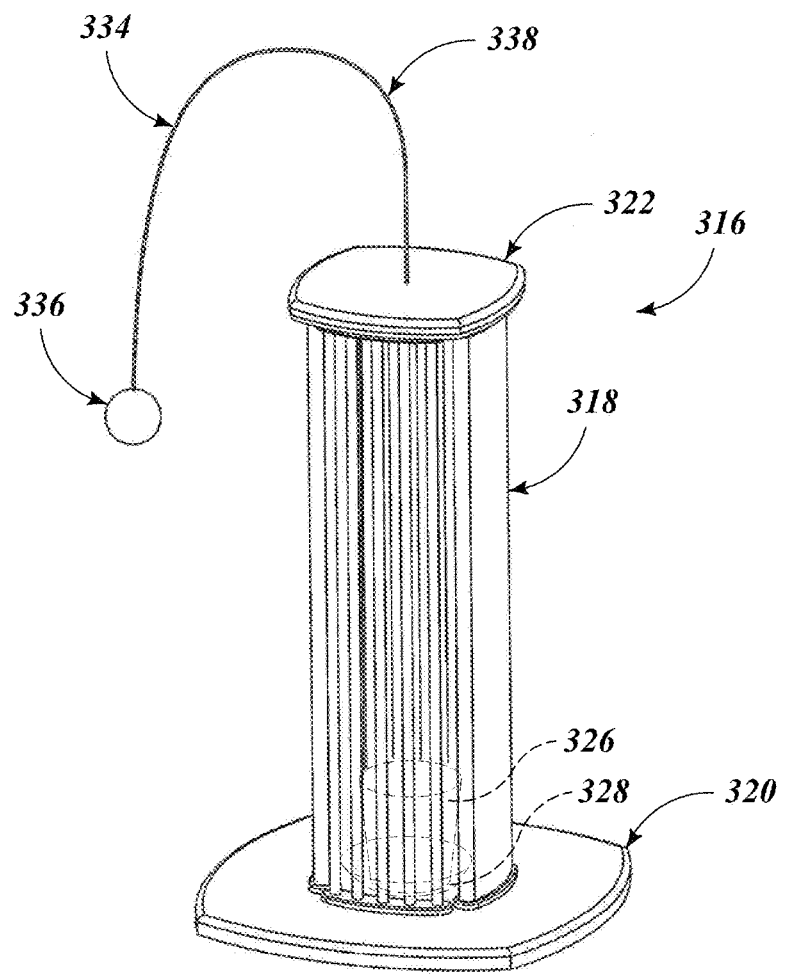
FIG. 76 is an isometric view of an alternative embodiment of the ninth device of FIG. 68.

The cage construction 302 is shown more detail the exploded view in FIG. 67. As can be seen here, the cage consists of two components, the vertically upright ribs 310 formed in two arcuate sections and two or more less solid sections 312 shown extending downward from the top 306. The solid sections 312 interleave with the ribbed sections 310 to form a complete cylindrical or tubular enclosure for the plant. The ribbed sections 310 have each of the individual ribs spaced apart to allow light and air into the plant while preventing an animal, such as a cat, from putting its paws or snout into the enclosed area. In addition, the plant is permitted to grow through the spaces between the ribs, thus providing access to the plant for the cat, as described above.

The two quarter panel sections 312 are made of bamboo boards or bars or similar materials that are wrapped in sisal. The bars are spaced closer together to provide a solid scratching surface for the cat.

In one embodiment, the top 306 nests into the cage 302 which nests into the base 204 to make a secure connection. Various ways of attaching these components together are known to those skilled in the art and readily commercially available and will not be discussed in detailed herein. For example, closure tabs may be provided that removably lock the bottom 304 and the top 306 to the cage 302, or to certain portions of the cage, such as the solid sections 312 or the ribbed sections 310. This facilitates repair and replacement of the solid sections 312, which may be formed of sisal panels that can be replaced when worn out.

A small circular pocket 314 is shown formed in a top surface of the base 304 to stabilize the position of the pot 308. In order to further stabilize the entire structure, the base or bottom 304 is sized and weighted so as to withstand side forces to the cage 302. In one embodiment, the base is approximately 14 inches in diameter and ¾ inches thick. It can be formed of medium density fiberboard (MDF), although if it is formed from plastic, additional weight would be required and the plastic should be of a non-toxic material.

The ribbed sections 310 can be formed of rods or dowels, preferably of bamboo because it is sustainable, durable, and not harmful to the environment. However, green MDF material may also be used as well.

The solid sections 312 may be coated with a scratch material, such as the aforementioned sisal or jute. The material is preferably glued and wrapped around each of the bars in the solid section 312 so that they touch adjacent bars. Alternatively, the solid section 312 can be wrapped together as a bundle or the material can be formed as a mat that is attached to the bars of the solid sections 312. Ideally, the solid sections 312 provide a comfortable, attractive, surface that cats will want to scratch. To enhance the attractiveness of the solid sections 312, an owner or user can pluck a live leaf from the catnip plant inside the cage 302 and rub it on the solid sections 312. Using smaller younger plants is preferred because the leaves have been found to be more potent to a cat.

In a preferred embodiment, the rods are approximately 22 inches in length. However, the dimensions of this particular embodiment can be in the range of 18 to 30 inches tall with a preferred height of about 24.5 inches. The column can have a diameter in the range of 3 inches to and including 9 inches, with a preferred diameter of 5.5 inches in order to hold a 3 inch pot, which would be the smallest pot to sustain the life of the plant.

Other options include adding a toy, such as a ball ring or a toy on a wire, which can be attached to the vertical enclosure 300. The top 306 can also be large enough to form a ledge on which a cat can stand, sit, or recline. The ledge extends beyond the solid sections 312 and ribbed sections 310, as shown in FIGS. 63-67, and can include openings on which toys can be tied to hang down alongside the cage 302.

One version of the vertical enclosure 300 can include a light attached to an underside of the top 306. The top 306 can also be removably attached with the tabs mentioned above to provide water to the plant. Watering from the side of the cage 302, such as through the ribbed sections 310, may be possible inasmuch as the distance between the bars is preferably ½ inch in order to prevent a cat's paw from reaching therethrough while allowing the spout of a watering can to extend into the cage 302.

In accordance with another embodiment of the present disclosure, a kit can be provided for the various embodiments described above. In accordance with one aspect of the disclosure, the kit would include a pot, a saucer to go underneath the pot if not built into the pot, plant seeds, and a growing medium. This kit can be sold with the various embodiments described above as a larger kit or as an accessory. In addition, the various kits can also include a live plant instead of the seeds. Moreover, an optional watering can and a cage cover can be provided alone or in combination with the kit.

In accordance with another aspect of the present disclosure, a handle is formed on the top 306 to facilitate lifting and relocating of the device. For example, in one form the handle can be openings formed in the top 306 that are sized and shaped to allow a user's fingers on one side and thumb on the other to reach through the top 306 and grasp it around a center portion. Another approach is to attach a handle that extends upward above the top 306 to be grasped by a user. The design of such handle can be adopted from well known designs in this field.

The pot 308 for the live plant can be a husk pot formed of recycled plant fibers, which is green and sustainable, and its weight is light for shipping and transport. Additionally, a wrap material can be used to hold and contain the soil or medium, such as a fine mesh netting, which allows air and water to enter and the plant to grow out of it while preventing spillage of the medium.

Although various embodiments of the present disclosure have been illustrated and described, it is to be understood that changes may be made therein to enhance the appearance or performance of the disclosed embodiments. For example, a heavy, gripping material may be used on the bottom surface of any of the embodiments to provide a tread or gripping surface to prevent sliding or movement. This prevents the cat from being able to topple the assembly or push it around. The vertical scratcher embodiment 300 can include a door or a removable top to provide access to the plant for care and cleaning. The top may also have a water distributor as described with respect to previous embodiments or may include a mast with string and ball.

Alternatively, the mast may be in the form of a strain relief wire attached at or near the top of any of the foregoing embodiments. Also, in any of the embodiments the plant pot may be built into the bottom or base instead of being a separate component.

Moreover, the enclosures described herein can be incorporated into a larger cat play station, similar to cat condos that are currently on the market. The enclosure would be incorporated with platforms, tunnels, and other surfaces for the cat to perch and play on. This enables the cat to lounge near the plant or to play with the container from different angles. Other types of toys can also be incorporated into the play stations such as dangling strings or plush animals.

In accordance with another aspect of the present disclosure, a light may be placed inside the protective cage in any one of the embodiments to provide heat as well as light to the plant. The power cord for the light can be inserted and contained within one of the ribs or bars in the protective cage. For example, a bar can be formed of hollow bamboo that contains the power cord so that it is not accessible to the cat.

FIGS. 68-76 illustrate a ninth embodiment of the present disclosure in the form of a plant enclosure 316 that includes a scratching surface so that it functions as a scratching post. In this embodiment, the scratching post enclosure 316 includes a cage 318 with one end mounted on a base 320 having a top 322 at a second end of the cage 318. As shown in the top view of FIG. 73, the top 322 is smaller in plan form dimensions than the base 320. In addition, the cage 318 has a height that is several times longer than a width of the top 322 and almost two times longer than a width of the bottom 320. Ideally, the bottom or base 320 made of a heavy ¾" MDF to provide mass and stability, as it is important to its function as a scratching post to be stable and withstand the forces applied by a cat The cage 318 includes a door 324 pivotally mounted to the top 322 and bottom 320 to swing between a closed position shown in FIG. 68 and an opened position shown in FIG. 69. Because conventional methods and devices may be used to hingedly mount the door to the bottom 320 and top 322, they will not be described herein. A pot 326 (shown in phantom) is mounted in a saucer 328 (also shown in phantom) for housing a plant 329 (shown in FIG. 75).

In this embodiment the cage 318 is similar to the cylindrical cage 302 shown and described above with respect to FIGS. 60-67. This includes vertically upright ribs 332 formed in a first section that opposes or is mounted opposite the door 324. The side panels 330 are formed of a solid material that is covered with a scratching surface material suitable for a cat. In the variation shown in FIG. 76, a cat toy 334 is mounted to the top 322 in the form of a spherical ball or object 336 mounted on one end of a resilient spring-like rod 338 that has its other end mounted in the top 322.

Figure 77:
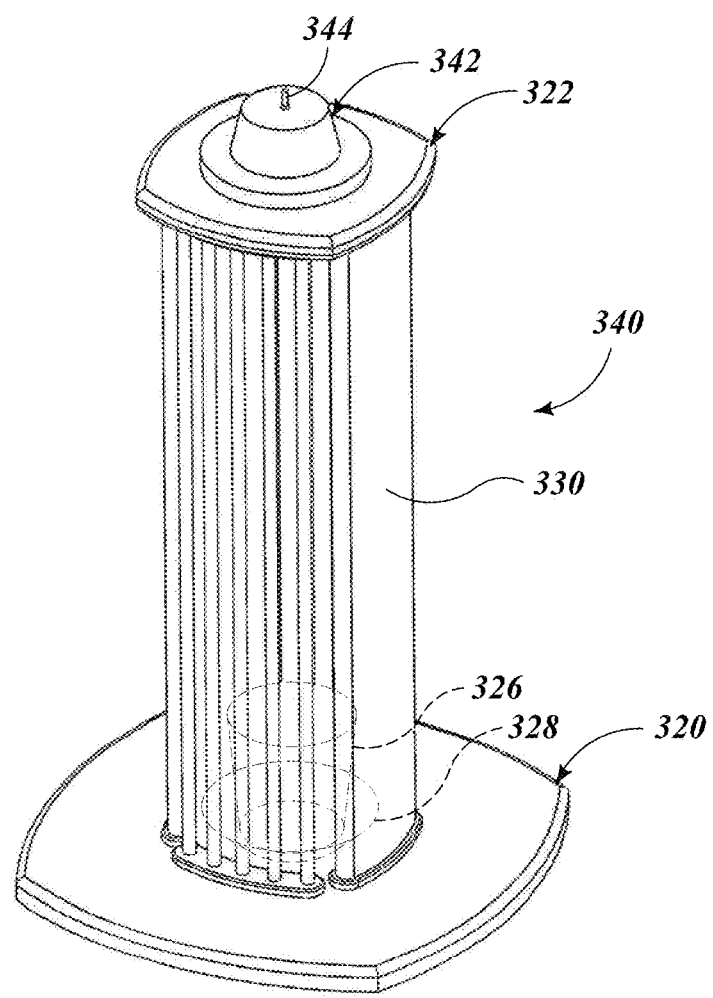
FIG. 77 is an isometric view of a tenth device formed in accordance with the present disclosure.

Shown in FIG. 77 is a tenth embodiment of a device formed in accordance with the present disclosure in the form of a vertical cat scratching post 340 that is substantially identical to the constructions shown in FIGS. 68-75. Consequently, similar reference numbers are used to refer to similar components. Here, a light 342 is mounted on the top 322 to provide artificial light to a plant 329 (shown in FIG. 75). Because such lights are readily commercially available, this particular light 342 will not be described in detail. Briefly the light 342 includes a switch 344 on the top to activate and deactivate the light. Power for the light can come from an internal battery or an external power source such as a cord plugged into a standard 110-240 volt outlet. As discussed above, the light source can be configured to provide not only light but also heat to the plant. Although it is shown mounted in the top 322, it is possible to mount the light in other locations on or inside the cage 318.

Figure 78:
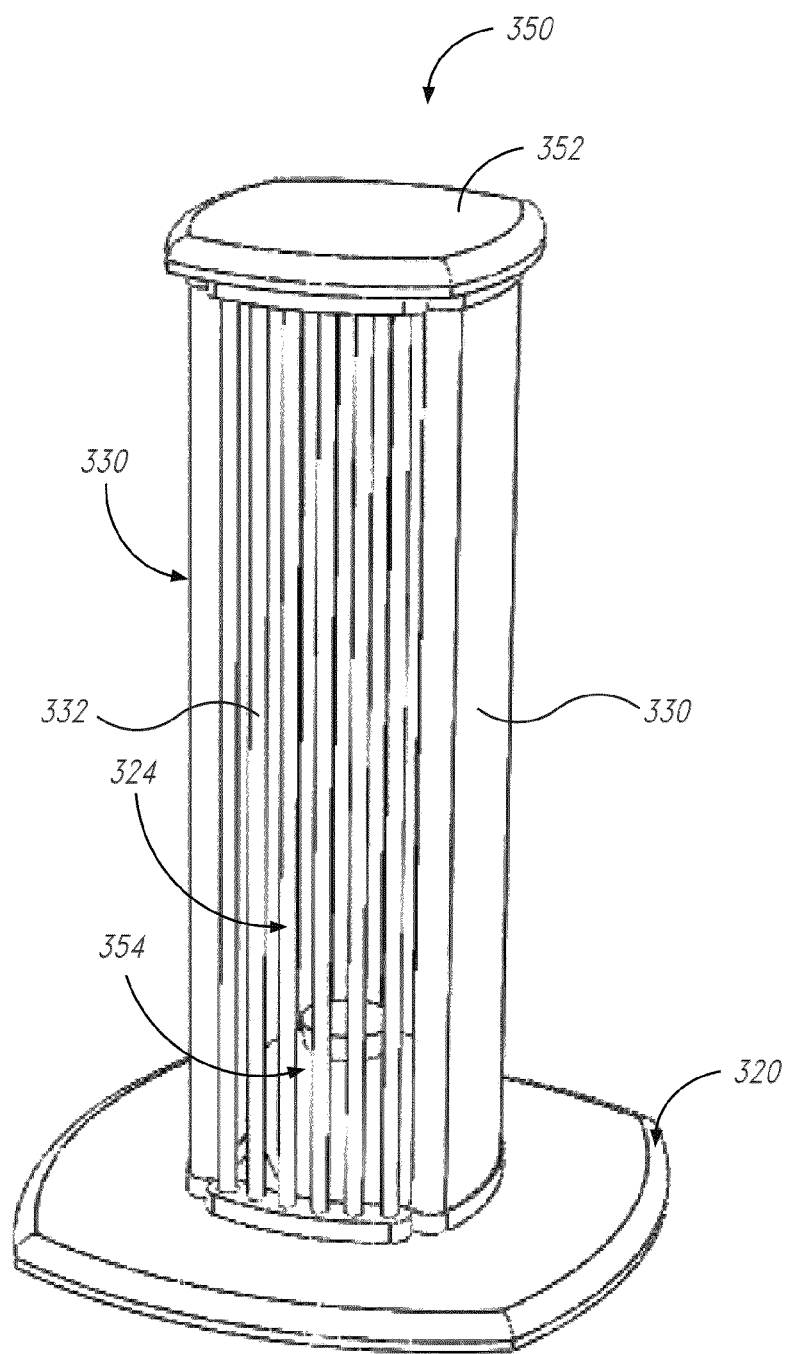
FIG. 78 is an isometric view of another aspect of the present disclosure in which a fragrance diffuser replaces a live catnip plant inside the enclosure.
Figure 79:
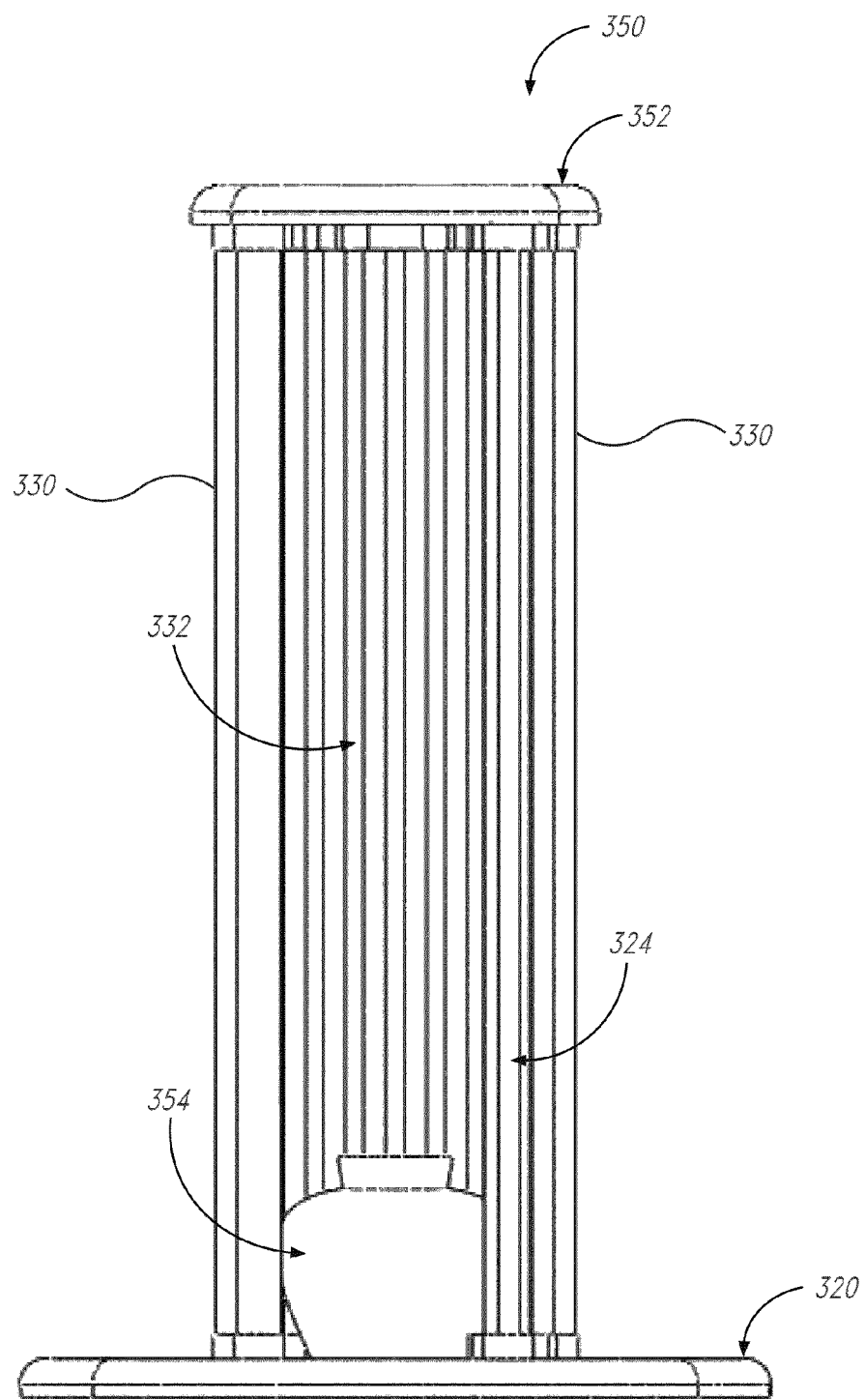
FIG. 79 is a side elevational view of the enclosure of FIG. 78 with the door in an opened configuration.

FIGS. 78-79 illustrate yet another embodiment of the present disclosure. Shown therein is an enclosure 350 having a cage portion 318 mounted on the base 320 and having solid side panels 330 and a door 324 with ribs 332 as previously described above in connection with FIGS. 68-75. However, in this version, the top 352 is a solid piece that provides no access to the interior. Instead of a live plant, a fragrance diffuser 354 is placed in the interior of the enclosure 350.

In this embodiment, instead of protecting a live plant that is attractive to cats, such as live catnip or cat grass, a fragrance diffuser 354 or similar aroma-producing device is protected within the enclosure 350. The purpose of replacing the live plant with a diffuser 354 is to provide an alternative for people not interested in cultivating a live plant or for use during the months of the year that growing a live plant indoors is difficult.

The diffuser 354 is placed inside the protective enclosure 350 in the same location that would be occupied by the live plant. The diffuser 354 disperses an attractive aroma such as catnip oil or concentrated dried catnip. This would produce similar results as the live plant in that it would attract the cat and encourage use of the toy or scratcher. It is necessary to protect the diffuser 354 the same way the enclosure 350 protects a live plant as described above because an unprotected diffuser 354 would be susceptible to destruction by a cat attracted by the scent it produces.

This is different than a standard toy that contains dried catnip or catnip oil because those products are meant to be directly played with and provide their own "protection" of the catnip inside. An example would be a plush toy with an internal pouch that contains dried catnip leaves. A catnip diffuser is typically made of un-glazed terra cotta of glass, which is readily commercially available, and it is not meant to be played with directly. However, other types of diffusers or dispensers may be used, such as electric, reed, etc., as known to those skilled in the art.

The substance in the diffuser is a catnip essential oil mixed with a carrier oil. Both of these substances are commercially available and will not be described in detail herein, although these two substances are not found mixed together. While catnip oil can be found in a spray bottle, it is intended to be applied directly to objects, such as toys.

The various embodiments described above can be combined to provide further embodiments. All of the U.S. patents, U.S. patent application publications, U.S. Patent application, foreign patents, foreign patent application and non-patent publications referred to in this specification and/or listed in the Application Data Sheet are incorporated herein by reference, in their entirety. Aspects of the embodiments can be modified, if necessary to employ concepts of the various patents, application and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A portable device for holding a live catnip plant in a plant life supporting medium for use by a cat, the device comprising:
   a base;
   a cage attached to the base, the cage and the base together defining an interior sized and shaped to receive the plant and plant life supporting medium, the cage comprising a plurality of bars spaced apart to prevent the cat from reaching its paw through the bars while allowing air and light to pass through the bars to sustain the plant, the bars further configured to allow the plant to grow through the bars to the exterior of the device for access by the cat, at least a portion of the plurality of bars comprising a scratching surface for the cat; and
   an interactive physical feature coupled to the cage or the base and adapted to be attractive to the cat and to provide amusement to the cat.

2. The device of claim 1, comprising a watering cap positioned at a top of the cage and configured to receive water and to distribute water to the plant below the cage via a plurality of openings in the water cap.

3. The device of claim 1, wherein the cage comprises a top that can be opened or removed.

4. The device of claim 1, wherein at least a plurality of adjacent bars of the cage can be opened or removed.

5. A device containing a live catnip plant for use by a cat, the device comprising:
   a protective enclosure having an interior for the plant that admits light, water, and air to the interior to sustain the life of the plant while permitting the fragrance and the leaves of the plant to extend outside of the device and to further enable the cat to see the plant inside the enclosure; and
   a toy attached to the protective enclosure for access by the cat, the toy configured to attract the cat and to provide interactive amusement for the cat.

6. The device of claim 5, wherein the enclosure allows the live catnip plant to be watered, fertilized, and cared for without leaking of the water, fertilizer, or a plant supporting media in the enclosure, and while preventing the cat or other animals to have access to the plant.

7. The device of claim 6, wherein the enclosure forms at least part of the toy.

8. The device of claim 5, wherein the device is made at least in part by material that is configured to attract the cat and that provides a scratching material or a scratching surface for the cat.

9. The device of claim 5, further comprising a live catnip plant inside the protective enclosure.

10. The device of claim 9, further comprising an access door in the enclosure to provide access to the interior of the device to facilitate care, maintenance, and replacement of the catnip plant.

11. The device of claim 5, wherein the enclosure comprises a semispherical or hemispherical bottom that enables the device to rock back and forth, the bottom further comprising a flat portion to stabilize the device in an upright position when not disturbed.

12. The device of claim 11, further comprising a weight in the device to maintain and self-center the device in an upright position.

13. A portable device that sustains and protects a live plant in a plant life supporting medium while providing a cat limited access to the plant, the device comprising:
- an enclosure having a plurality of openings to admit air, light, and water to an interior of the enclosure to sustain the plant life, the enclosure structured to allow leaves from the plant to grow outside the enclosure while preventing access to the interior by the cat, the enclosure further comprising a platform that supports the cat while the cat sits, stands, or lies thereon; and
- an interactive physical feature coupled to the enclosure and adapted to be attractive to the cat and to provide amusement to the cat.

14. The device of claim 13, wherein the device is made at least in part by material that provides a scratching material or a scratching surface for the cat.

15. The device of claim 13, further comprising a live catnip plant inside the protective enclosure.

16. The device of claim 15, further comprising an access door in the enclosure to provide access to the interior of the device to facilitate care, maintenance, and replacement of the catnip plant.

17. The device of claim 13, wherein at least a portion of the enclosure comprises a scratching surface for the cat.

18. The device of claim 13, further comprising a toy attached to the enclosure and accessible to the cat to provide amusement for the cat.

19. A kit, comprising:
- a portable device for holding a live catnip plant in a plant life supporting medium for use by a house cat, the device comprising:
  - a base;
  - a cage attached to the base, the cage and the base together defining an interior sized and shaped to receive the plant and plant life supporting medium, the cage comprising a plurality of bars spaced apart to prevent a cat from reaching its paw through the bars while allowing air and light to pass through the bars to sustain the plant, the bars further configured to allow the plant to grow through the bars to the exterior of the device for access by the cat at least a portion of the plurality of bars comprising a scratching surface for the cat;
- a pot to hold the plant;
- a medium for supporting the life of the plant; and
- an interactive physical feature coupled to the base or the cage and configured to be attractive to the cat and to provide amusement to the cat.

20. The kit of claim 19, further comprising at least one of a watering can, a cat toy with a device for attaching the cat toy to the cage, plant seeds, a cover for the cage, and the plant.

21. The kit of claim 19, comprising a wrap for the medium to contain the medium and prevent spilling of the medium.

22. A device to display and protect an object that provides an attractive odor to an animal, the device comprising:
- a protective enclosure having an interior configured to receive the object, the enclosure structured to admit light, liquid, and air to the interior and to permit the odor to permeate outside of the enclosure and to further enable the animal to visually perceive the object in the interior of the enclosure, the protective enclosure further structured to permit limited access by the animal to the interior while preventing direct contact with the object by the animal; and
- a physical feature associated with the protective enclosure and configured to function as a toy that is attractive to the cat and responds to physical interaction with the cat.

23. The device of claim 22, further comprising a live plant inside the protective enclosure and wherein the physical feature comprises at least one from among a tethered ball, a tethered toy, a bottom surface configured to enable the protective enclosure to wobble when contacted by the cat, and a ring enclosing a ball.

24. The device of claim 23, wherein the enclosure is structured to allow the plant to be watered, fertilized, and cared for without leaking of the water, fertilizer, or a supporting media in the enclosure, and while preventing direct contact between the animal and the plant.

25. The device of claim 22, wherein the device is made at least in part by material that provides a scratching material or a scratching surface for the cat.

26. The device of claim 22, further comprising an access door in the enclosure to provide access to the interior of the device to facilitate care, maintenance, and replacement of the catnip object.

27. The device of claim 22, wherein the enclosure comprises a semispherical or hemispherical bottom that enables the device to rock back and forth, the bottom further comprising a flat portion to stabilize the device in an upright position when not disturbed.

28. The device of claim 27, further comprising a weight in the device to maintain and self-center the device in an upright position.

29. The device of claim 22 wherein the physical feature is associated with the protective enclosure for access by the cat to provide amusement for the cat.

30. The device of claim 29, wherein the protective enclosure forms at least part of the physical feature.

* * * * *